(12) United States Patent
Joe et al.

(10) Patent No.: US 7,097,586 B2
(45) Date of Patent: Aug. 29, 2006

(54) SHIFT CONTROL APPARATUS AND METHOD FOR HYBRID TRANSMISSION APPLICABLE TO HYBRID VEHICLE

(75) Inventors: Shinichiro Joe, Yokohama (JP); Taketoshi Kawabe, Yokohama (JP); Tomoya Imazu, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 138 days.

(21) Appl. No.: 10/816,273

(22) Filed: Apr. 2, 2004

(65) Prior Publication Data

US 2004/0198551 A1   Oct. 7, 2004

(30) Foreign Application Priority Data

Apr. 3, 2003   (JP) .............................. 2003-100773

(51) Int. Cl.
  *B60K 1/02*   (2006.01)
  *F16H 3/72*   (2006.01)
(52) U.S. Cl. .............................................. 477/3; 475/5
(58) Field of Classification Search ................... 477/3; 475/5; 180/65.2, 65.4; 903/903, 910, 923, 903/930
  See application file for complete search history.

(56) References Cited

U.S. PATENT DOCUMENTS 5,907,191 A * 5/1999 Sasaki et al. ................. 290/19
5,991,683 A * 11/1999 Takaoka et al. ................ 477/3
6,053,833 A *  4/2000 Masaki .......................... 475/5
6,732,526 B1*  5/2004 Minagawa et al. ............ 475/5
6,819,985 B1* 11/2004 Minagawa et al. ......... 903/910
2005/0124449 A1*  6/2005 Moeller ......................... 475/5

FOREIGN PATENT DOCUMENTS

JP         09-191506 A         7/1997

OTHER PUBLICATIONS

U.S. Appl. No. 10/768,692, filed Feb. 2, 2004, Joe et al.

* cited by examiner

*Primary Examiner*—Roger Pang
(74) *Attorney, Agent, or Firm*—Foley & Lardner LLP

(57) ABSTRACT

In shift control apparatus and method for a hybrid transmission suitable for use in a hybrid vehicle, at least one of a target drive torque and a target input revolution acceleration to be a value within a realizable region to be set as a drive torque command value or an input revolution command acceleration is corrected in such a manner that polarities of the target drive torque and the target input revolution acceleration are left unchanged, in a case where a combination of the target drive torque with the target input revolution acceleration falls out of a realizable region on two-dimensional coordinates of the drive torque and the input revolution acceleration, the drive torque command value and the input revolution acceleration command value contributing to controls of the main power source and the motor/generators in place of the target drive torque and the target input revolution acceleration.

34 Claims, 25 Drawing Sheets

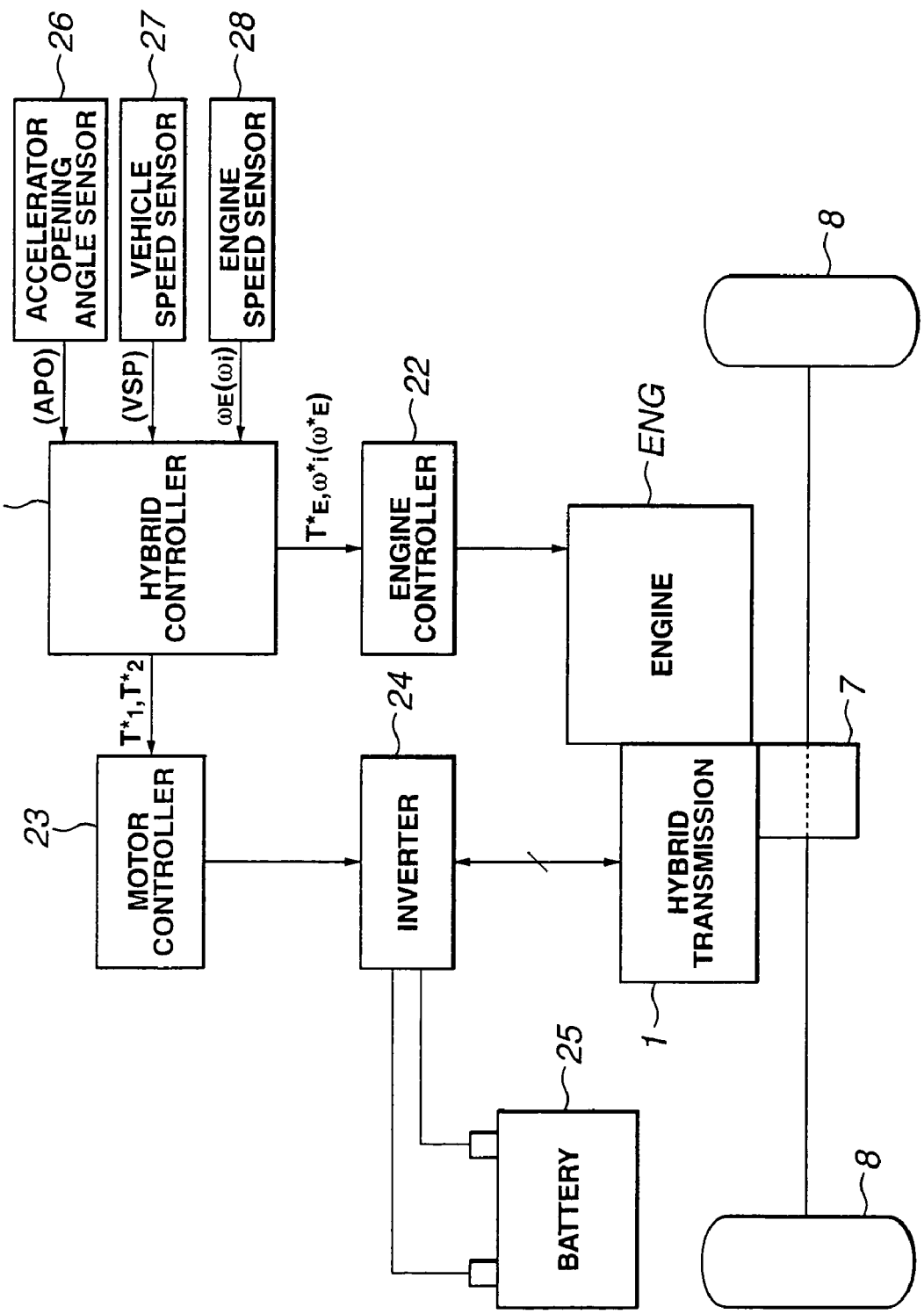

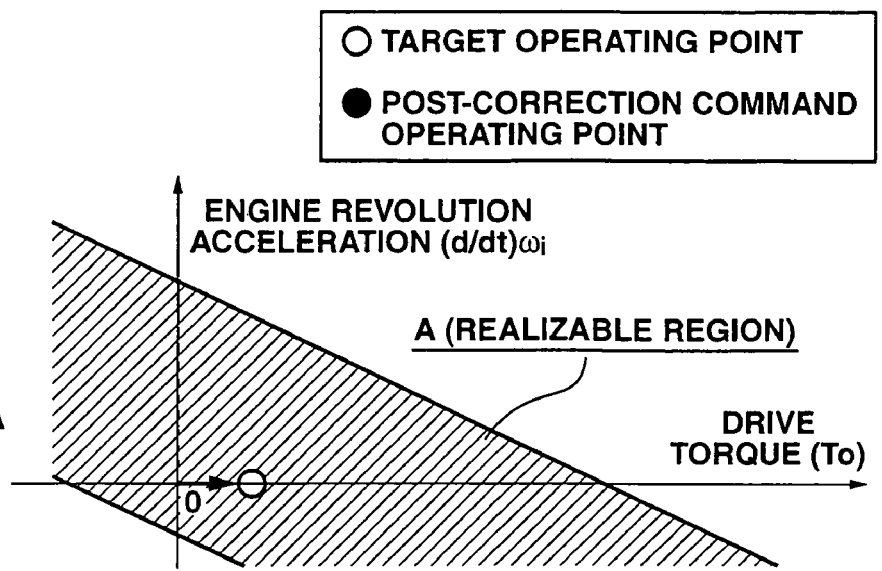
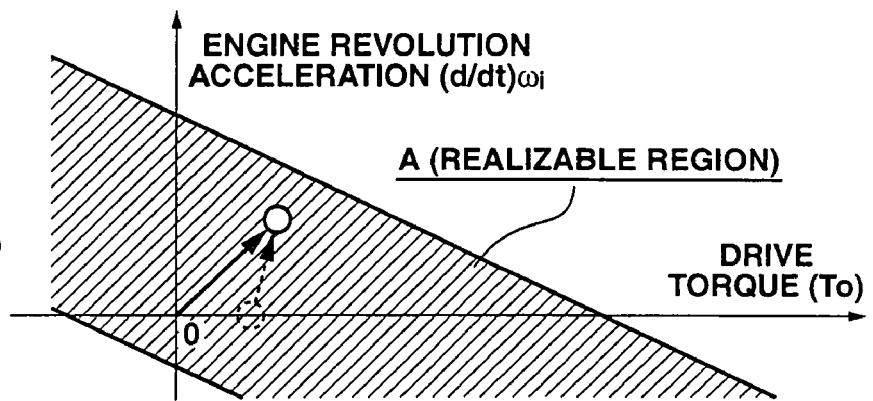
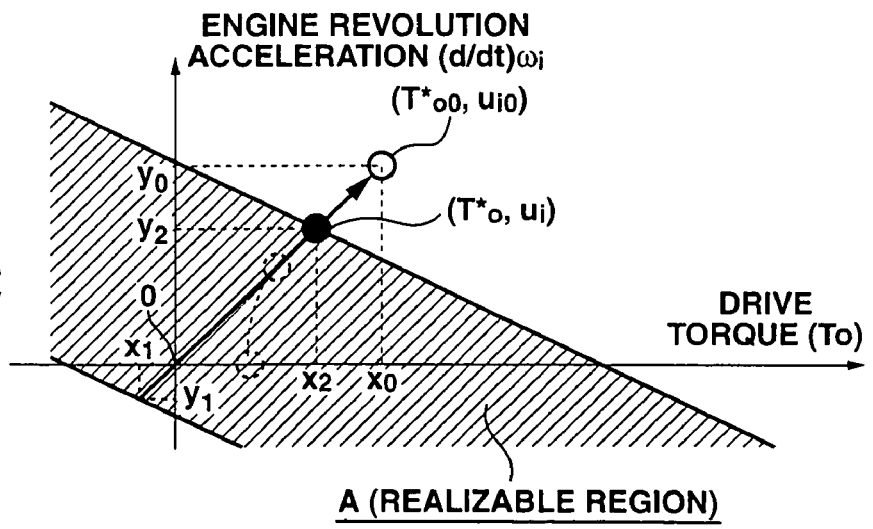

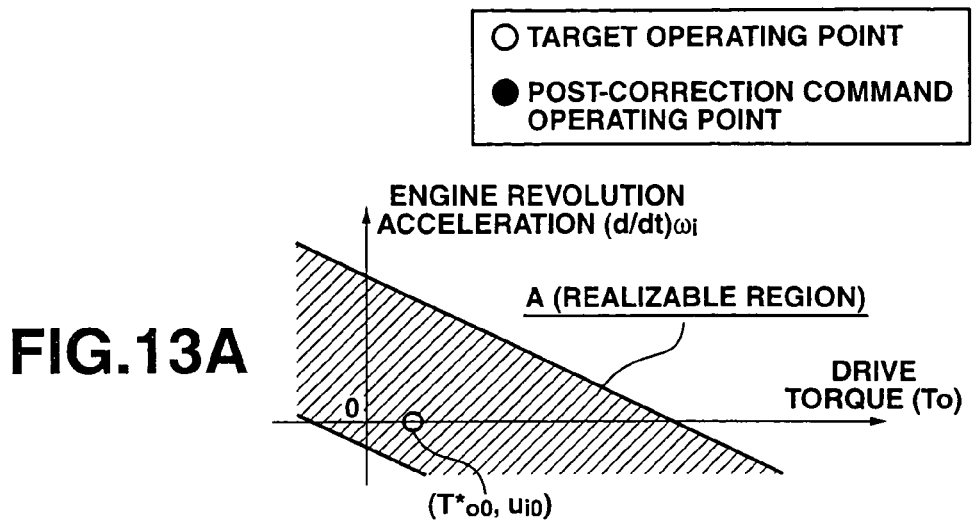

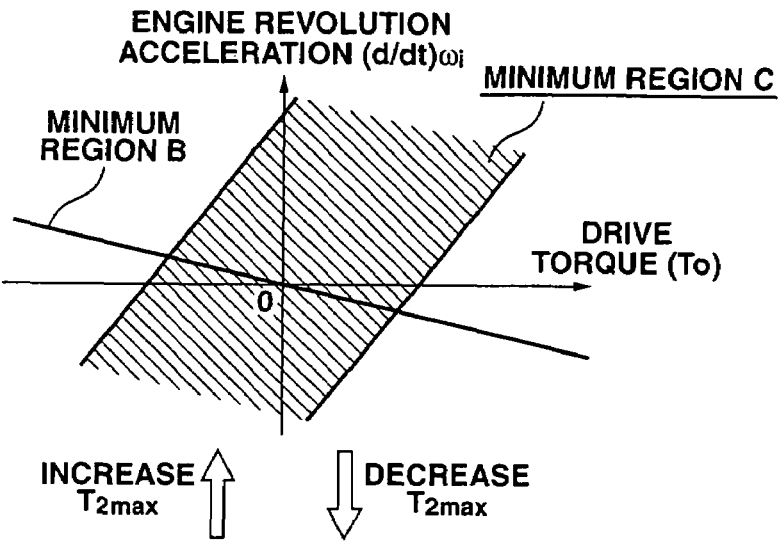
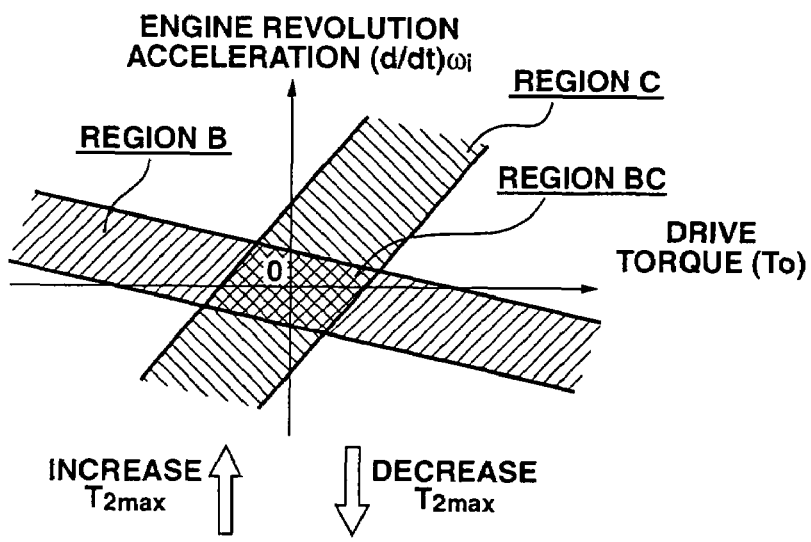
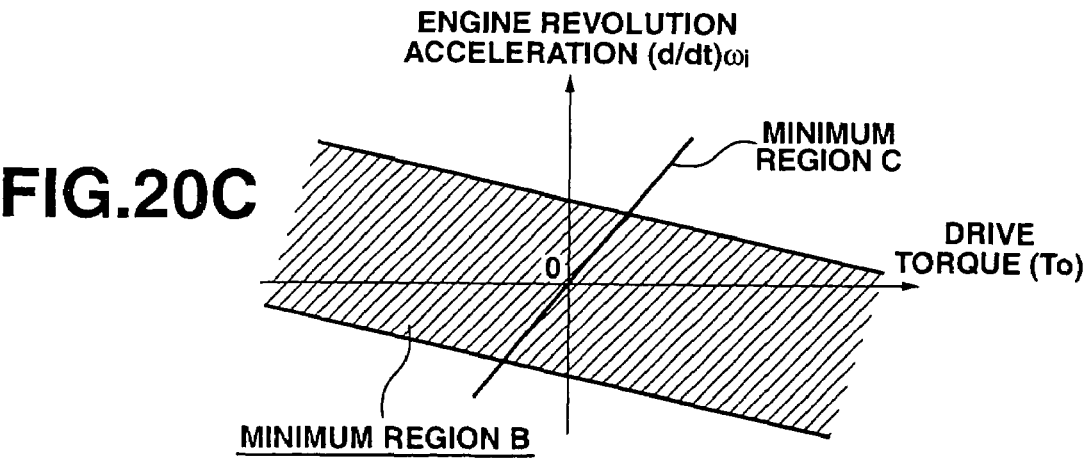

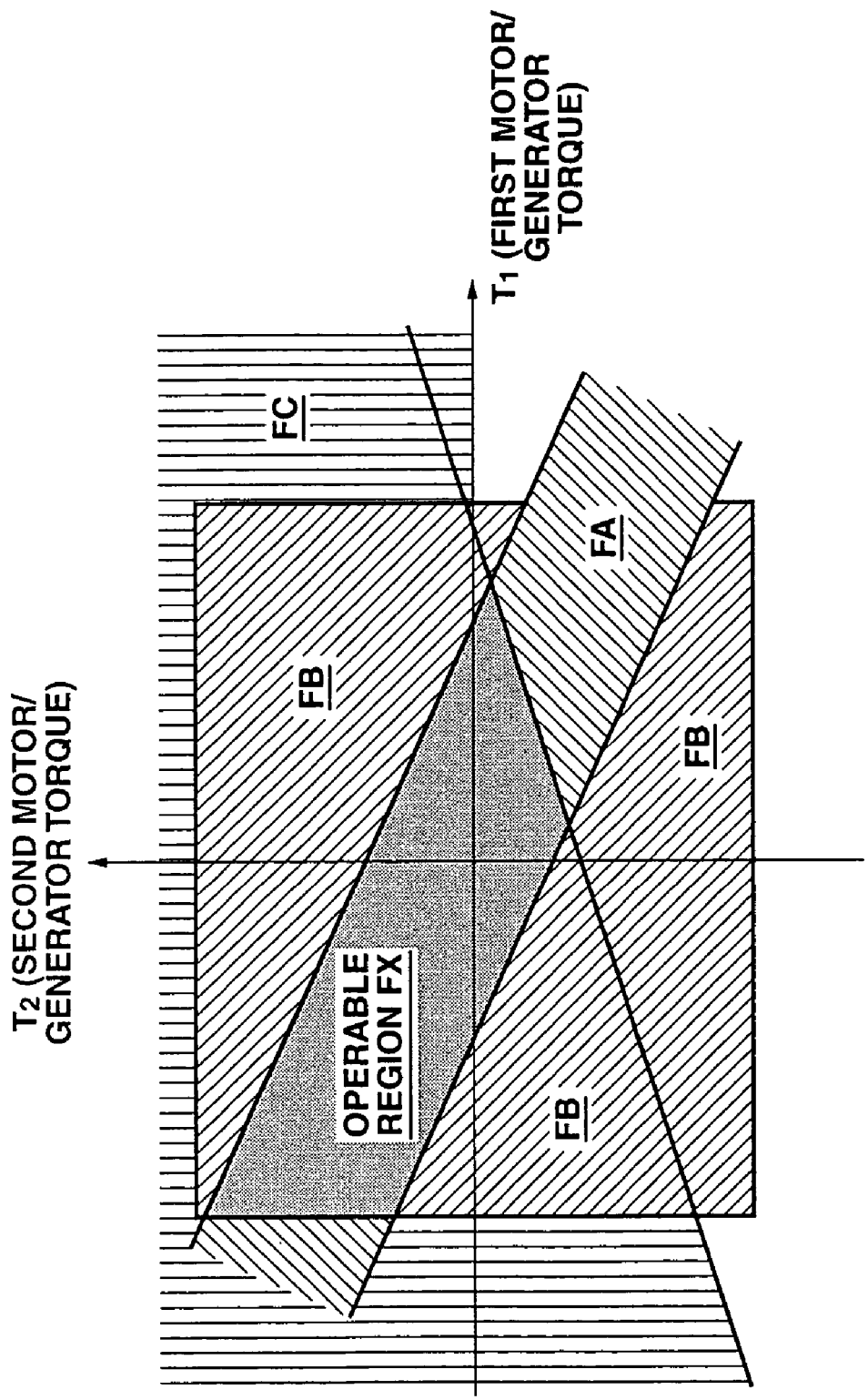

SHIFT CONTROL APPARATUS AND METHOD FOR HYBRID TRANSMISSION APPLICABLE TO HYBRID VEHICLE

BACKGROUND OF THE INVENTION

1. Field of the Invention

The present invention relates to shift control apparatus and method for a hybrid transmission suitable for use in a hybrid vehicle in which a main power source such as an engine and motor/generators are mounted. The present invention particularly relates to the shift control apparatus and method which are capable of having a differential equipment (unit) interposed between the main power source and the motor/generators carry out a continuously variable shift operation.

2. Description of the Related Art

Such a kind of hybrid transmission as described above, for example, includes a differential unit having two degrees of freedom and which is constituted by a planetary gear group or so forth. An input from the engine which is the main power source, an output to a drive system, and a plurality of motor/generators are mutually coupled to respective revolutional members of the differential unit so that powers from the motor/generators permit the continuously variable shift operation. In the above-described hybrid transmission, the motor/generators are driven by means of an electric power of a battery. However, when this driving is carried out, it is necessary for the motor/generators to be driven at a power equal to or lower than a power rating of the battery in the same case as the drive for a normally available electrical equipment.

A Japanese Patent Application First Publication No. Heisei 9-191506 published on Jul. 22, 1997 exemplifies a previously proposed technique controlling the drive torque to the motor/generators (function as motors) in accordance with a state of the battery. In the previously proposed technique disclosed in the above-identified Japanese Patent Application First Publication, an electric vehicle in which a motor is driven along with a charge-and-discharge of the battery which serves as a power source is prerequisite. When a state variable of the battery is varied by a reference value or more such as reductions in a battery voltage or a battery residual capacity equal to or lower than a reference value, a response speed of a torque control for a drive torque command to the motor is slowed so that an earlier deterioration of the battery is prevented.

SUMMARY OF THE INVENTION

However, if the above-described technique is used to the hybrid transmission of the above-described type which is the prerequisite, viz., the hybrid transmission in which the input from the engine (main power source), the output to the drive system, and the motor/generators are mutually coupled via the differential unit having the two degrees of freedom and the powers from the motor/generators can modify limitlessly a ratio between input and output revolutions of the transmission (shift ratio) by means of the powers from the motor/generators, the battery residual capacity or battery voltage is lowered to a value equal to or lower than the reference value or a battery temperature is raised by a value equal to or higher than a reference value. At this time, if a control form is adopted in which the response speed is slowed to the command of the motor/generator, the following problems occur.

In details, in such a kind of the hybrid transmission as described above, the drive torque to the output of the drive system and a shift speed (input revolution acceleration) are mutually related to each other. As described in the previously proposed technique, if the drive torques of the motor/generators in accordance with only the state of the battery without the shift speed (input revolution acceleration) taken into consideration are limited, there is a possibility that the shift speed (input revolution acceleration) is in an opposite direction to a direction that the driver has expected. If the shift speed (input revolution acceleration) is in the opposite direction that the driver has desired, an input revolution speed variation (engine revolution speed variation) which is opposite to that the driver has expected from a driving operation occurs. There is a possibility of the shift such that a sense of incompatibility is given to the driver. Then, there is an anxiety that a reduction of a shift quality is introduced.

It is, therefore, an object of the present invention to provide shift control apparatus and method for a hybrid transmission of a hybrid vehicle in which corrections for the drive torque command value and input revolution acceleration command value are made in such a manner that a combination of a target drive (or driving) torque and a target input revolution acceleration fall within a realizable region, the drive torque command value and input revolution acceleration command value contribute to controls over the main power source (engine) and motor/generators so that a deterioration of the battery developed when the combination of the target drive (driving) torque and the target input revolution acceleration which fall out of the realizable region contributes to the control over the main power source (engine) and the motor/generators is prevented from occurring, and which are capable of eradicating the anxiety on the reduction in the shift quality by making this correction in such a way that the shift speed (input revolution acceleration) is not in the opposite direction to that in which the driver has expected to be directed According to one aspect of the present invention, there is provided a shift control apparatus for a hybrid transmission, comprising: a plurality of revolutional members which are enabled to be arranged on a predetermined lever diagram; a differential unit having two degrees of freedom such that if revolution states of two revolutional members thereof are determined, the revolutional states of the other revolutional members are determined, an input of a main power source (ENG), an output to a drive system, and a plurality of motor/generators (MG1, MG2) are coupled to the respective revolutional members of the differential unit to adjust a power from the motor/generators in such a manner that a shift ratio between the main power source and the drive system is varied continuously; a target drive torque calculating section that calculates a target drive torque $(T^*_{oO})$ to the drive system in accordance with a driving condition; a target input revolution speed calculating section that calculates a target input revolution speed $(\omega^*_E)$ of one of the revolutional members which is coupled to the main power source (ENG); a target input revolution acceleration calculating section that calculates a target input revolution acceleration $(u_{io})$ to converge an actual input revolution $(\omega i)$ into the target input revolution speed $(\omega^*i)$; and a target value correcting section that corrects at least one of the target drive torque $(T^*_{oO})$ and the target input revolution $(u_{io})$ to be a value within a realizable region to be set as a drive torque command value $(T^*o)$ and an input revolution acceleration command value $(u_{io})$ in such a manner that polarities of the target drive torque $(T^*_{oO})$ and the target input revolution acceleration $(u_{io})$ are left unchanged, in a case where a combination of the target drive torque with the target input revolution acceleration falls out of a realizable region on two-dimensional coordinates of the drive torque and the input revolution acceleration related to a combination of the drive torque and the input revolution acceleration which is feasible in a state of the present motor/generators, a battery for the motor/generators (MG1, MG2), and the main power source, the drive torque command value (T*o) and the input revolution acceleration command value ($u_{io}$) contributing to controls of the main power source and the motor/generators (3) in place of the target drive torque ($T^*_{oO}$) and the target input revolution acceleration ($u_{io}$).

According to another aspect of the present invention, there is provided a shift control method for a hybrid transmission, the hybrid transmission comprising: a plurality of revolutional members which are enabled to be arranged on a predetermined lever diagram; and a differential unit having two degrees of freedom such that if revolution states of two revolutional members thereof are determined, the revolutional states of the other revolutional members are determined, an input of a main power source, an output to a drive system, and a plurality of motor/generators (MG1, MG2) are coupled to the respective revolutional members of the differential unit to adjust a power from the motor/generators in such a manner that a shift ratio between the main power source and the drive system is varied continuously, and the shift control method comprising: calculating a target drive torque (T*o) to the drive system in accordance with a driving condition; calculating a target input revolution speed ($\omega^*_E$) of one of the revolutional members which is coupled to the main power source (ENG); calculating a target input revolution acceleration ($u_{io}$) to converge an actual input revolution ($\omega i$) into the target input revolution speed ($\omega^*i$); and correcting at least one of the target drive torque ($T^*_{oO}$) and the target input revolution acceleration ($u_{io}$) to be a value within a realizable region to be set as a drive torque command value (T*o) or an input revolution acceleration command value ($u_{io}$) in such a manner that polarities of the target drive torque (T*o) and the target input revolution acceleration ($u_{io}$) are left unchanged, in a case where a combination of the target drive torque (T*o) with the target input revolution acceleration ($u_{io}$) falls out of a realizable region on two-dimensional coordinates of the drive torque (To) and the input revolution acceleration $\{(d/dt)\omega i\}$ related to a combination of the drive torque and the input revolution acceleration which is feasible in a state of the present motor/generators, a battery ($P_B$) for the motor/generators (MG1, MG2), and the main power source, the drive torque command value (T*o) and the input revolution acceleration command value ($u_i$) contributing to controls of the main power source (ENG) and the motor/generators (MG1, MG2) in place of the target drive torque ($T^*_{oO}$) and the target input revolution acceleration ($u_{io}$).

This summary of the invention does not necessarily describe all necessary features so that the invention may also be a sub-combination of these described features.

BRIEF DESCRIPTION OF THE DRAWINGS

FIG. 2 is a block diagram of a control system of the hydraulic transmission shown in FIG. 1A.

FIGS. 7A, 7B, and 7C are diagrammatical views of a relationship between the feasible region which is the same as that in the case of FIG. 6 and an operating point position during a non-shaft operation, of a relationship between the feasible region and the operating point position in which a movement state of the operating point during the shift operation is a case wherein the operating point is still within the feasible region, and of a relationship between the feasible region and the operating point position in which the movement state of the operating point during the shift operation is out of the realizable region.

FIGS. 13A, 13B, 13C, and 13D are explanatory views of correction procedures of the target drive (or driving) torque and target engine (input) revolution acceleration executed by the gear shift control apparatus in the hybrid transmission in a second preferred embodiment of the shift control apparatus according to the present invention, diagrammatical view illustrating an operating point position during the no shift, diagrammatical view illustrating the movement state of the operating point during the shift operation which is still within the realizable region, and a diagrammatical view when the operating point is out of the feasible region, and a diagrammatical view in a case where the movement state of the operating point of the shift is out of the realizable region to a degree that the operating point is out of the feasible region to a degree which does not satisfy the shift speed lower limit value, respectively.

FIGS. 20A, 20B, and 20C are integrally a diagrammatical view of how a realizable region by means of the motor/generators shown in FIG. 18 is varied when a maximum torque of the motor/generators is varied as 20A, 20B, and 20C.

FIG. 22 is a regional diagrammatical view representing the operable region of the motor/generators in the hybrid transmission shown in FIG. 16.

DETAILED DESCRIPTION OF THE PREFERRED EMBODIMENTS

Reference will hereinafter be made to the drawings in order to facilitate a better understanding of the present invention.

First Embodiment

Figure 1A:
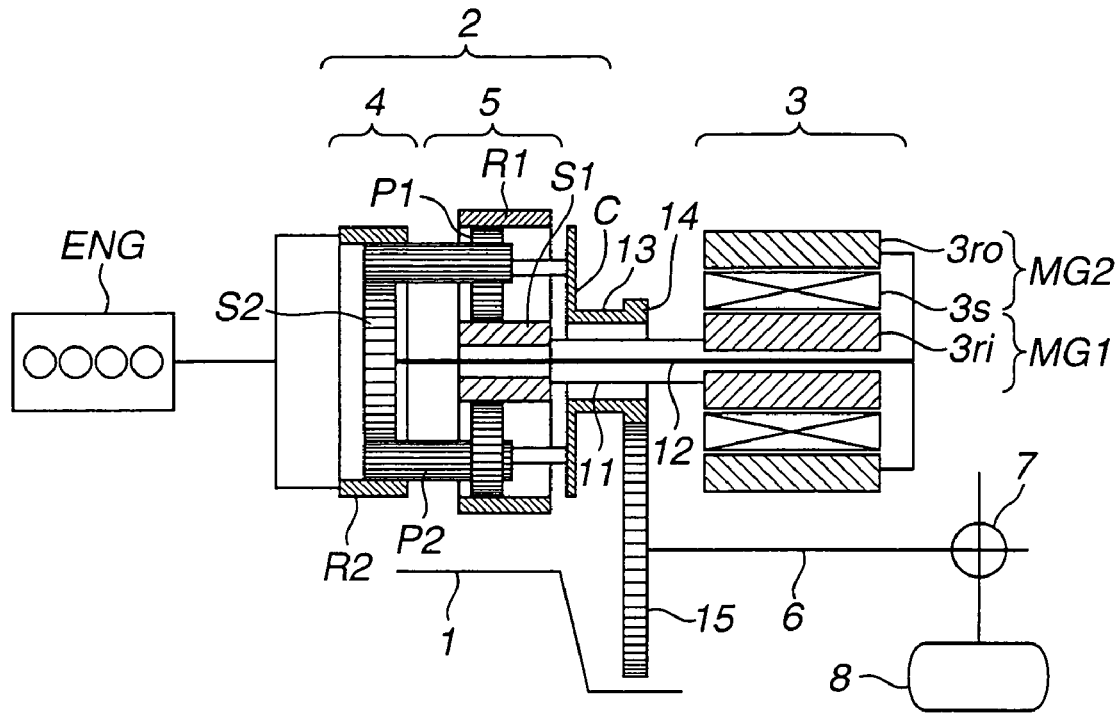
FIG. 1A is an example of a diagrammatically illustrated hybrid transmission to which the present invention of a shift control apparatus in a first preferred embodiment is applicable.

FIG. 1A shows a hybrid transmission to which a shift control apparatus in a first preferred embodiment according to the present invention is applicable. In the first embodiment, the hybrid transmission constitutes a transaxle for a front-engine-front-drive (so called, FF) car. In FIG. 1A, a reference numeral 1 denotes a transmission casing in which a Ravigneaux type planetary gear set 2 located at a left side in an axial direction of transmission casing 1 (leftward direction and rightward direction as viewed from FIG. 1A) is incorporated and a composite current two-layer motor 3 located at a right side in the axial direction of transmission casing 1 is incorporated. An engine (main power source) ENG is disposed at an outside (leftward direction) of the transmission casing 1. Ravigneaux type planetary gear set 2, engine ENG, and composite current two-layer motor 3 is coaxially disposed on a main axial line of the hybrid transmission. In transmission casing 1, a countershaft 6 and a differential gear unit 7 are juxtaposed to the main axial line with an offset and are also incorporated into transmission casing 1. Left and right driven road wheels 8 are drivingly coupled to differential gear unit 7.

Ravigneaux type planetary gear set 2 is a combination of two single pinion planetary gear groups 4 and 5 having a common pinion P2. One of the planetary gear groups located nearer to engine ENG is a first single pinion planetary gear group 4 and the other of the planetary gear groups is a second pinion planetary gear group 5. First single pinion planetary gear 4 is constituted by a sun gear S2 and a ring gear R2 to both of which a long pinion P2 are meshed. A second single pinion planetary gear group 5 is provided with a sun gear S1, a ring gear R1, and a large-diameter short pinion P1 meshed to both of the sun gear S1 and ring gear R1. The short pinion P1 is meshed with a common pinion P2. In addition, pinions P1 and P2 of the planetary gear groups 4 and 5 are revolutionally supported by means of common carrier C.

Ravigneaux type planetary gear set 2 has a main elements of four revolutional members of sun gear S1, sun gear S2, ring gear R2, and carrier C and is constituted by a differential unit 2 having the two degrees of freedom such that if the revolution speeds of the two revolutional members are determined, the revolution speeds of the other members are determined. An order of revolution speed of the four revolutional members is sun gear (fastest) S1, ring gear R2, carrier C, and sun gear S2 as shown by a lever diagram shown in FIG. 1B.

Composite current two-layer motor 3 is constituted by an inner rotor 3ri, an annular outer rotor 3ro enclosing inner rotor 3ri, both rotors being revolutionally and coaxially supported within transmission casing 1, a ring shaped stator 3s coaxially mounted in an annular stator 3s is fixedly mounted on transmission casing 1. Annular coil (stator) 3s and inner rotor 3ri constitutes a first motor/generator MG1 and annular coil (stator) 3s and outer rotor 3ro constitutes a second motor/generator MG2. Each of motor/generators MG1 and MG2 functions as a motor which outputs individual direction and velocity (including a stop) in accordance with a supply current when the composite current is supplied as a load and functions as a generator developing an electric power in accordance with a revolution by means of an external force. As shown in the lever diagram of FIG. 1B, in the revolution speed order from the four revolution speed members of Ravigneaux type planetary gear set 2, in the order of sun gear S1, ring gear R2, carrier C, and sun gear S2, first motor/generator MG1, the input from engine ENG which is the main power source, and the output to the road wheel drive system (Out), and second motor/generator MG2 are coupled.

If this connection is described in details in the following on the basis of FIG. 1A, ring gear R2 serves as an input element to which the engine revolution is inputted as described above. A crankshaft of engine ENG is coupled to ring gear R2. Sun gear S1 is coupled to first motor/generator MG1 (rotor 4ri) via a hollow axle 11 extended toward a rearward direction opposite to engine ENG. Sun gear S2 is coupled to motor/generator MG2 (rotor 4ro) via hollow axle 12 fitted to hollow axle 11 and motor/generator MG1 with a clearance.

Carrier C serves as an output element on which the revolution is outputted to the wheel drive system. An output gear 14 is coupled to carrier C via a hollow connecting member (output axle) 12. Output axle 14 is disposed between Ravigneaux type planetary gear set 2 and composite current two-layer motor 3 and revolutionally (rotatably) supported within transmission casing 1. Output gear 14 is meshed with counter gear 15 on a countershaft 6. An output revolution of transmission from output gear 14 is transmitted to differential gear unit 7 via counter gear 15 and via countershaft 6. Differential gear unit 7 distributes the output revolution from transmission into left and right driven wheels 8. These elements described above constitute a road wheel drive system.

Figure 1B:
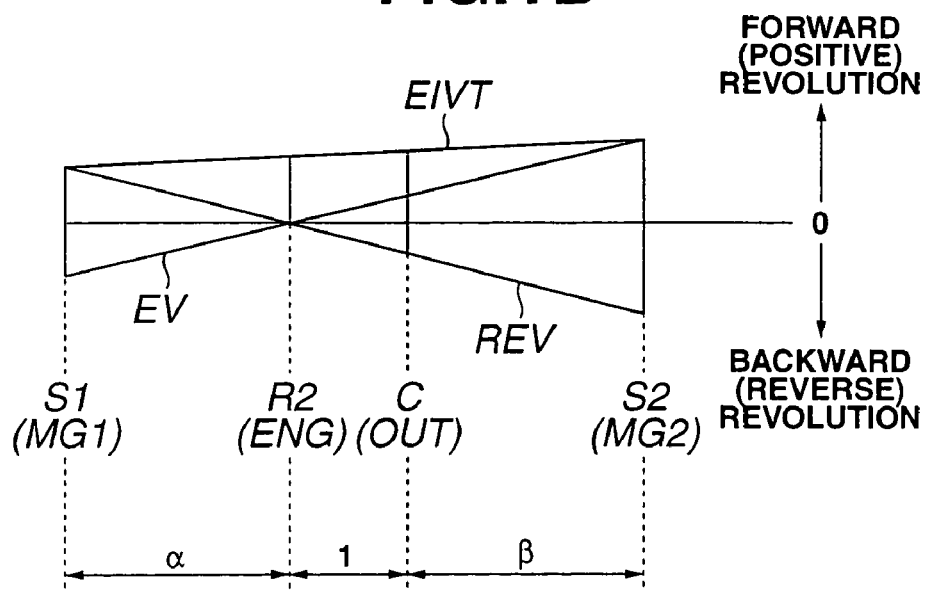
FIG. 1B is a lever diagram of the hybrid transmission shown in FIG. 1A.

The hybrid transmission whose structure has been heretofore described can be represented by the lever diagram shown in FIG. 1B. A lateral axis of the lever diagram shown in FIG. 1B denotes a ratio of distances between the respective revolution members determined according to a gear ratio of the planetary gear of the planetary gear groups 4 and 5. That is to say, when the distance between ring gear R2 and carrier C is 1, the ratio of distance between sun gear S1 and ring gear R2 is denoted by a and the ratio of distance between carrier C and sun gear S2 is denoted by β. A longitudinal axis of the lever diagram denotes a revolution speed of each revolutional member. In details, an engine revolution speed $\omega_E$ to ring gear R2 (transmission input revolution speed ($\omega_i$), a revolution speed $\omega_1$ of) motor/generator) sun gear S1, revolution speed $\omega$o of the transmission output (Out) from carrier C, and revolution speed $\omega_2$ of sun gear S2 (motor/generator MG2). If the revolution speeds of the two revolutional members are determined, the other two revolutional members are determined.

A shift operation of the hybrid transmission will hereinafter be described with reference to the lever diagram shown in FIG. 1B. The shift operation when a (vehicular) forward (positive) revolution is outputted includes two modes of EV mode and EIVT mode and a backward (reverse) revolution is outputted includes a REV shift operation. In the EV mode, as shown in lever EV shown in FIG. 1B, the output (Out) to the road wheel drive system is determined only by means of a power from both of motor/generators MG1 and MG2 (or one of the motor/generators) with engine ENG stopped. In the EIVT mode, as illustrated in lever EIVT mode of FIG. 1B, the output (Out) to the road wheel drive system is determined by means of the powers from engine ENG and both of the motor/generators MG1 and MG2.

The REV shift operation for the backward (reverse) revolution output is not dependent upon the power from engine ENG as shown by a lever REV in FIG. 1B but according to the positive revolution of the one motor/generator MG1, or the reverse revolution of the other motor/generator MG2, or both of the motor/generators (MG1, MG2) revolution from carrier C is outputted to output (Out).

A shift control system of hybrid transmission carrying out the shift operation control in each mode described above is constituted as shown in FIG. 2. A hybrid controller 21 performs an integration control of both engine ENG and the hybrid transmission. Hybrid controller 21 supplies commands on target torque $T^*_E$ and on target revolution speed ($\omega^*_E$) (target input revolution speed $\omega^*_1$) of engine ENG to an engine controller 22. Engine controller 22 drives engine ENG to have engine ENG achieve this target values $T^*_E$ and $\omega^*_E$ ($\omega^*_i$). Hybrid controller 21, furthermore, supplies command signals on target torques $T^*_1$ and $T^*_2$ of motor/generators MG1 and MG2 to motor controller 23. Motor controller 23 controls motor/generators MG1 and MG2 by means of an inverter 24 and a battery 25 to achieve target torques $T^*_1$ and $T^*_2$. Hybrid controller 21 inputs a signal from an accelerator opening angle sensor 26 to detect an accelerator opening angle APO from an accelerator pedal depression depth, a signal from a vehicle speed sensor 27 to detect a vehicle speed VSP (which is proportional to output revolution speed (=$\omega$o), and a signal from an engine speed sensor 28 to detect the engine speed $\omega_E$ (=input revolution speed, $\omega_i$).

Hybrid controller 21 carries out a mode selection to achieve the driving state that the driver has desired from the accelerator pedal depression depth (accelerator opening angle) APO and vehicle speed VSP, and a charged state of battery 25 (SOC state of charge (carrying out enabling power) and executes the shift control in accordance with the selection mode to determine and command the target engine torque $T^*_E$, target engine speed $\omega^*_E$ ($\omega^*$i), and target motor/generator torques $T^*_1$ and $T^*_2$.

It is noted that revolution speed information inputted to hybrid controller 21 is not limited to engine speed $\omega_E$ ($\omega$i) and vehicle speed VSP (vehicle speed and output revolution speed $\omega$o). Since the differential unit constituted by Ravigneaux type planetary gear set 2 has two degrees of freedom, the revolution speeds of any two of the revolutional members may be inputted to hybrid controller 21.

Figure 3:
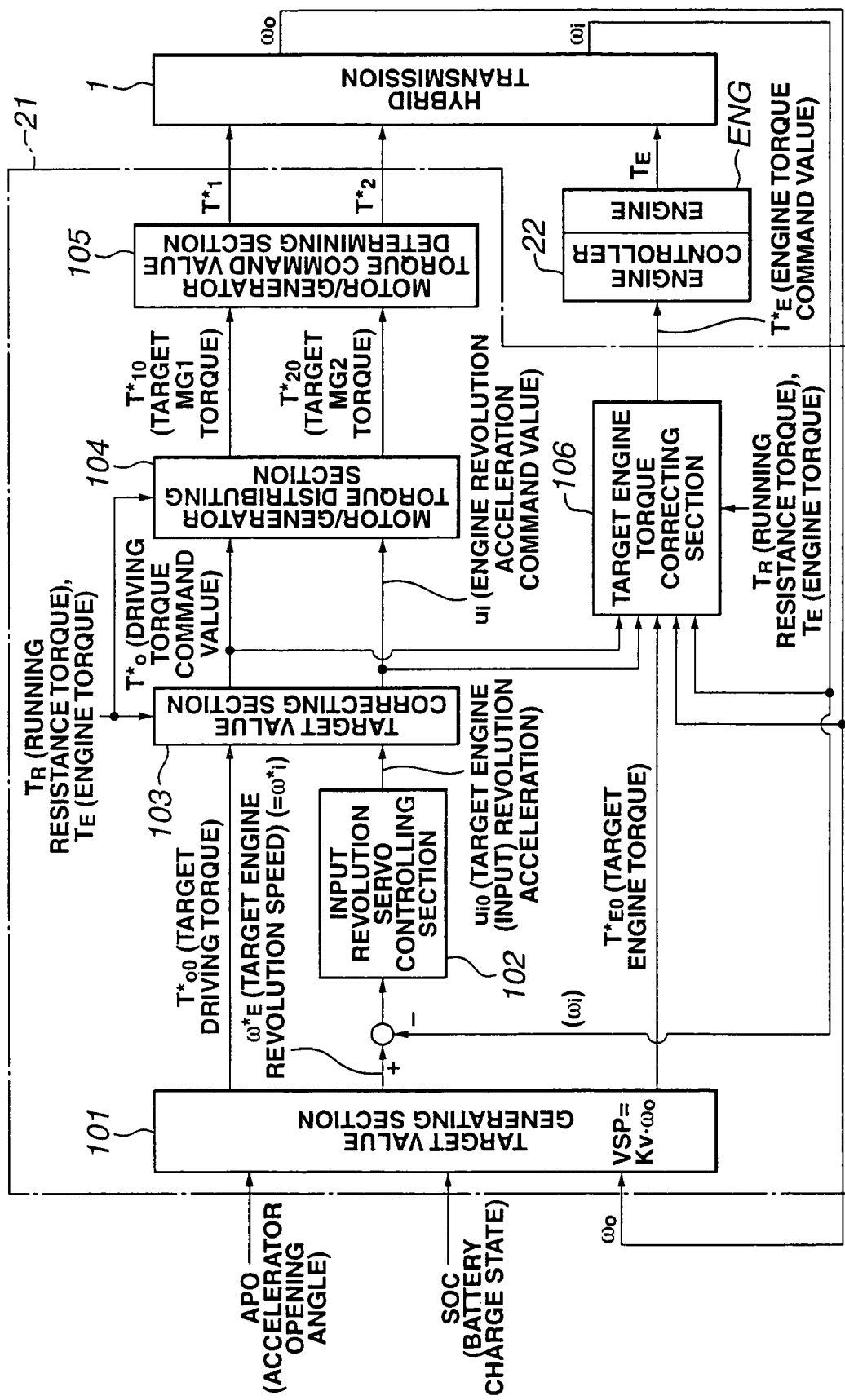
FIG. 3 is a schematic functional block diagram of a hybrid controller in the control system shown in FIG. 2.

FIG. 3 shows a functional block diagram of hybrid controller 21. Hybrid controller 21 includes an input revolution servo controlling section 102, a target value correcting section 103, a motor/generator torque distributing section 104, a motor/generator torque command value determining section 105, and a target engine torque correcting section 106. Target value generating section 101 calculates a target driving torque $T^*_{oO}$ to the road wheel drive system, a target engine revolution speed $\omega^*_E$, and a target engine torque $T^*_E$o from an accelerator pedal depression depth (opening angle) APO, the vehicle speed VSP, and a battery charge state SOC (bringing out enabling power).

Figure 4:
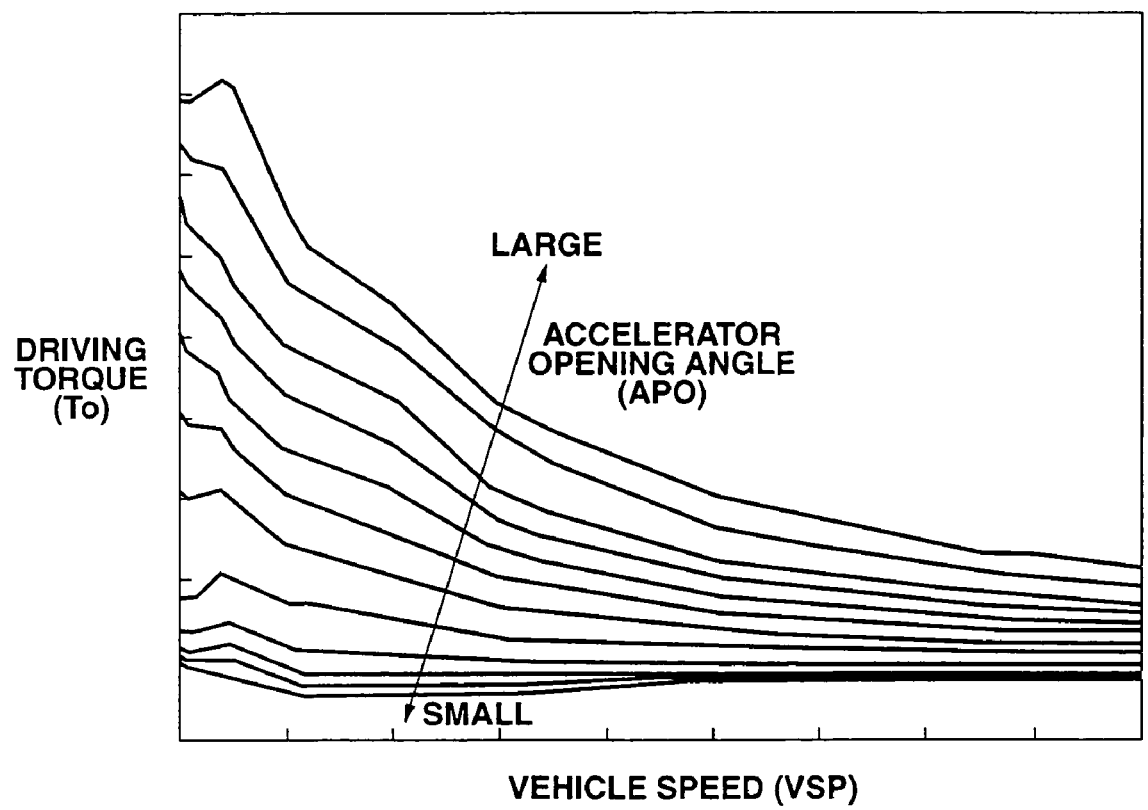
FIG. 4 is a diagrammatical view representing a variable characteristic of the drive torque requested from the vehicle.

Hence, at first, target driving torque $T^*_{oO}$ to transmission output gear 14 is calculated using a drive torque map shown in FIG. 4 from accelerator depression depth (opening angle of the accelerator APO), vehicle speed VSP. Vehicle speed VSP is calculated using the following equation (1) from, for example, output axle revolution speed $\omega$o.

$$VSP = k_v \cdot \omega o \qquad (1),$$

wherein kv denotes a constant determined according to a radius of a tire and a final gear ratio. Next, target value generating section 101 calculates a target driving power P*o from target driving torque T*o and output revolution speed $\omega$o as follows:

$$P^*o = \omega o \times T^*o \qquad (2).$$

Next, target value generating section 101 determines a target battery charge-and-discharge quantity $P^*_B$ in such a manner that, as SOC becomes high, the battery discharge quantity becomes increased and, as SOC becomes low, the battery charge quantity becomes increased.

Finally, target engine revolution speed $\omega^*$i and target engine torque $T^*_{EO}$ are calculated as follows from target driving power P*o, engine speed $\omega$i, and target battery charge-and-discharge quantity $P^*_B$. The target engine power $P^*_E$ is set in such a way that target engine power $P^*_E$, target driving power P*o, and target charge-and-discharge quantity $P^*_B$ have the relations expressed by the following equation:

$$P^*_E = P^*o + P^*_B \qquad (3).$$

Figure 5:
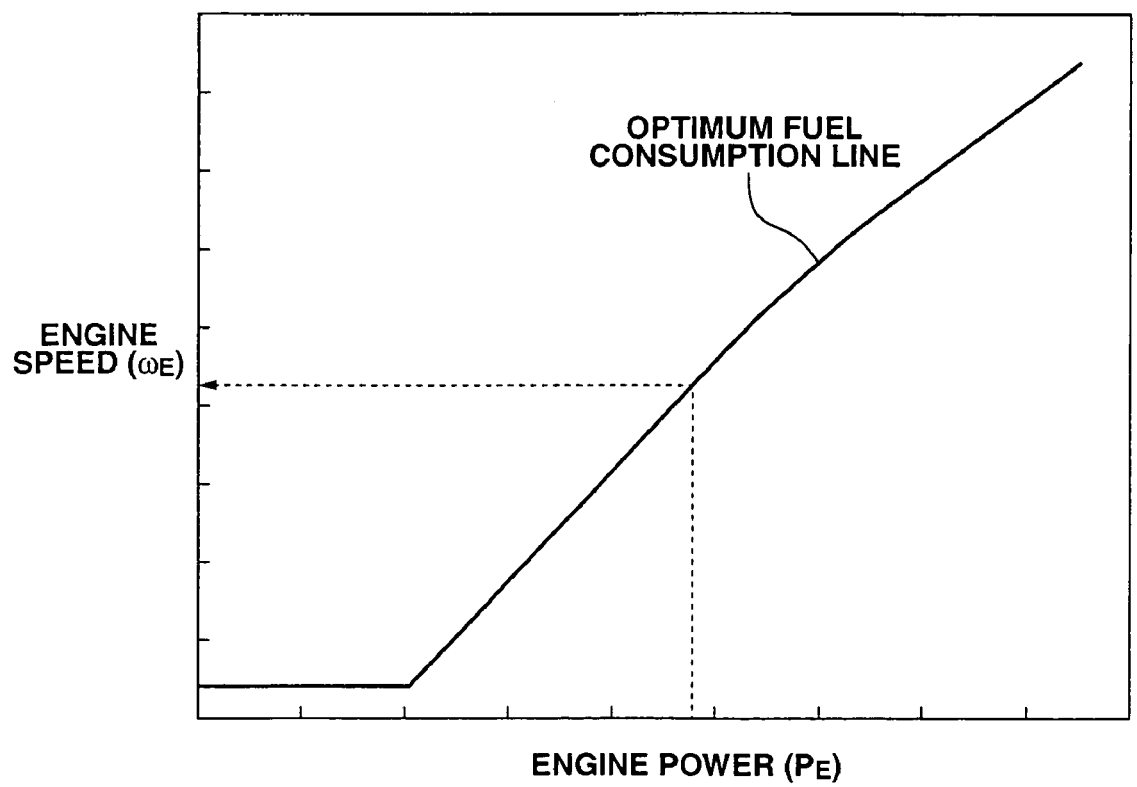
FIG. 5 is a characteristic graph representing an engine speed to develop an engine power with an optimum fuel economy.

Next, target engine (revolution) speed $\omega^*$E at which the fuel consumption becomes optimum when the target engine power P*$_E$ is generated by the engine is searched from target engine power P*$_E$ using a fuel consumption optimum target engine speed map shown in FIG. 5.

In order to supply target engine power P*E with the engine and to make an engine operating point a fuel consumption optimum point, there is a thought that a value of target engine power P*$_E$ divided by target engine revolution speed ω*$_E$ should be target engine torque T*$_E$. However, target value correcting section 103 as will be described later often limits the 4engine (input) revolution acceleration during a shift transient state. In this case, target engine revolution speed ω*E is not be realized. As described above, in a case wherein target engine revolution speed ω*$_E$ is not realized, target engine power P*$_E$ cannot be obtained. Therefore, target engine torque T*$_{EO}$ is a value of target engine power P*$_E$ divided by an actual engine (revolution) speed ω$_I$, as expressed by the following equation.

$$T_{EO}^* = \frac{P_E^*}{\omega_i}. \quad (4)$$

It is noted that if target engine revolution speed ω*$_E$ is coincident with actual engine (revolution) speed WE during a steady state, the engine torque gives an engine torque whose fuel consumption is optimum. Referring to FIG. 3, an input revolution servo controlling section 102 inputs a deviation between target engine revolution speed ω*$_E$ and actual engine revolution speed ω$_E$ and calculates a target engine (input) revolution acceleration u$_{io}$ so that the deviation of the input revolution (engine revolution) is decreased. When this calculation is carried out, target engine (input) revolution acceleration u$_{io}$ may be calculated, for example, using a sliding mode controller as shown in the following equation.

$$u_{io} = K\frac{\sigma}{|\sigma|+\varepsilon}. \quad (5)$$

$$\sigma = \omega^*_E - \omega i \quad (6),$$

wherein ε denotes a constant determining an upper limit of target engine (input) revolution acceleration u$_{io}$ and denotes a positive constant which makes target engine (input) revolution acceleration u$_{io}$ continuous in a proximity to zero of σ.

Figure 6:
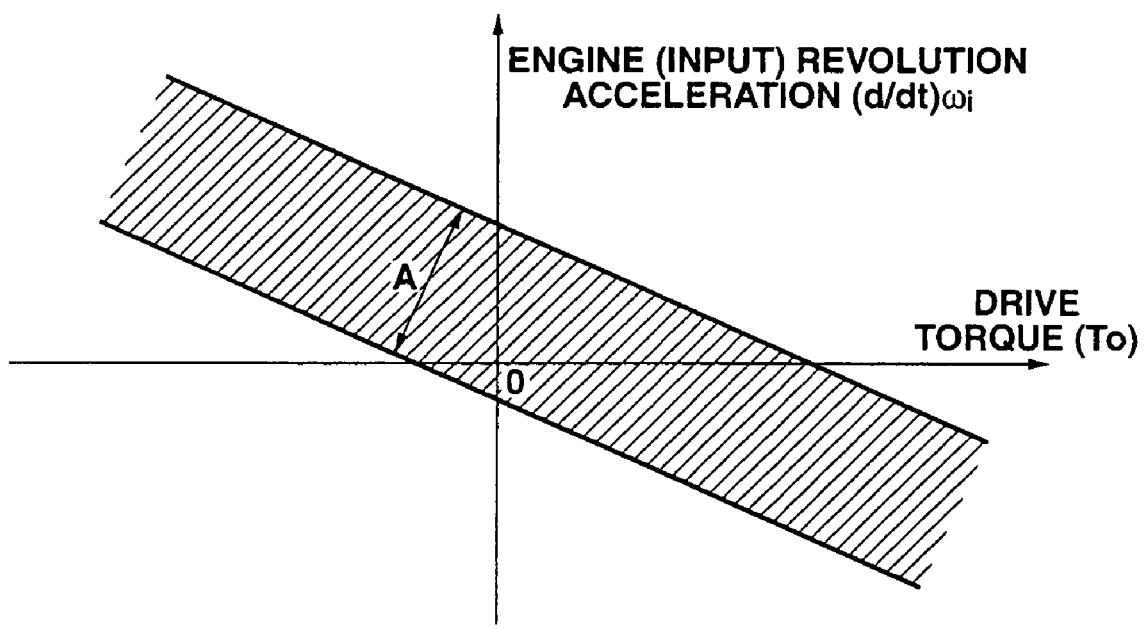
FIG. 6 is a diagrammatical view representing a realizable region illustrating a combination of a drive torque and an engine (input) revolution acceleration by a combination of which is feasible by a battery rated power of the hybrid transmission.

Referring to FIG. 3, target value correcting section 103 serves to correct target drive torque (or target driving torque) T*$_{oO}$ and target engine (input) revolution acceleration u$_{io}$ to a value within the realizable region in a case where a combination of the drive torque To and engine (input) revolution acceleration dωi/dt (or expressed as {(d/dt)ωi} which can be realized under the present engine and state of the battery is expressed on two-dimensional coordinates shown in FIG. 6 with the drive torque To as a lateral axis and with an engine (input) revolution acceleration dω$_i$/dt as a longitudinal axis and the target drive (driving) torque T*$_{oO}$ and target engine (input) revolution acceleration dΩ$_i$/dt falls out of the realizable region expressed on two-dimensional coordinates shown in FIG. 6.

A relationship from among drive torque To, engine (input) revolution acceleration dω$_i$/dt, engine revolution speed ωi, output revolution speed ωo, running resistance torque T$_R$, engine torque T$_E$, and battery charge-and-discharge quantity P$_B$ is expressed in the following equation (7).

$$(k_{ii}\omega_i + k_{io}\omega_o)\frac{d\omega_i}{dt} + (k_{oi}\omega_i + k_{00}\omega_o)T_o = k_R T_R + k_E T_E + P_B. \quad (7)$$

It is noted that k$_{ii}$, k$_{io}$, k$_{oi}$, k$_{oo}$, k$_R$, and k$_E$ denote constants determined according to the specifications (inertia moment and radius of revolutional elements in the planetary gear unit of the hybrid system). In this equation (7), it is possible to detect the present engine speed ω$_i$ and output revolution speed ωo are detectable and running resistance torque T$_R$ and engine torque T$_E$ can be estimated using, for example, an external disturbance observer. As shown in FIG. 6, with lateral axis as the drive torque To and longitudinal as engine (input) revolution acceleration dωi, the two-dimensional coordinates is formed. From the range of battery charge-and-discharge quantity using the above equation (7), a region in which drive torque To and engine (input) revolution acceleration dωi/dt fall in a battery rated power (a realizable region) is obtained as shown in A of FIG. 6.

In this two-dimensional coordinate, suppose that a target operating point determined according to target drive (or driving) torque T*$_{oO}$ and target engine (input) revolution acceleration u$_{io}$. If this target operating point falls out of the realizable region, target operating point does not fall within the battery rated power so that a life of the battery becomes short. Hence, as described below, signs of these target drive (driving) torque T*$_{oO}$ and target engine (input) revolution acceleration u$_{io}$ is corrected within the value of the realizable region to define a drive torque command value T*o and target engine (input) revolution acceleration u$_i$. A method of correcting target drive (driving) torque T*$_{oO}$ and target revolution acceleration u$_{io}$ will be described below with reference to FIGS. 7A, 7B, and 7C.

In FIGS. 7A, 7B, and 7C, a target operating point expressed by the combination of target drive (driving) torque T*$_{oO}$ and target engine (input) revolution acceleration u$_{io}$ before the correction is denoted by o (circle in white) and a command operating point expressed as a combination of a drive torque command value T*o and target engine (input) revolution acceleration u$_i$ after the correction of these physical values is made is denoted by • (circle in black).

Target operating point ? shown in FIG. 7A indicates a running state at a certain target drive (driving) torque T*$_{oO}$ without shift (engine (input) revolution acceleration dωi/dt=0). After this, when accelerator pedal is depressed, target operating point ? of FIG. 7A is moved to a broken line denoted by FIG. 7B. In FIG. 7B, since target operating point is present within the realizable region A, the corrections for target drive (driving) torque T*oD and target engine (input) revolution acceleration u$_{io}$ is not carried out.

Thereafter, when target operating point o is moved furthermore as denoted by a broken line in FIG. 7C, target operating point o becomes out of realizable region A and the combination of target drive (driving) torque T*$_{oO}$ and target engine acceleration u$_{io}$ cannot be realized which is fastest responded cannot be achieved but also becomes out of the battery rated power so that the life of the battery becomes introduced. In this case, target value correcting section 103, in the two-dimensional coordinates of drive torque To and engine (input) revolution acceleration dωi/dt shown in FIG. 7C, assumes the point of circle black • nearest to the target operating point o which is on a line segment denoted by a solid line connecting between the origin on the two-dimensional coordinate and target operating point o corresponding to the combination of target drive (driving) torque T*$_{oO}$ and target engine (input) revolution acceleration $u_{io}$. Then, target value correcting section corrects target drive (driving) torque $T^*_{oO}$ and target engine acceleration $u_{io}$ at the target operating point ? to drive torque $T^*o$ and engine (input) revolution acceleration $u_i$ at command operating point • and these corrected drive torque $T^*o$ and engine (input) revolution acceleration $u_i$ is set as the drive torque command value and engine acceleration command value and commanded to motor/generator torque distributing section 104.

Figure 8:
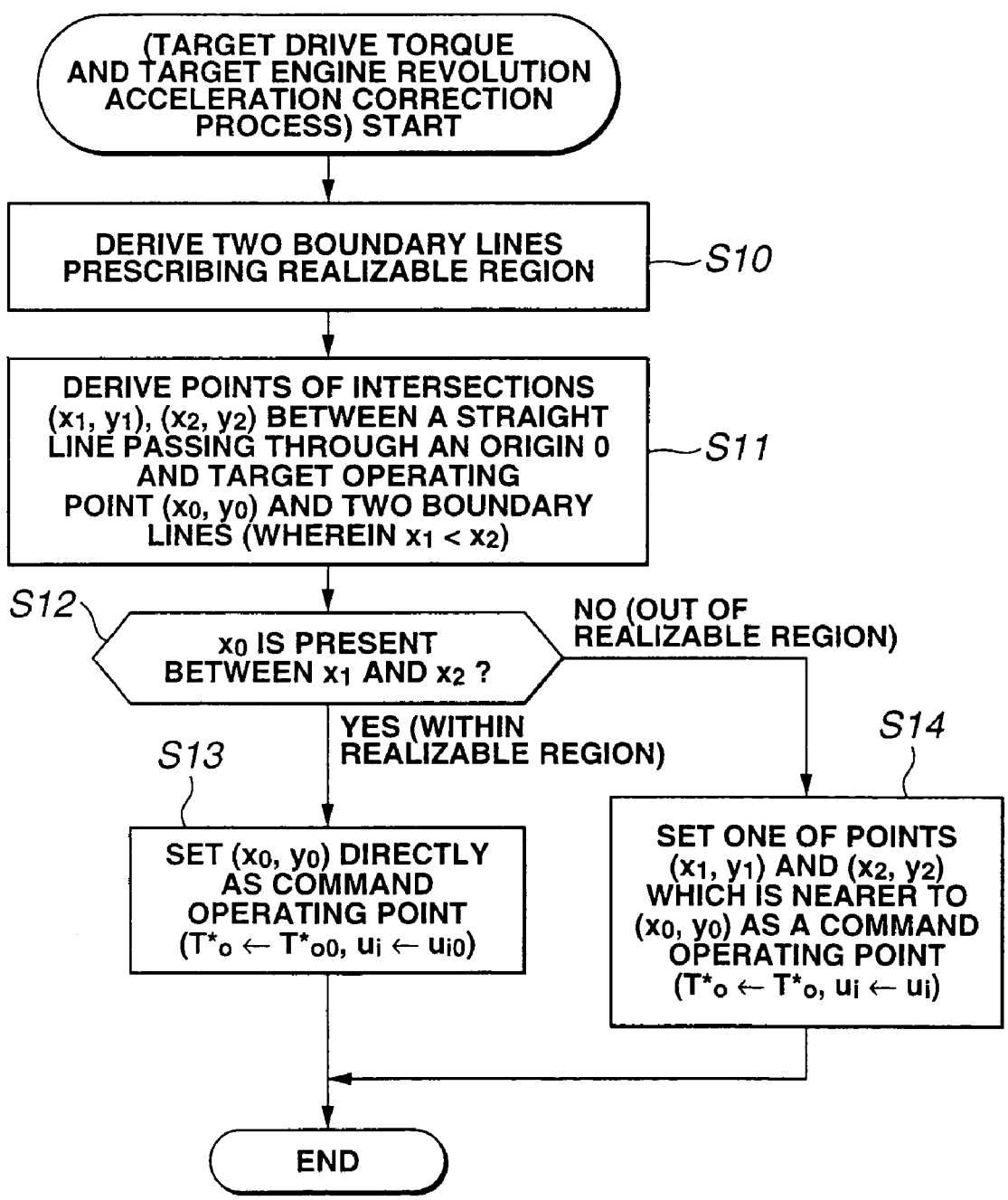
FIG. 8 is an operational flowchart representing a control program related to a correction procedure of a target drive (or driving) torque and a target engine (input) revolution acceleration executed by a target value correcting section shown in FIG. 3.

Target value correcting section 103 executes the correction process of target drive (driving) torque $T^*_{oO}$ and target engine (input) revolution acceleration $u_{io}$ (determination of drive torque command value $T^*o$ and engine (input) revolution acceleration command value $u_i$) in accordance with a flowchart shown in FIG. 8.

At a step S10, target value correcting section 103 derives realizable region A expressed on the two-dimensional coordinate of drive torque To and engine (input) revolution acceleration $(d/dt)\omega i$ shown in FIGS. 6 and 7 and two boundary lines prescribing this region. These two boundary lines can be calculated in the following equation in which $P_B$ in equation (7) is replaced with a battery rated power$\pm P_{Bmax}$.

$$(k_{ii}\omega_i + k_{io}\omega_o)\frac{d\omega_i}{dt} + (k_{oi}\omega_i + k_{oo}\omega_o)T_0 = k_R T_R + k_E T_E + P_{B\max}. \quad (8)$$

$$(k_{ii}\omega_i + k_{io}\omega_o)\frac{d\omega_i}{dt} + (k_{oi}\omega_i + k_{oo}\omega_o)T_o = k_R T_R + k_E T_E - P_{B\max}. \quad (9)$$

At step S11, target value correcting section 103 derives points of intersections $(x_1, y_1)$ and $(x_2, y_2)$ of a straight line denoted by a bold solid line shown in FIG. 7C, passing through target operating point o which is the combination of target drive (driving) torque $x_0$ ($=T^*_{oO}$) and target engine (input) revolution acceleration $y_0$ ($=u_{io}$) expressed in the equation (9) and an origin 0 of the two-dimensional coordinates and boundary lines calculated from the above equations (8) and (9) (wherein $x_1 < x_2$ and $x_1$ and $x_2$ denote drive torques and $y_1$ and $y_2$ denote engine (input) revolution accelerations).

$$\frac{d\omega_i}{dt} = \frac{u_{io}}{T^*_{oO}} T_o. \quad (10)$$

At a step S12, target value correcting section 103 determines whether $x_0$ falls between $x_1$ and $x_2$. If $x_0$ is determined to be within $x_1$ and $x_2$ (yes), the routine goes to a step S13 since target drive (driving) torque $T^*o$ and target engine (input) revolution acceleration $u_{io}$ falls within a realizable region A. If $x_0$ is determined not to fall within $x_1$ and $x_2$ (no), the control goes to a step S14 since target drive (driving) torque and target engine (input) revolution acceleration is out of realizable region A.

At step S13 selected when the above-described target drive (driving) torque and target engine (input) revolution acceleration fall within the realizable region A, target operating point o which is the combination of target drive (driving) torque $x_0$ ($=T^*_{oD}$) and target engine (input) revolution acceleration $y_0 (=U_{io})$ is directly set as the post-correction drive torque command value $T_o^*$ and target engine (input) revolution acceleration $u_{io}$ is directly set as the post-correction engine (input) revolution acceleration $u_i$. At step S14 selected when the above-described target drive (driving) torque and target engine (input) revolution acceleration do not fall within realizable region A. The operating points of one of both of $(x_1, y_1)$ and $(x_2, y_2)$ which is nearer to $(x_0, y_0)$ is served as the command operating point and the drive torque $T^*_o$ and engine (input) revolution acceleration $u_i$ are respectively set as the post-correction drive torque command value $T^*_o$ and the post-correction engine (input) revolution acceleration command value $u_i$. Hence, post-correction drive torque command value $T^*o$ and post-correction engine (input) revolution acceleration value $u_i$ have the same sign (polarity) as target drive (driving) torque $T^*_{oO}$ and target engine (input) revolution acceleration $u_{io}$.

Referring back to FIG. 3, motor/generator torque distributing section 104 determines target torques (target motor/generator torques) $T^*_{10}$ and $T^*_{20}$ of motor/generators MG1 and MG2 to achieve post-correction drive torque command value $T^*o$ and post-correction engine (input) revolution acceleration command values $u_i$ (transmission command value) even in the steady state nor in the transient state. To determine this target torques $T^*_{10}$ and $T^*_{20}$, the following relationship is established from among engine (input) revolution acceleration $d\omega_i/dt$, running resistance torque $T_R$, engine torque $T_E$, and the relationship between torques $T_{1 \text{ and } T2}$ of motor/generators MG1 and MG2.

$$\frac{d\omega_i}{dt} = b_{11} T_R + b_{12} T_E + b_{13} T_1 + b_{14} T_2. \quad (11)$$

In addition, the following relationship is established from among drive torque To, running resistance torque $T_R$, engine torque $T_E$, and motor/generator torques $T_1$ and $T_2$ are established.

$$T_0 = b_{21} T_R + B_{22} T_E + b_{23} T_1 + b_{24} T_2 \quad (12).$$

When equation (11) and equation (12) are combined, the following equation is established.

$$\begin{bmatrix} T_1 \\ T_2 \end{bmatrix} = A_c^{-1} \left( \begin{bmatrix} \frac{d\omega_i}{dt} \\ T_0 \end{bmatrix} - B_c \begin{bmatrix} T_R \\ T_E \end{bmatrix} \right). \quad (13)$$

$$A_C = \begin{bmatrix} b_{13} & b_{14} \\ b_{23} & b_{24} \end{bmatrix}, B_c = \begin{bmatrix} b_{11} & b_{12} \\ b_{21} & b_{22} \end{bmatrix}$$

If, in equation (13), drive torque To is replaced with post-solution drive torque command value $T^*o$, target engine (input) revolution acceleration $(d/dt)\omega i$ is replaced with post-correction engine revolution command value $u_i$, furthermore, torques $T_1$ and $T_2$ of motor/generators MG1 and MG2 are replaced with target motor/generator torques $T^*_{10}$ and $T^*_{20}$, the following equation is obtained, the following equations are obtained. From this equation, target motor/generator torques $T^*_{10}$ and $T^*_{20}$ can be obtained.

$$\begin{bmatrix} T^*_{10} \\ T^*_{20} \end{bmatrix} = A_c^{-1} \left( \begin{bmatrix} u_i \\ T^*_0 \end{bmatrix} - B_c \begin{bmatrix} T_R \\ T_E \end{bmatrix} \right). \quad (14)$$

It is noted that, running resistance torque $T_R$ and engine torque $T_E$ may directly be detected or, alternatively, may be estimated using an external disturbance observer. In either case, these running resistance torque $T_R$ and engine torque $T_E$ may easily be determined.

A motor/generator torque command value determining block 105 in FIG. 3 determines motor/generator torque command values $T^*_1$ and $T^*_2$ by correcting target motor/generator torques $T^*_{10}$ and $T^*_{20}$ to values within the torque range in which target motor/generator torques $T^*_{10}$, $T^*_{20}$ can be outputted in a case where each target motor/generator torques $T^*_{10}$ and $T^*_{20}$ obtained by motor/generator torque distributing section 104 as described above is in excess of a mechanically output enabled torque range and in a case where the achieved target motor/generator torque $T^*_{10}$ and $T^*_{20}$ is in excess of the battery rated power.

Thus, motor/generator torque command value determining section 105 limits motor/generator torques $T^*_{10}$ and $T^*_{20}$ within an output enabled torque range and limits the same target motor/generator torques to become excessive with respect to the battery rated power. These limitations serve to function to protect a earlier deterioration of motor/generators MG1 and MG2 and to protect a demand exceeding the battery rated power from deteriorating the battery at an early timing.

One example of an algorithm executed by motor/generator torque command value determining section 105 in which target motor/generator torques $T^*_{10}$, $T^*_{20}$ are corrected to values within the output enabled operating enabling (operable) range to determine motor/generator torque command value $T^*_1$ and $T^*_2$ will be described in details with reference to an operational flowchart shown in FIG. 9.

At a step S20, motor/generator torque command value determining section 105 determines whether each of target motor/generator toques $T^*_{10}$ and $T^*_{20}$ is within the mechanically output enabled torque range and is within the operable region not exceeding the battery rated power.

The operable region of target motor/generator torques $T^*_{10}$ and $T^*_{20}$ will be described with reference to two-dimensional coordinates of FIG. 10, with torque $T_1$ of first motor/generator taken along a lateral axis of FIG. 10 and torque $T_2$ of second motor/generator MG2 taken along a longitudinal axis of FIG. 10.

In details, the following relationship is established from among battery charge-and-discharge quantity $P_B$, revolution speed $\omega_1$ and torque $T_1$ of first motor/generator $MG_1$, and revolution speed $\omega_2$ and torque $T_2$ of second motor/generator $MG_2$.

$$P_B = \omega_1 T_1 + \omega_2 T_2 \quad (15).$$

It is noted that the present engine (revolution) speed $\omega_1$ and output revolution speed $\omega_o$ are detectable. Using equation (15), a region FA which is a region in which the drive torque and engine revolution speed fall within the battery rated power from the range of battery charge-and-discharge quantity $P_B$ is obtained as shown in FIG. 10. Next, a mechanical operation range of composite current two-layer motor 3 can be determined as a region FB shown in FIG. 10 as appreciated from the following explanation. That is to say, in the case of composite current two-layer motor 3, the following relationship is present between revolution speeds $x_1$ and $\omega_2$ of the first and second motor/generators MG1 and MG2 and mechanical torque maximum values $T_{1max}$ and $T_{2max}$. Torque maximum value $T_{1max}$ of first motor/generator MG1 is expressed by a non-linear function f, of torque maximum value $T_{2max}$ of second motor/generator MG2 and of revolution speeds $\omega_1$ and $\omega_2$ of both motor/generators MG1 and MG2.

$$T_{1max} = f_1(T_{2max}, \omega_1, \omega_2) \quad (16).$$

Using equation (16), from the present revolution speeds $\omega_1$ and $\omega_2$ of first and second motor/generators MG1 and MG2, a relationship between mechanical torque maximum values $T_{1max}$ and $T_{2max}$ of first and second motor/generators MG1 and MG2 is obtained. From this relationship, a mechanical operation range of composite current two-layer motor 3 can be obtained as denoted by region FB of FIG. 10.

Figure 10:
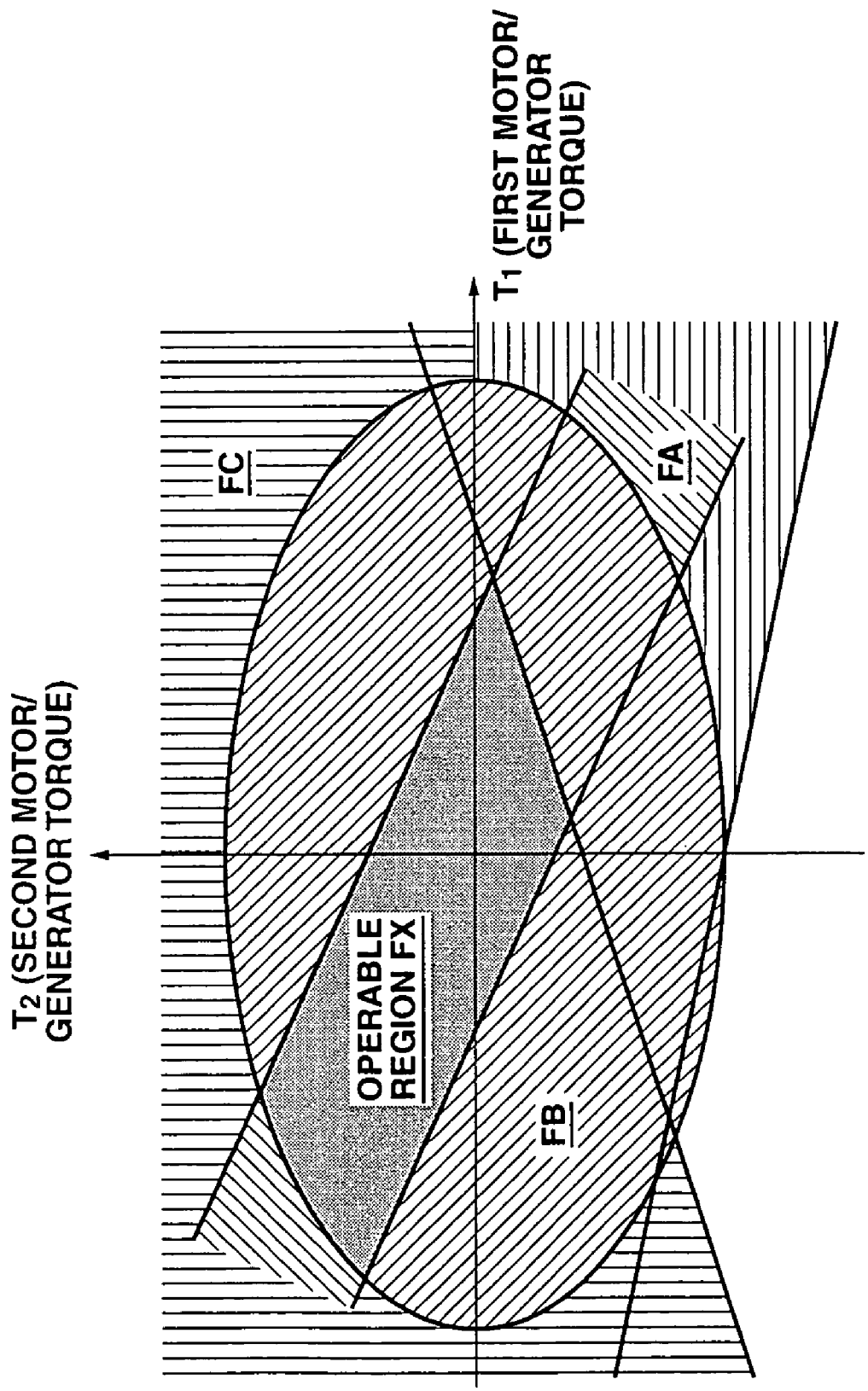
FIG. 10 is a regional diagrammatical view illustrating an operable region of motor/generators.

Furthermore, in order to prevent engine (input) revolution acceleration (shift speed) from being placed in the proximity to zero by a predetermined value $y_{min}$ when target motor/generator torques $T^*_{10}$ and $T^*_{20}$ are corrected, a torque range of first and second motor/generators MG1 and MG2 at a time when engine (input) revolution acceleration indicates a value toward the engine revolution speed acceleration side than the predetermined value $y_{min}$ at a time when the ante-correction target motor/generator torques $T^*_{10}$ and $T^*_{20}$ are achieved is determined as a region FC in FIG. 10. This region FC is set using equation (11) so as to satisfy the following conditions.

If $b_{11}T_R + b_{12}T_E + b_{13}T^*_{10} + b_{14}T^*_{20} \leq 0$, $b_{11}T_R + b_{12}T_E + b_{13}T_1 + b_{14}T_2 \leq y_{min}$ (17).

If $b_{11}T_R + b_{12}T_E + b_{13}T^*_{10} + b_{14}T_2 \leq 0$, $b_{11}T_R + b_{12}T_E + b_{13}T_1 + b_{14}T_2 \leq y_{min}$ (18).

It is noted that the above-described predetermined value $y_{min}$ may be set as follows:

$$y_{min} = ky \frac{\sigma_y}{[\sigma_y] + \varepsilon_y}, \quad (19)$$

wherein σy: a deviation between target input revolution speed and actual input revolution speed, εy: a positive constant to make continuous $y_{min}$ when σy=0, and Ky denotes a positive constant obtained by experiments or computer simulation.

A region FX on which the above-described region FA in the two-dimensional coordinate, region FB, and region FC are overlapped, on the two-dimensional coordinates of both of motor/generator torques shown in FIG. 10 is the above-described operable region. In a case where three conditions described below are satisfied, target motor/generator torques $T^*_{10}$, $T^*_{20}$ fall in the operable region FX.

(Condition 1)

The battery charge-and-discharge quantity $P_B$ obtained by substituting target motor/generator torques $T^*_{10}$ and $T^*_{20}$ into equation (15) is equal to or below a battery rated power.

(Condition 2)

Target motor/generator torque $T^*_{10}$ is smaller than torque maximum value $T_{1max}$ of first motor/generator MG1 obtained by substituting target motor/generator torques $T^*_{20}$ into equation (16) and target motor/generator torque $T^*_{20}$ is smaller than torque maximum value $T_{2max}$ of motor/generator torque MG2 obtained by substituting target motor/generator torque $T^*_{10}$ into equation (16).

(Condition 3)

If $b_{11}T_R + b_{12}T_E + b_{13}T^*_{10} + b_{14}T^*_{20} \geq 0$, target motor/generator torques $T^*_{10}$ and $T^*_{20}$ satisfy the relationship of equation (17) and, if $b_{11}T_R + b_{12}T_E + b_{13}T^*_{10} + b_{14}T^*_{20} \leq 0$, target/motor generator torques $T^*_{10}$ and $T^*_{20}$ satisfy the equation (18).

Figure 9:
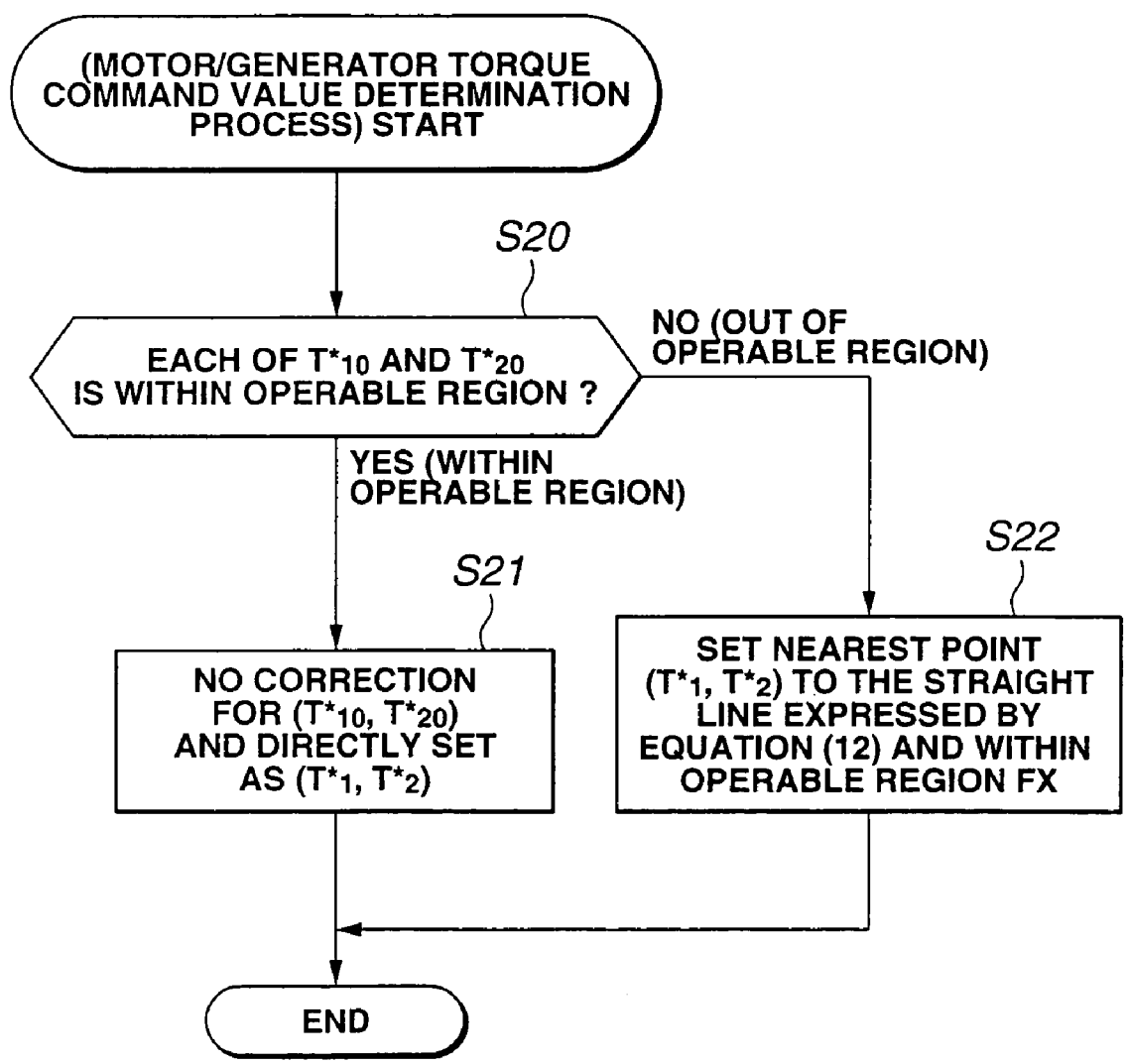
FIG. 9 is an operational flowchart representing a control program related to a correction procedure of a target motor/generator torque executed by a motor/generator torque command value correcting section shown in FIG. 3.

At a step S20 in FIG. 9, motor/generator torque command value determining section 105 determines whether the above-described three conditions are satisfied and both of target motor/generator torques $T^*_{10}$ and $T^*_{20}$ fall within operable region FX shown in FIG. 10.

If both of target motor/generator torques $T^*_{10}$ and $T^*_{20}$ fall within the operable region FX at step S20, the routine goes to a step S21. At step S21, motor/generator torque command value determining section 105 directly sets target motor/generator torques $T^*_{10}$ and $T^*_{20}$ without correction as motor/generator torque command values $T^*_1$ and $T^*_2$. If target motor/generator command values $T^*_{10}$ and $T^*_{20}$ are out of operable region FX, at a step S22, motor/generator torque command value determining section 105 corrects target motor/generator torques $T^*_{10}$ and $T^*_{20}$ to values within operable region FX in such a manner that a variation of the drive torque is minimized and sets the corrected target motor/generator torques $T^*_{10}$ and $T^*_{20}$ as motor/generator torque command values $T^*_1$ and $T^*_2$.

The correction procedures carried out at steps S21 and S22 of FIG. 9 for target motor/generators $T^*_{10}$ and $T^*_{20}$ will hereinafter be described on the basis of FIG. 11 in which operable region FX is extracted from FIG. 10.

Figure 11:
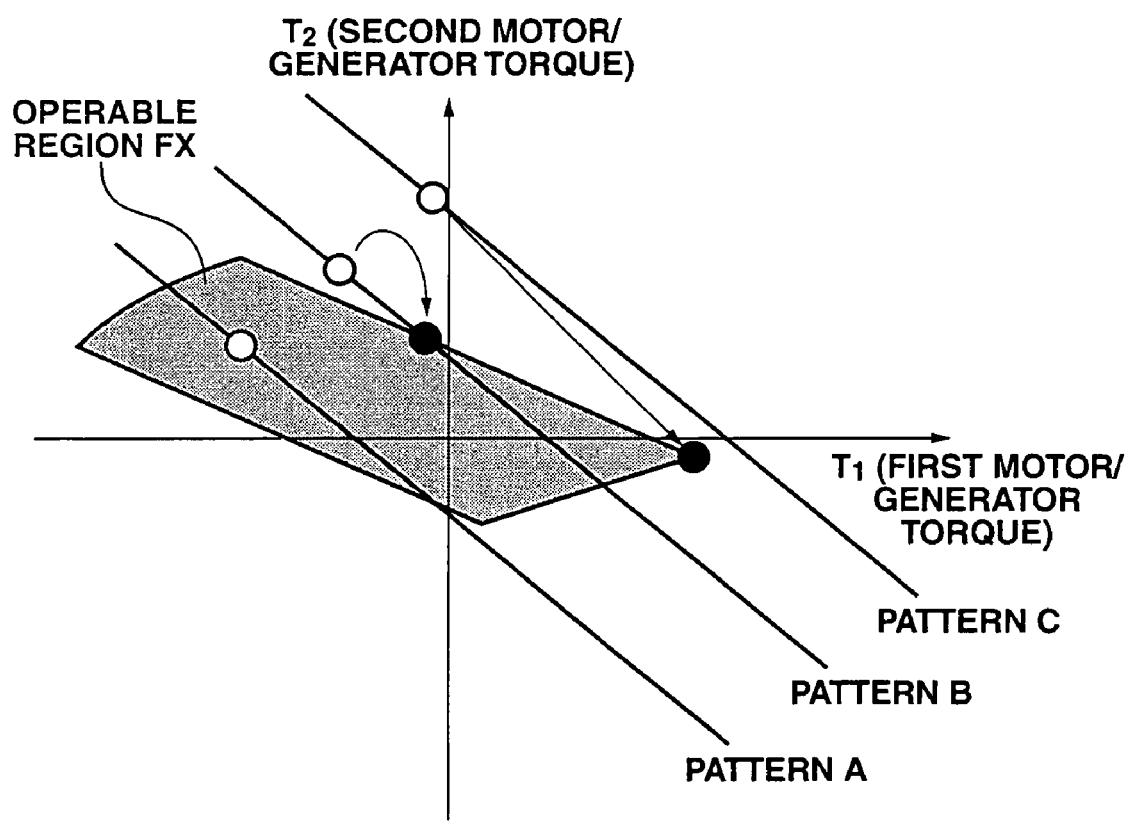
FIG. 11 is a diagram representing a correcting practice of the target motor/generator torques executed by motor/generator torque command value determining section shown in FIG. 3.

In FIG. 11, o denotes an ante-correction operating point which is a combination of target motor/generator torques $T^*_{10}$ and $T^*_{20}$ which are before the correction processing and • denotes a post-correction operating point which is a combination of motor/generator torque command values of $T^*_1$ and $T^*_2$. A straight line passing through ante-correction operating point o indicates the combination of motor/generator torques $T_{1\ and\ T2}$ which develops the same drive torque as drive torque To which can be obtained from equation (12) achievable according to the realization of ante-correction target motor/generator torque command values $T^*_{10}$ and $T^*_{20}$.

Patterns on the correction procedures of target motor/generator torques $T^*_{10}$ and $T^*_{20}$ are three patterns of pattern A, pattern B, and pattern C. Individual patterns thereon will be described below.

<<Pattern A>>

This pattern is a case where the ante-correction operating point o (target motor/generator torques $T^*_{10}$ and $T^*_{20}$) is present in operable region FX. In this case, as described above with reference to step S21 of FIG. 9, target motor/generator torques $T^*_{10}$ and $T^*_{20}$ are not corrected and these are set directly as the post-correction motor/generator torque command values $T^*_1$ and $T^*_2$.

<Pattern B>>

Pattern B is a case where ante-correction operating point o (target motor/generator torques $T^*_{10}$ and $T^*_{20}$) is out of operable region FX but an equi(equivalent)—drive torque straight line passing through the ante-correction operating point o is intersected across operable region FX. In this case, at step S22 of FIG. 9, operating point • nearest to ante-correction operating point o and which is on the equi-drive torque straight line passing through the ante-correction operating point o and falls within the operable region FX is set as a post-correction operating point. The motor/generator torque command values $T_1$ and $T_2$ at this post-correction operating point ? are post-correction motor/generator torque command values $T^*_1$ and $T^*_2$. In this case, the drive torque is not changed even by the correction of target motor/generator torques $T^*_{10}$ and $T^*_{20}$ which (motor/generator torque command values $T^*_1$ and $T^*_2$).

<Pattern C>>

Pattern C is a case where ante-correction operating point o (target motor/generator torques $T^*_{10}$, $T^*_{20}$) falls out of operable region FX and the equi-drive torque straight line is not intersected with the operable region FX. In this case, the operating point which can generate the same drive torque as the drive torque obtained by the achievement of ante-correction target motor/generator torques $T^*_{10}$ and $T^*_{20}$ is not present, Therefore, at step S22 of FIG. 9, the operating point ? which is within the operable region FX and which is nearest to the equi-drive torque straight line passing through ante-operating point o is set as the post-correction operating point. The correction of target motor/generator torques $T^*_{10}$ and $T^*_{20}$ are corrected so that motor/generator torques $T_1$ and $T_2$ at this post-correction operating point ? is set as the post-correction motor/generator torque command values $T^*_1$ and $T^*_2$. In this case, the variation in the drive torque along with the correction of target motor/generator torques $T^*_{10}$ and $T^*_{20}$ (motor/generator torque command values $T^*_1$ and $T^*_2$) can be suppressed at minimum.

According to the corrections of target motor/generator torques $T^*_{10}$ and $T^*_{20}$ described above, if the combination of target torques $T^*_{10}$ and $T^*_{20}$ of both motor/generators MG1 and MG2 (ante-correction operating point o in FIG. 11), as described in pattern A and pattern C, is out of operable region FX determined according to the rated-power of the battery and the capabilities of motor/generators MG1 and MG2, this combination is corrected to the value within operable region FX to provide a combination of motor/generator torque command values $T^*_1$ and $T^*_2$. (post-correction operating point • of FIG. 11). This combination contributes on the control over motor/generators. Therefore, drive commands which exceed the capabilities of motor/generators MG1 and MG2 themselves and the rated power of the battery are not received. Consequently, reductions of the life of the battery and of durability of motor/generators MG1 and MG2 can be avoided.

When the corrections of target motor/generators $T^*_{10}$ and $T^*_{20}$ are carried out, the corrections are made so that the polarities of the drive torque and engine (input) revolution acceleration according to the post-correction motor/generator torque command values $T^*_1$ and $T^*_2$ are the same as the drive torque and engine (input) revolution acceleration by means of ante-correction target motor/generator torques $T^*_{10}$ and $T^*_{20}$. The generation of the drive torque and the engine (input) revolution acceleration which are opposite to the desired drive torque and the desired engine (input) revolution acceleration by means of the ante-correction target motor/generator torques can be avoided. An unnatural variation in the drive torque and shift speed can be prevented and unpleasant vehicular acceleration/deceleration and the problems on the transmission quantity having the sense of incompatibility can be eliminated.

When the corrections of target motor/generator torques $T^*_{10}$ and $T^*_{20}$ are made, motor/generator torque command values $T^*_1$ and $T^*_2$ are determined to be the same value as the driving torque obtained by the drive torque by means of ante-correction target motor/generator torques $T^*_{10}$ and $T^*_{20}$ or the value within the region which is nearest to the drive torque described above. Hence, even if the correction of target motor/generator torques $T^*_{10}$ and $T^*_{20}$ is made, the variation in the drive torque is present or an unpleasant vehicular acceleration/deceleration feeling can be eliminated with at least the variation in the drive torque minimized.

In addition, when target motor/generator torques $T^*_{10}$ and $T^*_{20}$ are corrected, within a region of the two-dimensional coordinates of $T_{1\ and\ T2}$ in which the engine (input) revolution acceleration d$\omega$i/dt (shift speed) indicates a value toward which the ante-correction revolution acceleration side than predetermined value $y_{min}$ between 0 and ante-correction revolution acceleration obtained by the ante-correction target motor/generator torques $T^*_{10}$ and $T^*_{20}$, the correction is carried out so that a difference between the drive torques before and after the corrections of target motor/generator torques $T^*_{10}$ and $T^*_{20}$ is minimized and the target motor/generator torques $T^*_{10}$ and $T^*_{20}$ are corrected to be set as motor/generator torque command values $T^*_1$ and $T^*_2$. Hence, the variation of the drive torque is minimized so that an unpleasant vehicular acceleration or deceleration feeling can be suppressed with the shift speed faster than predetermined value $y_{min}$ maintained even if target motor/generator torques $T^*_{10}$ and $T^*_{20}$ are corrected.

Referring back to FIG. 3, target engine torque correcting section 106 serves to correct target engine torque $T^*_{EO}$ in such a manner that a power needed to the gear shift is provided from the engine. The following relationship is present from among a power Pi required for the revolution speed variation of the revolutional members constituting the power transmission mechanism, engine power $P_E$, motor/generator power $P_B$, and drive power Po.

$$P_E + P_B = P_i + P_o \quad (20).$$

Hence, even when the revolution speed of any revolutional member in the hybrid transmission such as during the shift operation, it is necessary to supply the power needed for the gear shift by means of engine ENG or motor/generators MG1 and MG2 in order to achieve the target drive (driving) torque.

However, since motor/generator power $P_B$ is equal to battery charge-and-discharge quantity, a load on the battery is increased when the power required for the shift by means of motor/generators MG1 and MG2 and there is a possibility that the increase of the load exceeds the battery rated power. Because motor/generators MG1 and MG2 compensates for the lack of engine power due to a lag with respect to the target value of the engine torque. Therefore, the power required for the shift is supplied from the engine. It is noted that, as in the case of the hybrid transmission in the first embodiment, the power from a plurality of power sources using the differential unit constituted by the planetary gear mechanism is outputted to the drive axle, a revolutional system kinetic energy as conventional transmission is often not monotonously varied according to the gear ratio depending upon a specification of the hybrid transmission.

Figure 12A:
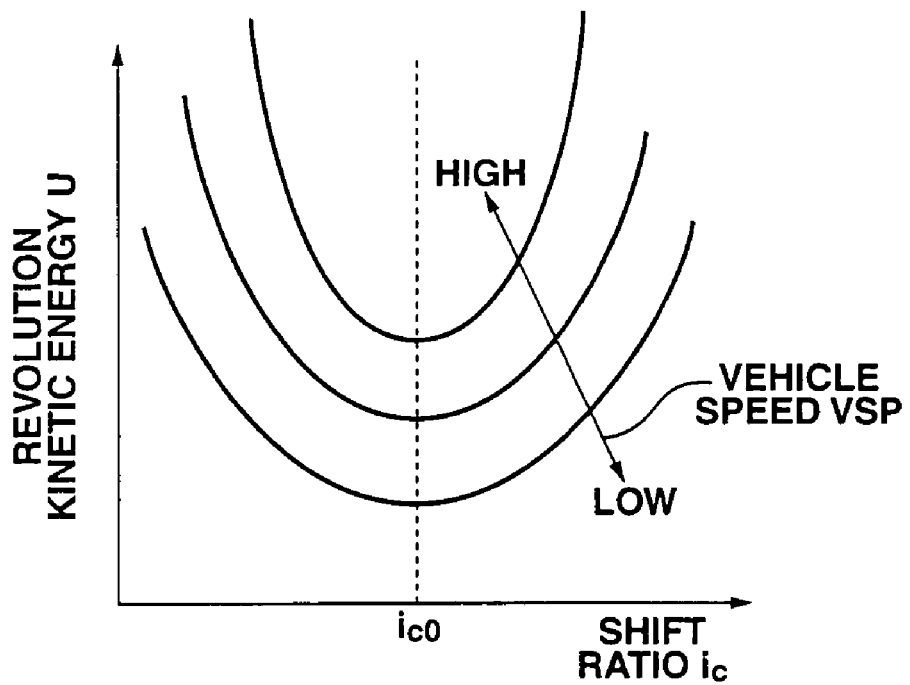
FIGS. 12A and 12B, representing a variation situation of a revolutional energy during the shift operation of the revolutional members in the hydraulic transmission and a diagram representing a relationship between the revolition energy and the gear ratio and a variation rate with respect to the gear shift ratio of the revolution energy.
Figure 12B:
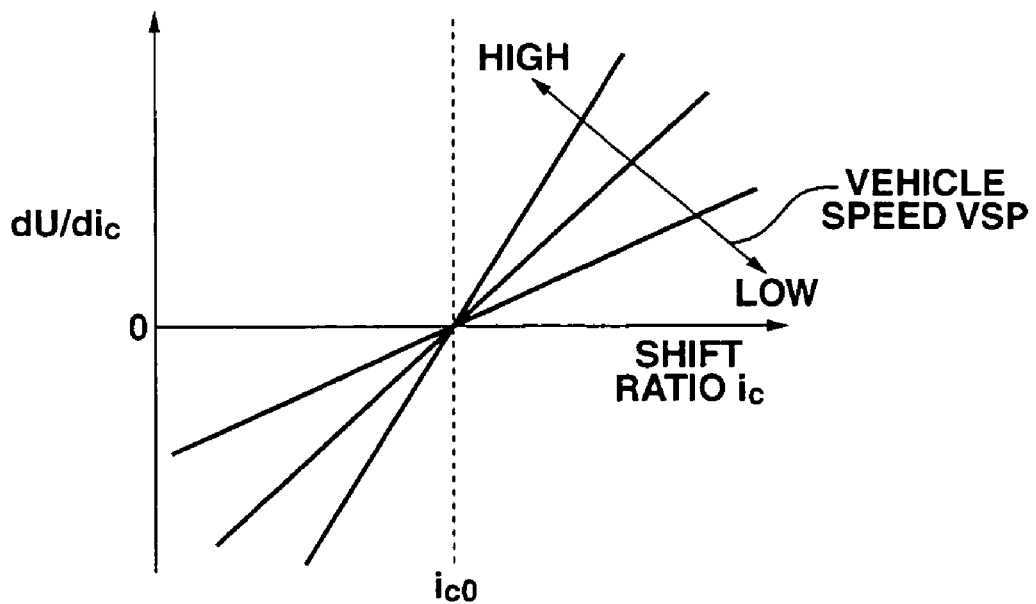

The relationship between the gear shift ratio $i_c$ of the hybrid transmission and kinetic energy U is as shown in FIG. 12A. The revolutional kinetic energy U takes a minimum value at a certain predetermined gear ratio $i_{co}$. Hence, in the conventional transmission, although the sign of the revolution kinetic energy variation is the same provided that the direction of the shift is constant, In the case of the hybrid transmission, even if the shift direction is constant, the direction of the revolutional kinetic energy variation is changed with a shift ratio of $i_{co}$ as a boundary, as shown in FIG. 12B. Therefore, in a case where the engine serves to compensate for the required power, a sign of a compensation quantity is needed to be reversed with the shift ratio of $i_{co}$ as a boundary. Herein, the compensation quantity when the power required for the gear shift is provided by the engine is calculated. The kinetic energy U of the revolutional system of the hybrid-transmission can be expressed in the following equation.

$$U = \sum_{j=1}^{n} \frac{1}{2} I_j \omega_j^2, \quad (21)$$

Wherein n denotes the number of revolutional members in the hybrid transmission. If the kinetic energy U described in equation (21) is differentiated with respect to time, the following equation can be obtained, $$\frac{dU}{dt} = \sum_{j=1}^{n} I_j \omega_j. \quad (22)$$

In equation (22), the revolution speed of each revolutional member due to the constraint of the revolution speeds of the planetary gear mechanism is given by a linear coupling between engine revolution speed $\omega i$ and output revolution speed $\omega o$.

$$\frac{dU}{dt} = \left( m_{ii} \frac{d\omega_i}{dt} + m_{oi} \frac{d\omega_o}{dt} \right) \omega_i + \left( m_{io} \frac{d\omega_i}{dt} + m_{oo} \frac{d\omega_o}{dt} \right) \omega_o. \quad (23)$$

In equation (23), $m_{ii}$, $m_{io}$, $m_{oi}$, and $m_{oo}$ denotes constants determined according to the specifications of the hybrid transmission.

dU/dt expressed in equation (23) is a power Pi required for the shift and $d\omega i/dt$ in equation (23) is the post-correction target engine revolution speed, or obtained from equation (11), or $d\omega_o/dt$ can be obtained from the following equation (24).

$$\frac{d\omega_o}{dt} = b'_{11} T_R + b'_{21} T_E + b'_{13} T_1 + b'_{14} T_2. \quad (24)$$

In equation (24), $b'_{21}$, $b'_{22}$, $b'_{23}$, and $b'_{24}$ denote constants determined according to the specifications of the hybrid transmission. Target engine torque T*EO is corrected as follows to determine engine torque command value $T^*_E$ in order to provide the engine for the power required for the shift.

$$T^*_E = T^*_{EO} + \frac{p_i}{\omega_i}. \quad (25)$$

If equation (25) is used, the sign of compensation quantity of the power required for the shift is automatically changed with the shift ratio $i_{co}$ as a boundary. The shift ratio $i_{co}$ is determined using equation (23). As expressed in the following equation (26), the shift ratio when dU/dt=0 is a kinetic energy minimum gear shift ratio $i_{cO}$.

$$i_{co} = -\frac{m_{ii} \frac{d\omega_i}{dt} + m_{oi} \frac{d\omega_o}{dt}}{m_{io} \frac{d\omega_i}{dt} + m_{oo} \frac{d\omega_o}{dt}} = -\frac{m_{ii} + m_{oi} \frac{d\omega_o}{d\omega_i}}{m_{io} + m_{oo} \frac{d\omega_o}{d\omega_i}}. \quad (26)$$

As expressed in equation (26), kinetic energy minimum shift ratio $i_{co}$ is dependent upon input revolution acceleration $d\omega i/dt$ and output revolution acceleration $d\omega_o/dt$. However, during the shift at which the power required for the shift becomes large, the following assumption can be made:

$$d\omega_o/d\omega_i = 0 \quad (27).$$

Using equation (26), kinetic energy minimum gear shift ratio $i_{co}$ may be the constant.

$$i_{co} = -\frac{m_{ii}}{m_{io}}. \quad (28)$$

In a case of the hybrid transmission in which an engine clutch which is clutched or released between engine ENG and hybrid transmission, each value of $m_{ii}$, $m_{io}$, $m_{oi}$, and $m_{oo}$ is different dependent upon the clutch state and release state. Consequently, as appreciated from equations (26) and (28), kinetic energy minimum shift ratio $i_{co}$ is different depending upon the clutched state of engine clutch.

In the first embodiment of the shift control apparatus, as described above with reference to FIG. 7C and FIG. 8 (step S14), if the combination of target drive (or driving) torque $T^*_{oO}$ and target engine (input revolution acceleration $u_{io}$ is out of realizable region A, these target drive (driving) torque $T^*_{oO}$ and target engine (input) revolution acceleration $u_{io}$ are corrected so as to change the values within realizable region A and to be set as drive torque command value $T^*_{oO}$ and engine (input) revolution acceleration command value $u_i$ to contribute to controls of engine ENG and motor/generators MG1 and MG2. Hence, an earlier deterioration of the battery developed in the case where target drive (driving) torque $T^*_{oO}$ and target engine (input) revolution acceleration $u_{io}$ which are out of realizable region A directly contribute on the controls of engine ENG and motor/generators MG1 and MG2 can be prevented.

Then, when target drive (driving) torque $T^*_{oO}$ and target engine (input) revolution acceleration $u_{io}$ are corrected to the values within realizable region A, both signs (polarities) of the corrected drive torque command value $T^*o$ and engine (input) revolution acceleration command value $u_i$ are not changed from those of target drive (driving) torque $T^*_{oO}$ and target engine (input) revolution acceleration $u_{io}$. Hence, if post-correction drive torque command value $T^*o$ and engine (input) revolution acceleration command value $u_i$ are used for the controls of engine ENG and motor/generators MG1 and MG2, the shift speed (engine (input) revolution acceleration) is not reversed in the opposite direction that the driver has expected, the situation in which the input revolution speed change which is opposite to the driver's expectation from the driving operation occurs can be avoided, and the anxiety such that the shift gives unpleasant feeling to the driver can be eliminated.

Second Embodiment

FIGS. 13A through 13D and FIG. 14 show a correction processing on the target drive (driving) torque and target engine (input) revolution acceleration of the shift control apparatus in a second embodiment according to the present invention. FIGS. 13A through 13D and FIG. 14 correspond to the realizable region diagrams and flowchart of FIGS. 7A through 7C and FIG. 8.

In the second embodiment, since the structure of the hybrid transmission, the shift control system, and block diagrams dependent on the shift control function are the same as those of the first embodiment shown in FIGS. 1 through 3, the explanations thereof will herein be omitted. Only the correction method of target drive (driving) torque $T^*_{oO}$ and target engine acceleration $u_{io}$ will be explained with reference to the realizable region diagram in FIGS. 13A through 13D and with reference to the control program shown in FIG. 14.

In FIGS. 13A, 13B, 13C, and 13D, the target operating point represented by ante-correction target drive (driving) torque $T^*_{oO}$ and target engine (input) revolution acceleration $u_{io}$ are denoted by the white circle ? and the command operating point represented by the post-correction drive torque command value $T^*o$ and target engine (input) revolution acceleration $u_i$ is denoted by the black circle •. Target operating point o shown in FIG. 13A indicates a running state without the shift by a certain target drive (driving) torque $T^*_{oO}$ (engine (input) revolution acceleration (d/dt) $\omega i = 0$). Thereafter, when the accelerator pedal is depressed, target operating point o is moved as denoted by a broken line of FIG. 13B. However, since target operating point o is placed within realizable region A in FIG. 13B, the correction of target derive torque $T^*_{oO}$ and target engine (input) revolution acceleration $u_{io}$ is not carried out. Thereafter, when target operating point o is furthermore moved as denoted by a broken line shown in FIG. 13C, target operating point o is out of realizable region A so that the combination of target drive (driving) torque $T^*_{oO}$ and target engine (input) revolution acceleration $u_i$, which correspond to earliest cannot only be achieved but also does not fall within the rated power of the battery. Consequently, the reduction of the life of the battery is introduced. In this case, target value correcting section 103, on the two-dimensional coordinate of drive torque To and two-dimensional coordinate of engine (input) revolution acceleration (d/dt)$\omega i$ shown in FIG. 13C, derives in the following way command operating point • on the basis of target operating point o corresponding to the combination of target drive (driving) torque $T^*_{oO}$ and target engine (input) revolution acceleration $u_{io}$. Then, target value correcting section 103 sets drive torque $T^*o$ and engine (input) revolution acceleration $u_i$ at this command operating point • as the drive torque command value and the engine (input) revolution acceleration command value.

When command operating point • is determined, since a degree of requirement of the achievement of target drive (driving) torque $T^*_{oO}$ is higher than target engine (input) revolution acceleration $u_{io}$ particularly when such a shift that both of target driver torque $T^*_{oO}$ and target engine (input) revolution acceleration $u_{io}$ are abruptly varied occurs. Hence, target drive (driving) torque $T^*_{oO}$ is not corrected but is directly set as drive torque command value $T^*o$ but engine (input) revolution acceleration $u_{io}$ is corrected. Thus, target operating point o which corresponds to the combination of target drive (or driving) torque $T^*_{oO}$ and target engine (input) revolution acceleration $u_{io}$ is moved by a minimal displacement within realizable region A. At this time, a point • to which above described point ? is moved by minimal displacement is set as command operating point. In more details, a point • which is nearest to target operating point o, which is within realizable region A, and which is on a line segment (a line segment by which target drive (or driving) torque $T^*_{oO}$ is maintained) passing through target operating point o corresponding to the combination of target drive (driving) torque $T^*_{oO}$ and target engine (input) revolution acceleration $u_{io}$ and denoted by a dot-and-dash line parallel to an engine (input) revolution acceleration axis which is a longitudinal axis of FIG. 13C is the command operating point. The drive torque T*o and engine (input) revolution acceleration $u_{io}$ at this point of is set as the drive torque command value and the engine (input) revolution acceleration command value. Thereby, during the shift operation, while compensating for the achievement of target drive (driving) torque T*o whose degree of importance is high, a minimum correction of only target engine (input) revolution acceleration $u_{io}$ can move target operating point o to command operating point • within realizable operating region A.

When target operating point o corresponding to target drive (driving) torque $T^*_{oO}$ and target engine (input) revolution acceleration $u_{io}$ furthermore moved as a broken line shown in FIG. 13D, post-correction engine (input) revolution acceleration command value indicates a small value as denoted by $y_2$ derived in the way described with reference to FIG. 13C. Thus, this command value becomes smaller than preset engine revolution (input) acceleration lower limit set value $y_{min}$. In this way, if engine (input) revolution acceleration command value $u_i$ which becomes smaller than lower limit set value $y_{min}$ is allowed, engine (input) revolution acceleration command value $u_i$ becomes extremely small so that almost no shift occurs. In worst case, engine (input) revolution acceleration command value $u_i$ indicates a negative value and the situation such that a sense of incompatibility of the shift is developed.

To avoid such a worst case, as shown in FIG. 13D, in a case where target operating point o is moved, a point of intersection between one of two boundary lines prescribing realizable region A which is nearer to target operating point o (which is called a realizable region boundary line) and a line representing engine revolution (input revolution) acceleration lower limit value $y_{min}$ is set as command operating point •. Drive torque T*o and engine (input) revolution acceleration $u_i$ at this command operating point • is set as the drive torque command value and the engine (input) revolution acceleration command value. Therefore, the same action and advantage can be achieved, while avoiding engine (input) revolution acceleration command value $u_i$ which does not become less than engine revolution (input revolution) acceleration lower limit set value $y_{min}$, thus, while the sense of incompatibility for the shift is prevented from occurring, target operating point ? is moved to command operating point ? within the realizable region A with a minimum correction of target drive (driving) torque $T^*_{oO}$ and target engine (input) revolution acceleration $u_{io}$. According to the above-described correction, since the correction of target drive (driving) torque $T^*_{oO}$ and target engine (input) revolution acceleration $u_{io}$ can be made smoothly and continuously, development of unnatural vehicular acceleration shock and the development of the engine revolution speed variation can be prevented.

Figure 14:
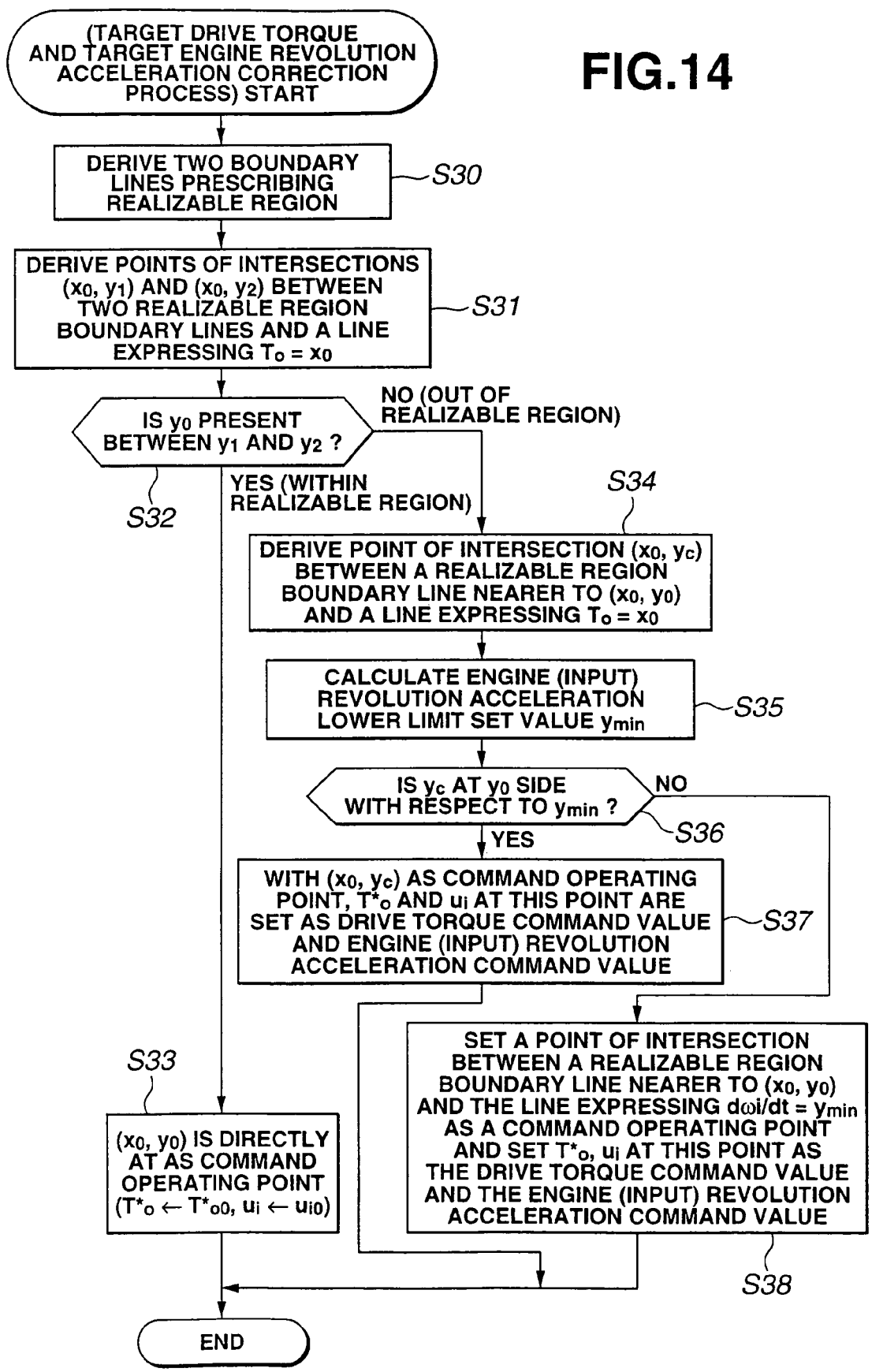
FIG. 14 is an operational flowchart representing a control program related to the correction procedure of the target drive (or driving) torque and target engine (input) revolution acceleration executed by the shift control apparatus shown in FIGS. 13A through 13D.

Target value correcting section 103 executes the above-described correction of target drive (driving) torque $T^*_{oO}$ and target engine (input) revolution acceleration $u_{io}$ (determination of drive torque command value T*o and engine (input) revolution acceleration $u_i$) in accordance with the operational flowchart shown in FIG. 14. That is to say, at a step S30, target value correcting section 103 derives realizable region A represented on the two-dimensional coordinate of drive torque To and engine (input) revolution acceleration (d/dt)ωi shown in FIGS. 13A through 13D in the same process as described at step S10 shown in FIG. 8 and calculates the two boundary lines prescribing this region according to equations (8) and (9). At a step S31, target value correcting section 103 derives points of intersections $(x_0, y_1)$ and $(x_0, y_2)$ between a straight line passing target operating point $(x_0, y_0)$ corresponding to the combination of target drive (driving) torque $x_0$ $(=T^*_{oO})$ and target engine (input) revolution acceleration $y_0$ $(=u_{io})$ shown in FIGS. 13A through 13D and expressed in the following equation and which is parallel to the longitudinal axis, viz., engine (input) revolution acceleration axis of FIGS. 13A through 13D and the two boundary lines prescribing realizable region A as shown in FIGS. 13A through 13D (It is noted that $y_1<y_2$).

$$T_o = T^*_{oO} \tag{29}$$

At a step S32, target value correcting section 103 determines whether $y_0$ is present between $y_1$ and $y_2$. If $y_0$ is present between $y_1$ and $y_2$, the routine goes to a step s33 since the combination of target drive (driving) torque $T^*_{oO}$ and target engine (input) revolution acceleration $u_{io}$ fall within realizable region A as shown in FIGS. 13A and 13B. If $y_0$ is not present between $y_1$ and $y_2$ at step S32, the routine goes to a step S34 since the combination of target drive (driving) torque T*o and target engine (input) revolution acceleration $u_{io}$ is out of realizable region A as shown in FIGS. 13C and 13D.

At step S33 which is selected when the combination of target drive (driving) torque $T^*_{oO}$ and target engine (input) revolution acceleration $u_{io}$ falls within realizable region A, target operating point ? which is the combination of target drive (driving) torque $x_o$ $(=T^*_{oO})$ and target engine (input) revolution acceleration $y_0$ $(=u_{io})$ is directly set as the command operating point. Target drive (driving) torque $T^*_{oO}$ is set directly as post-correction target drive (driving) torque command value $T^*_o$ and target drive engine (input) revolution acceleration $u_{io}$ is directly set as post-correction engine (input) revolution acceleration command value $u_i$.

At step S34 which is selected when the combination of target drive (or driving) torque $T^*_{oO}$ and target engine (input) revolution acceleration $u_{io}$ are out of realizable region A, target value correcting section 103 derives a point of intersection $(x_0, y_c)$ between the realizable region boundary line nearer to target operating point $(x_0, y_0)$ and the line expressing $T_o = x_0$ as shown in FIGS. 13C and 13D. It is noted that the point of intersection $(x_0, y_c)$ is a point wherein target drive (driving) torque $T^*_{oO}$ is not changed but target input revolution acceleration $u_{io}$ is moved to a point of $y_c$ which is within realizable region A and which is nearest to $y_0$. At the next step S35, equation (19) is used to calculate engine (input) revolution acceleration lower limit set value $y_{min}$.

At the next step S36, target value correcting section 103 determines whether $y_c$ is located nearer to $y_0$ side than $y_{min}$ as shown in FIG. 13C. If with reference to $y_{min}$ $y_c$ is located toward $y_0$ side, a sufficient engine (input) revolution acceleration can be obtained (a sufficient shift speed can be obtained) so that the routine goes to a step S37. If, as shown in FIG. 13D, $y_c$ is not located toward $y_c$, the sufficient engine (input) revolution acceleration is not obtained but the above-described problems may occur so that the routine goes to a step S38.

At step S37 selected when the sufficient engine (input) revolution acceleration can be obtained (sufficient shift speed can be obtained), as shown in FIG. 13C, point of intersection $(x_0, y_c)$ is set as command operating point, drive torque T*o and engine revolution speed $u_i$ at this command operating point are set as post-correction drive torque command value $T^*_o$ and post-correction engine (input) revolution acceleration command value $u_i$. At step S38 selected when no sufficient engine (input) revolution acceleration is obtained (no sufficient shift speed is obtained), as shown in FIG. 13D, the point of intersection at which one of the two realizable region boundary lines which is nearer to target operating point ($x_0$, $y_0$) is intersected with the line expressing engine ($d\omega_i/dt$)=$y_{min}$ is set as command operating point. At this command operating point, drive torque $T^*_o$ and engine acceleration $u_i$ are set, respectively, as post-correction drive torque command value $T^*_o$ and post-correction engine (input) revolution acceleration command value $u_i$.

The polarities (signs) of post-correction drive torque command value $T^*_o$ and engine (input) revolution acceleration command value $u_i$ are the same as those of target drive (driving) torque $T^*_{oO}$ and target engine (input) revolution acceleration $u_{io}$ in the same way as described in the first embodiment. Hence, the same action and advantages as described in the first embodiment can be achieved. While engine (input) revolution acceleration command value $u_i$ is not smaller than engine (input) revolution acceleration (input revolution) lower limit set value $y_{min}$, hence, no sense of incompatibility for the shift is given, target operating point ($x_0$, $y_0$) can be moved to command operating point • within realizable region A with the minimum correction for target drive (driving) torque $T^*_{oO}$ and target engine (input) revolution acceleration $u_{io}$ so that the same action and advantages as the first embodiment can be achieved.

Third Embodiment

Figure 15:
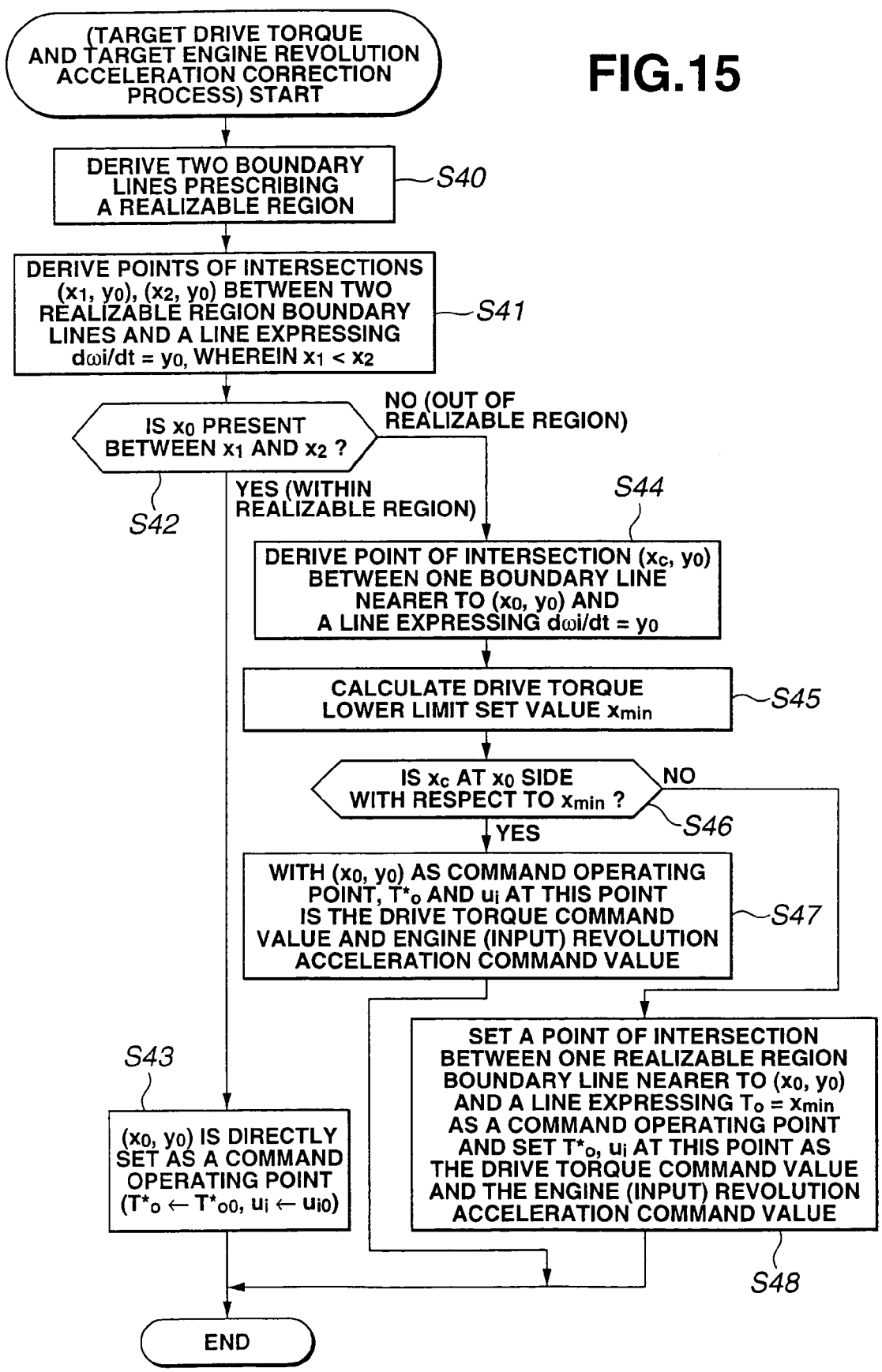
FIG. 15 is an operational flowchart representing a control program related to the correction procedure.

FIG. 15 shows an operational flowchart executed by target value correcting section 103 of the shift control apparatus in a third preferred embodiment according to the present invention, viz., the correction procedure on target drive (driving) torque and target engine (input) revolution acceleration. In the third embodiment, the structure of the hybrid transmission, the shift control system, and shift control function-dependent block diagram are the same as those shown in FIGS. 1 through 3. Hence, these explanations will be omitted herein. The correcting method for only target drive (driving) torque $T^*_{oO}$ and target engine (input) revolution acceleration $u_{io}$ will be described hereinbelow on the basis of the control program shown in FIG. 15.

In the second embodiment shown in FIGS. 13A through 13D and FIG. 14, when target operating point ? which corresponds to the combination of target drive (driving) torque $T^*_{oO}$ and target engine (input) revolution acceleration $u_{io}$ is out of realizable region A, target drive (driving) torque $T^*_{oO}$ is not corrected so much but target engine (input) revolution acceleration $u_{io}$ is mainly corrected. However, in the third embodiment, on contrary to this, target engine (input) revolution acceleration $u_{io}$ is not so corrected but target drive (driving) torque $T^*_{oO}$ is mainly corrected.

The target value correcting section 103 in this embodiment calculates two boundary lines prescribing realizable region A expressed on the two-dimensional coordinates (refer to FIGS. 13A through 13D) of the drive torque $T^*_o$ and engine (input) revolution acceleration ($d/dt$)$\omega i$ at a step S40 shown in FIG. 15, in the same processing as step S30 of FIG. 14. At the next step S41, target value correcting section 103 drives points of intersections ($x_1$, $y_0$) and ($x_2$, $y_0$) between the straight line passing through target operating point ($x_0$, $y_0$) correspond to target drive (driving) torque $x_0$ (=$T^*_{oO}$) and engine (input) revolution acceleration $y_0$ (=$u_{io}$) and parallel to the drive torque axis (lateral axis of FIGS. 13A through 13D) and two realizable region boundary lines (wherein $x_1 < x_2$)=

$$\frac{d\omega_i}{dt} = u_{io}. \tag{30}$$

At a step S42, target value correcting section 103 determines whether $x_0$ falls within an intermediate between $x_1$ and $x_2$. If $x$ is determined to be present between $x_1$ and $x_2$, the routine goes to a step S43 since the combination of target drive (driving) torque $T^*_{oO}$ and target engine (input) revolution acceleration $u_{io}$ falls within realizable region A. If $x_0$ is determined not to fall between $x_1$ and $x_2$, since the combination of target drive (driving) torque $T^*_{oO}$ and target engine (input) revolution acceleration $u_{io}$ is out of realizable region A, the routine goes to a step S44. At step S43 selected when the combination of target drive (driving) torque $T^*_{oO}$ and target engine (input) revolution acceleration $u_i$ is within realizable region A, target operating point which is the combination of target drive (driving) torque $x_0$ (=$T^*_{oO}$) and target engine (input) revolution acceleration $y_0$(=$u_{io}$) is set directly to command operating point and target drive (driving) torque $T^*_{oO}$ is set directly as post-correction drive torque command value $T^*_o$, and target drive engine (input) revolution acceleration $u_{io}$ is directly set as post-correction engine (input) revolution acceleration command value $u_i$.

At step S44 selected when the combination of target drive (driving) torque $T^*_{oO}$ and target engine (input) revolution acceleration $u_{io}$ is out of realizable region A, target value correcting section 103 derives the point of intersection ($x_c$, $y_0$) between one of the two boundary lines prescribing the realizable region which is nearer to target operating pint ($x_o$, $y_o$) and the line expressing ($d/dt$)$\omega i$=$y_0$. It is noted that the point of intersection ($x_c$, $y_0$) is a point with target input revolution acceleration $u_{io}$ unchanged and target drive (driving) torque $T^*_{oO}$ is moved to a point $x_c$ within realizable region A which is nearest to $x_0$. At the next step S45, a drive torque lower limit set value $x_{min}$ is calculated using the following equation.

$$X_{\min} = Kx \cdot \frac{\sigma_x}{|\sigma_x| + \varepsilon_x}. \tag{31}$$

It is noted that $\sigma_x$ denotes a deviation between target engine (input) revolution speed and actual input revolution speed, $\varepsilon_x$ denotes a positive constant with $\sigma_x$=0 continuous for $x_{min}$. $Kx$ denotes a positive constant obtained, for example, by a previously experiments and computer simulations.

At the next step S46, target value correcting section 103 determines whether $x_c$ is located toward $x_0$ side with respect to $x_{min}$. If $x_c$ is located toward $x_0$ side with respect to $x_{min}$, the sufficient drive torque can be obtained and the routine goes to a step S47. If $x_c$ is not located toward $x_0$ side, a sufficient drive torque cannot be obtained and the routine goes to a step S48. At step S47 selected when the sufficient drive torque is obtained, the point of intersection ($x_c$, $y_0$) is the command operating point and drive torque $T^*o$ and engine (input) revolution acceleration $u_{io}$ at this command operating point is set to post-correction drive torque command value $T^*o$ and post-correction engine (input) revolution acceleration command value $u_i$. At step S48 selected when no sufficient drive torque is obtained, a point of intersection between one of the two realizable region boundary lines which is nearer to target operating point ($x_0$, $y_0$) and the line expressing drive torque To=$x_{min}$ is the command operating point. The drive torque T*o and engine (input) revolution acceleration command value $u_i$, respectively, at this command operating point, are set to post-correction drive torque command value T*$_o$ and post-correction engine (input) revolution acceleration command value $u_i$.

Hence, post-correction drive torque command value T*o and engine (input) revolution acceleration command value $u_i$ have respectively the same polarities of target drive (driving) torque T*$_{oO}$ and target engine acceleration $u_{io}$ as described in the second embodiment. The same action and advantages can be achieved. While drive torque command value T*o is smaller than predetermined drive torque limit value set value $x_{min}$, target operating point ($x_o$, $y_o$) can be moved to the command operating point within realizable region A with minimum correction of target drive (driving) torque T*$_{oO}$ and target engine (input) revolution $u_{io}$.

Fourth Embodiment

Figure 16:
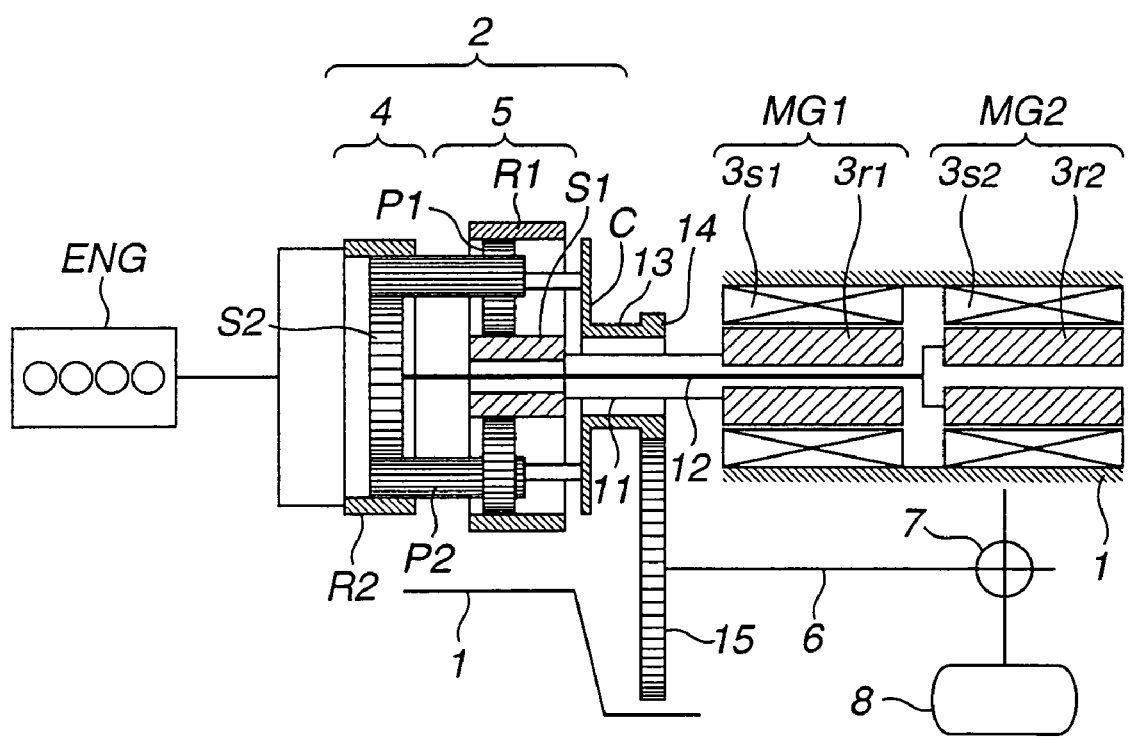
FIG. 16 is a diagrammatical view of a structure corresponding to FIG. 1A of the hybrid transmission in a third preferred embodiment of the shift control apparatus according to the present invention.

FIG. 16 shows another type of hybrid transmission in which motor/generators MG1 and MG2 are individually and independently installed as different from motor/generators MG1 and MG2 which is constituted by compound current two-layer motor 3. That is to say, circular ring shaped stators 3s1 and 3s2 are coaxially arranged and fixedly mounted within transmission casing 1, and rotors 3r1 and 3r2 are revolutionally supported by means of stators 3s1 and 3s2. Circular ring shaped stator 3S1 and rotor 3r1 constitute first motor/generator MG1 near to engine ENG and circular ring shaped stator 3s2 and rotor 3r2 constitute second motor/generator MG2 which is located far away from engine ENG.

Motor/generators MG1 and MG2 function as respectively motors in accordance with a supply current when a current is supplied to ring shaped stators 3s1 and 3s2, individually, in an individual direction. When no current is supplied, each generator is acted which develops the electrical power in accordance with the revolution by means of an external force.

When motor/generators MG1 and MG2 are coupled to Ravigneaux type planetary gear set 2, rotor 3r2 of first motor/generator MG1 is coupled to sun gear S1 of Ravigneaux type planetary gear set via axle 11 and a rotor 3r2 of second motor/generator MG2 is coupled to sun gear S2 via axle 12.

Figure 17:
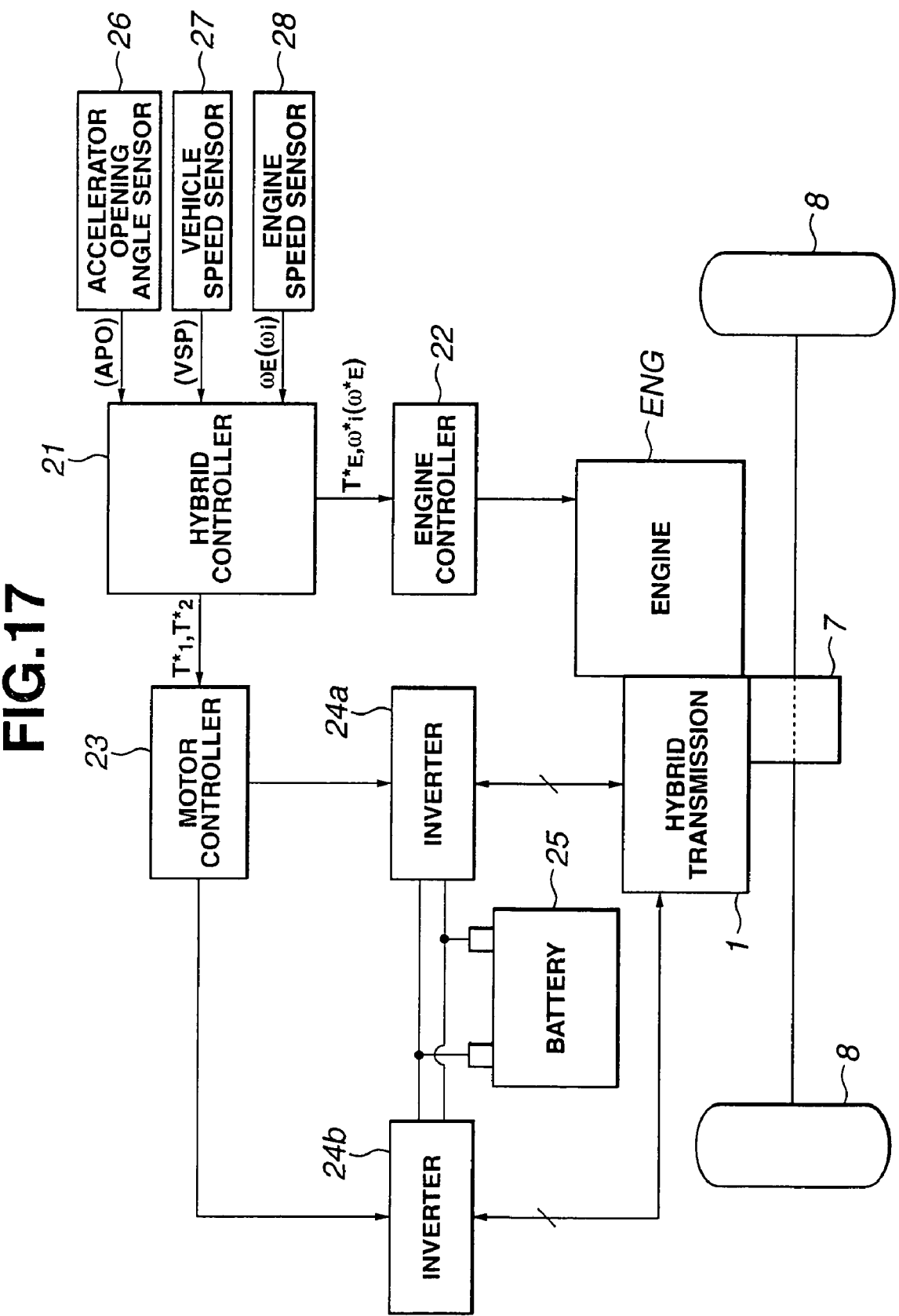
FIG. 17 is a block diagram representing a control system of the hybrid transmission to which the shift control apparatus according to the present invention is applicable.

In a case where the hybrid transmission is used having the above-described motor/generators MG1 and MG2 as shown in FIG. 16. a control current of motor/generators MG1 and MG2 is required to be supplied to ring shaped stators 3s1 and 3s2 individually. Hence, the control system is as shown in FIG. 17 in place of those shown in FIG. 12. That is to say, in the case of FIG. 2, a single inverter common to both motor/generators MG1 and MG2 is only installed. However, in the case of FIG. 17, an inverter 24a for ring shaped stator 3s1 of the first motor/generator MG1 and an inverter 24b for ring shaped stator 3s2 is individually installed for ring shaped stator 3s2 of second motor/generator MG2.

In this embodiment, hybrid controller 21 is shown in the form of functional block diagram as shown in FIG. 3. In this embodiment, however, the processes in target value correcting section 103 and motor/generator command value determining section 105 are different from that shown in FIG. 3.

The process at target value correcting section 103 is, in the same way as described in first, second, and third embodiments, such that, in a case where the target operating point corresponding to the combination of target drive (driving) torque and target engine (input) revolution acceleration is out of realizable region on the two-dimensional coordinate on the drive torque and engine (input) revolution acceleration, these target drive (driving) torque and/or target engine (input) revolution acceleration are corrected to the drive torque command value and engine (input) revolution acceleration command value on the command operating point within the realizable region. In this preferred embodiment, the realizable region on the two-dimensional coordinates on the drive torque and engine (input) revolution acceleration is different from realizable region denoted by A shown in FIGS. 6, 7A through 7C, and 13A through 13D, as will be described below.

Figure 18:
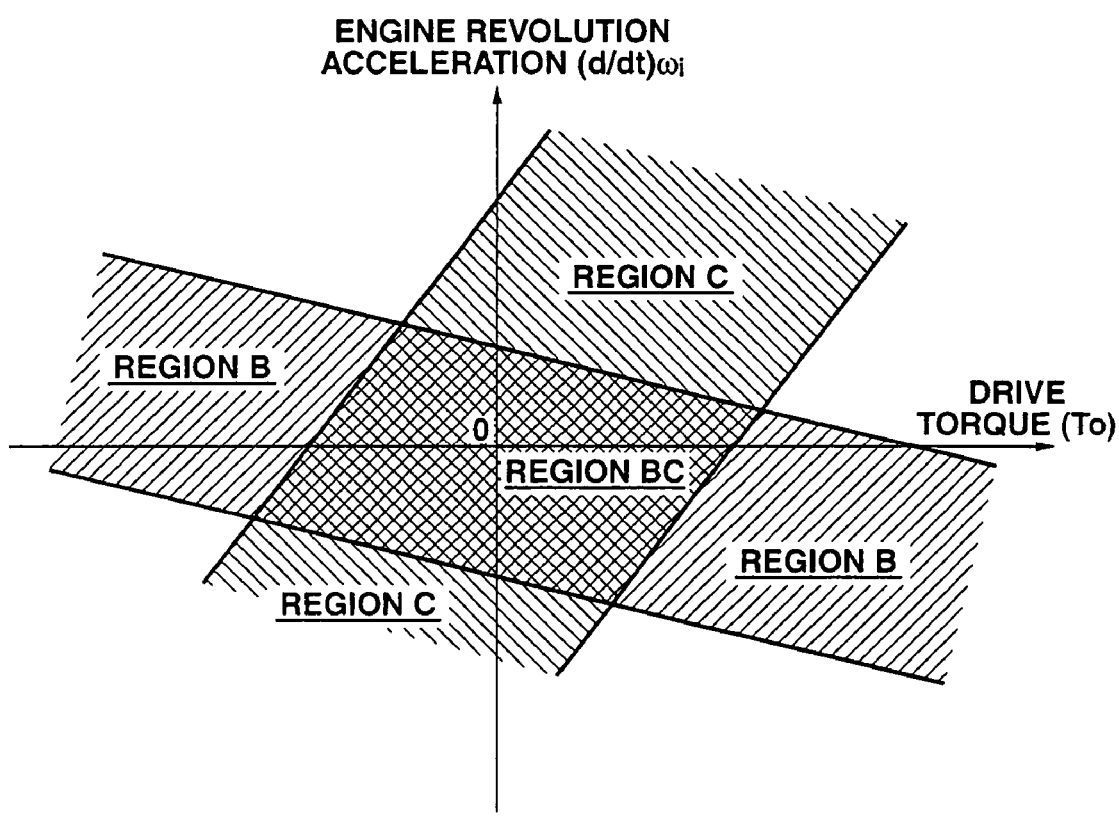
FIG. 18 is a diagrammatical view of regions shown on a two-dimensional coordinate of the engine (input) revolution acceleration and the drive torque of a realizable region by means of motor/generators in the hybrid transmission shown in FIG. 16.

From the relationship among drive torque To, engine (input) revolution acceleration (d/dt)ωi, engine revolution speed ωi, output revolution speed ωo, running resistance torque $T_R$, engine torque $T_E$, and battery charge-and-discharge quantity $P_B$, the two-dimensional coordinate with the lateral axis taken as drive torque To and the longitudinal axis taken as engine (input) revolution acceleration (d/dt)ωi, a realizable region which falls within the battery rated power is represented as A shown in FIG. 6. In this embodiment, a region BC of drive torque and engine (input) revolution acceleration by means of a torque mechanically generable through motor/generators MG1 and MG2 is derived as shown in FIG. 18 and a region D shown in FIG. 19 which is an overlapped region between region BC and region A is called realizable region.

Before explanation of the derivation of region BC, engine (input) revolution acceleration of the hybrid transmission is expressed as in equation (11) and the drive torque is expressed as in equation (12). $I_c b_{24}$×equation (11)–$b_{14}$×equation (12).

$$I_c b_{24} \frac{d\omega_i}{dt} - b_{14} T_0 = (I_c b_{24} b_{11} - I_c b_{14} b_{21} + 1)T_R + \quad (32)$$
$$I_c (b_{24} b_{12} - b_{14} b_{22})T_E +$$
$$I_c (b_{24} b_{13} - b_{14} b_{23})T_1.$$

In addition, the following equation can be derived from $I_c b_{23}$×equation (11)–$b_{13}$×equation (12).

$$I_c b_{23} \frac{d\omega_i}{dt} - b_{13} T_o = (I_c b_{23} b_{11} - I_c b_{13} b_{21} + 1)T_R + \quad (33)$$
$$I_C(b_{23} b_{12} - b_{13} b_{22})T_E +$$
$$I_C(b_{23} b_{14} - b_{13} b_{24})T_2.$$

Using equation (32), from the torque range generable mechanically by motor/generator MG1, the drive torque mechanically generable torque of motor/generator and a region B of engine (input) revolution acceleration can be obtained from FIG. 18. In addition, using equation (33), from a torque range that second motor/generator MG2 mechanically generable, a region C of the drive torque mechanically generable by second motor/generator and engine (input) revolution acceleration can be obtained as shown in FIG. 18. In a case where the independent two motor/generators MG1 and MG2 are used, a region B is uniquely determined without exception from the revolution speed of the present motor/generator MG1 and region C is uniquely determined without exception from the revolution speed of the present motor/generator MG2. It is noted that a region on which region B and region C are overlapped is assumed to be BC.

Figure 19:
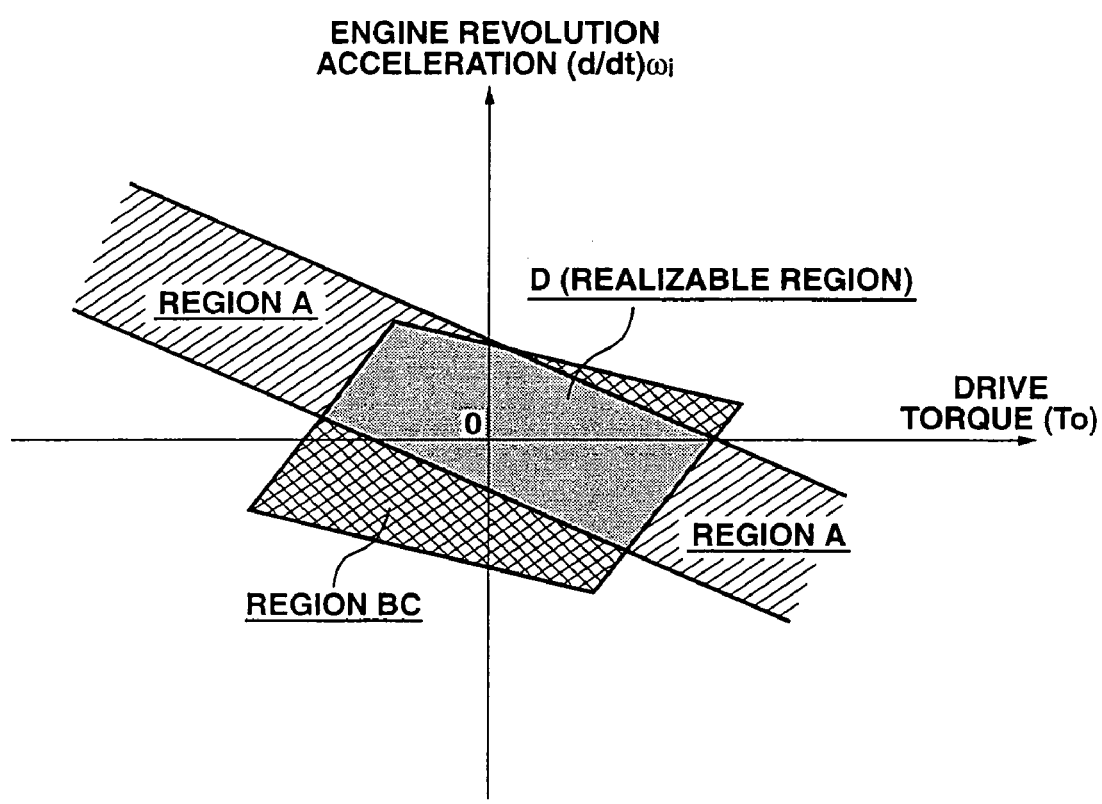
FIG. 19 is a diagrammatical view representing an overlapped part of a realizable region of FIG. 18 and a realizable region of FIG. 6.

Then, as shown in FIG. 19, a realizable region D between drive torque and engine revolution speed is assumed on which region A and region BC are overlapped is assumed. In each of the above-described first through third embodiments, since motor/generators are constituted by the composite current two-layer motor 3, region BC is not obtained. A dependent relationship is present as expressed in equation (16) between revolution speed of motor/generator MG2, maximum torque $T_{1max}$ of motor/generator MG1, and maximum torque $T_{2max}$ of second motor/generator MG2. This dependent relationship causes the dependent relationship between regions B and C, as shown in FIG. 20, under the revolution speed of present motor/generator MG1 and revolution speed of present motor/generator MG2, as shown in FIGS. 20A, 20B, and 20C. Region B is narrower as $T_{2max}$ becomes smaller ($T_{1max}$ becomes larger) and wider as $T_{2max}$ becomes larger, ($T_{1max}$ is smaller). On the other hand, region C becomes wider as $T_{2max}$ becomes smaller ($T_{1max}$ becomes larger), as shown in FIGS. 20A, 20B, and 20C. As described above, since region B and region C are variable, region BC on which both are overlapped is variable. It is difficult to include this region BC in realizable region D, as shown in FIG. 19.

Hereinafter, the process by means of target value correcting section 103 shown in FIG. 3 is executed in accordance with the flowchart shown in FIG. 21 in place of the program shown in FIG. 8. At a step S250, target value correcting section 103 determines whether target operating point which is the combination of target drive (driving) torque $x_0$ (=$T^*_{oO}$) and target engine (input) revolution acceleration $y_0$ (=$u_{io}$) falls within realizable region D described above so as to determine whether target engine torque $T^*_{oO}$ and target engine (input) revolution acceleration $u_{io}$ are feasible.

The determination of feasibility is based on the determination of whether target drive (driving) torque $T^*_{oO}$ and target engine (input) revolution acceleration $u_{io}$ are feasible when the following three conditions are satisfied.

(Condition 1)

The battery-and-discharge quantity when target drive (driving) torque $T^*_{oO}$ and target engine acceleration $u_{io}$ are substituted into equation (7) is equal to or below the battery rated power.

(Condition 2)

$T_1$ when target drive (driving) torque $T^*_{oO}$ and target revolution acceleration $u_{io}$ are substituted into equation (32) is a torque mechanically generable at the present revolution speed of the first motor/generator MG1.

(Condition 3)

T2 when target drive (driving) torque $T^*_{oO}$ and target engine (input) revolution acceleration $u_{io}$ are substituted into equation (33) is a mechanically generable torque at the present revolution speed of the motor/generator MG2.

In a case where target drive (driving) torque $T^*_{oO}$ and target engine (input) revolution acceleration $u_{io}$ are determined to be feasible (realizable) at step S50, at a step S51, target value correcting section 103 sets the target operating point which is a combination of target drive (driving) torque $x_0$ (=$T^*_{oO}$) and target engine (input) revolution acceleration $y_0$ (=$u_{io}$) directly as the command operating point, target drive (driving) torque $T^*_{oO}$ is set directly as post-correction drive torque command value $T^*_o$, target drive engine (input) revolution acceleration $u_{io}$ is directly set as post-correction engine acceleration command value $u_i$.

In a case where target drive (driving) torque $T^*_{oO}$ and target engine (input) revolution acceleration $u_{io}$ are determined not to be realizable at step S50, at a step S52, from among points of intersections at which a line segment connecting an origin and the target operating point ($x_0$, $y_0$) is intersected with boundary lines of origin A, origin B, and origin C, one point of intersection which is within the realizable region D and which is nearest to target operating point is the command operating point, the drive torque T*o and engine (input) revolution acceleration $u_i$ are respectively set as post-correction drive torque command value T*o and as post-correction engine (input) revolution acceleration value $u_i$.

In this embodiment, the process carried out by motor/generator torque command value determining section 105 shown in FIG. 3 is such that, in the same manner as described in each embodiment, when target motor/generator torques $T^*_{10}$ and $T^*_{20}$ from motor/generator torque distributing section 104 are in excess of mechanically output enable torque range or in excess of the battery rated power (is out of operable region), these are output enable range and a value within the battery rated power, these are corrected to values thereof within output enable torque range and battery rated power to form motor/generator torque command values $T^*_1$ and $T^*_2$. Thereby, motor/generator torque command value determining section 105 functions as the protection function against the deterioration of motor/generators MG1 and MG2, earlier deterioration of battery, performs a protection function described above, and performs a fail safe function.

Hence, also in this embodiment, motor/generator torque command value determining section 105 in accordance with a determination result of step S20 shown in FIG. 9, in details, in accordance with the determination of whether motor/generator torques $T^*_{10}$ and $T^*_{20}$ are within the operable region or are out of the operable region performs the same process as step S21 and step S22. The determination method at step S20 at which the contents of processes of any step should be executed is different. Hereinafter, the details thereof will herein be described. When this determination is carried out, in other words, when target motor/generator torques $T^*_{10}$ and $T^*_{20}$ are determined to fall within operable region. When the determination whether it is out of the region, this determination is made on the basis of regional diagram shown in FIG. 22.

It is noted that FIG. 22 shows the regional diagram used in this embodiment. In FIG. 22, the lateral axis denotes a torque T, of first motor/generator torque MG1 and the longitudinal axis denotes a torque $T_2$ of the second motor/generator MG2 so that the two-dimensional coordinates are formed. On the two-dimensional coordinates, an operable region FX which can achieve toques of first and second motor/generators MG1 and MG2 is shown. The region FA and region FC are the same as those described with reference to FIG. 10. and the duplicate explanation will herein be omitted.

Next, to derive a mechanical operable region of independent two motor/generators MG1 and MG2, in a case of the hybrid transmission having independent two motor/generators MG1 and MG2, an operable range of the torque of first motor/generator MG1 is uniquely determined according to the revolution speed of motor/generator MG1 and the operable range of the torque of the second motor/generator MG2 is uniquely determined according to the revolution speed of motor/generator MG2. Hence, using the relationship between revolution speeds $\omega_1$ and $\omega_2$ of first and second motor/generators $MG_1$ and $MG_2$ and maximum torques $T_{1max}$ and $T_{2max}$ of first and second motor/generators MG1 and MG2, maximum torque $T_{1max}$ of first motor/generator MG1 is obtained from the present revolution speed $\omega_1$ of first motor/generator MG1 and maximum torque $T_{2max}$ of second motor/generator MG2 is obtained from the present revolution speed $\omega_2$ Of second motor/generator MG2.

From these motor/generator maximum torques $T_{1max}$ and $T_{2max}$, a mechanical operable region FB of motor/generators MG1 and MG2 is obtained as shown in FIG. 22. In the case of the hybrid transmission having independent two motor/generators MG1 and MG2, operable region FB is a rectangular shape. An overlapped area between region FB and region FC are operable region FX of motor/generators MG1 and MG2.

On the basis of FIG. 22, the target value correcting section 103 determines whether target motor/generator torques $T^*_{10}$ and $T^*_{20}$ are within operable region FX or out of operable region FX. When the following four conditions are satisfied, it can be determined that motor/generator torques $T^*_{10}$ and $T^*_{20}$ are within operable region FX.

(Condition I)

Figure 23A:
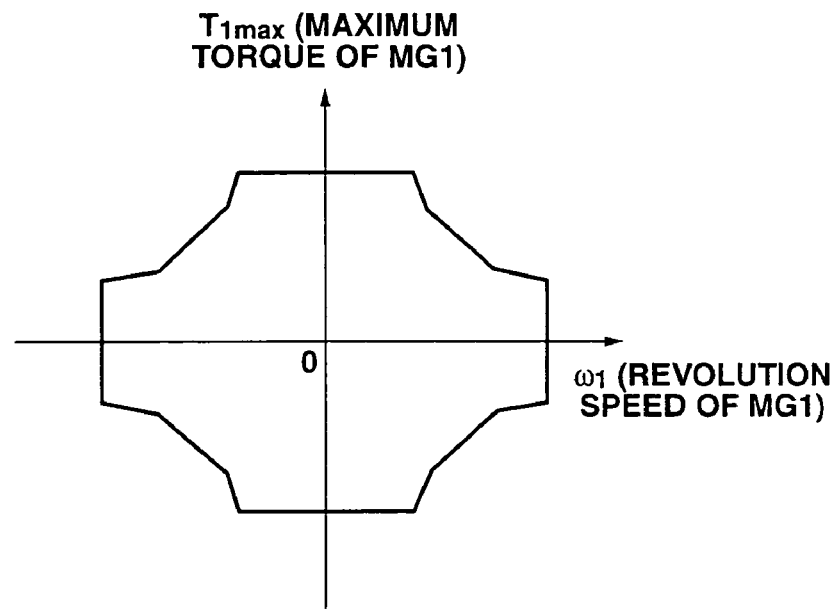
FIGS. 23A and 23B are characteristic diagrammatical views representing a maximum torque variation characteristics of first and second motor/generators MG1 and MG2 shown in FIG. 16, respectively.

In FIG. 23A, battery charge-and-discharge quantity Obtained by substituting target motor/generator torques $T^*_{10}$ and $T^*_{20}$ into equation (15) is equal to or lower than battery rated power.

(Condition II)

In FIG. 22A, target motor/generator torque $T^*_{10}$ is present within a range of maximum torque $T_{1max}$ of motor/generator MG1 obtained from the present revolution speed $\omega_1$ of motor/generator MG1.

(Condition III)

Figure 23B:
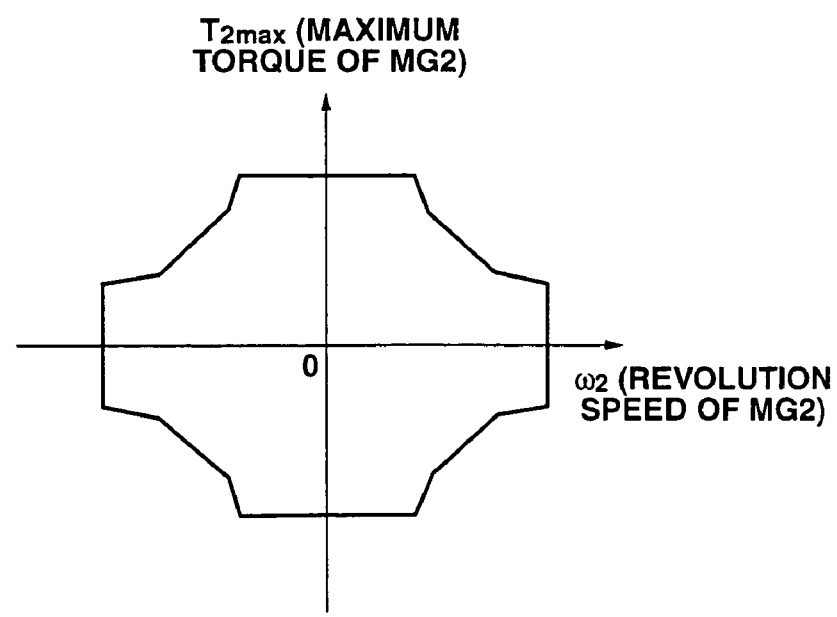

In FIG. 23B, target motor/generator torque $T^*_{20}$ is present within a range of maximum torque $T_{1max}$ of motor/generators MG1 obtained from the present revolution speed W2 of motor/generator MG2

(Condition IV)

If $b_{11}T_R+b_{12}T_E+b_{13}T^*_{10}+b_{14}T^*_{20} \leq 0$, target motor/generator torques $T^*_{10}$ n $T^*_{20}$ satisfy the relationship of equation (17) described above and if $b_{11}T_R+b_{12}T_E+b_{13}T^*_{10}+b_{14}T^*_{20} \leq 0$. both of target motor/generator torques $T^*_{10}$, $T^*_{20}$ satisfy the relationship of equation (18).

In this embodiment, when the above-described four conditions are satisfied at step S20 in FIG. 9, target motor/generator torques $T^*_{10}$ and $T^*_{20}$ are within operable region FX and the step S21 of the same drawing is executed. When, at step S20 of FIG. 9, the above-described four conditions are not satisfied, the step S22 is executed since motor/generator torques $T^*_{10}$, $T^*_{20}$ are out of operable region FX. Therefore, the same action and advantages as described in each of the first through third embodiment can be achieved.

Fifth Embodiment

Figure 21:
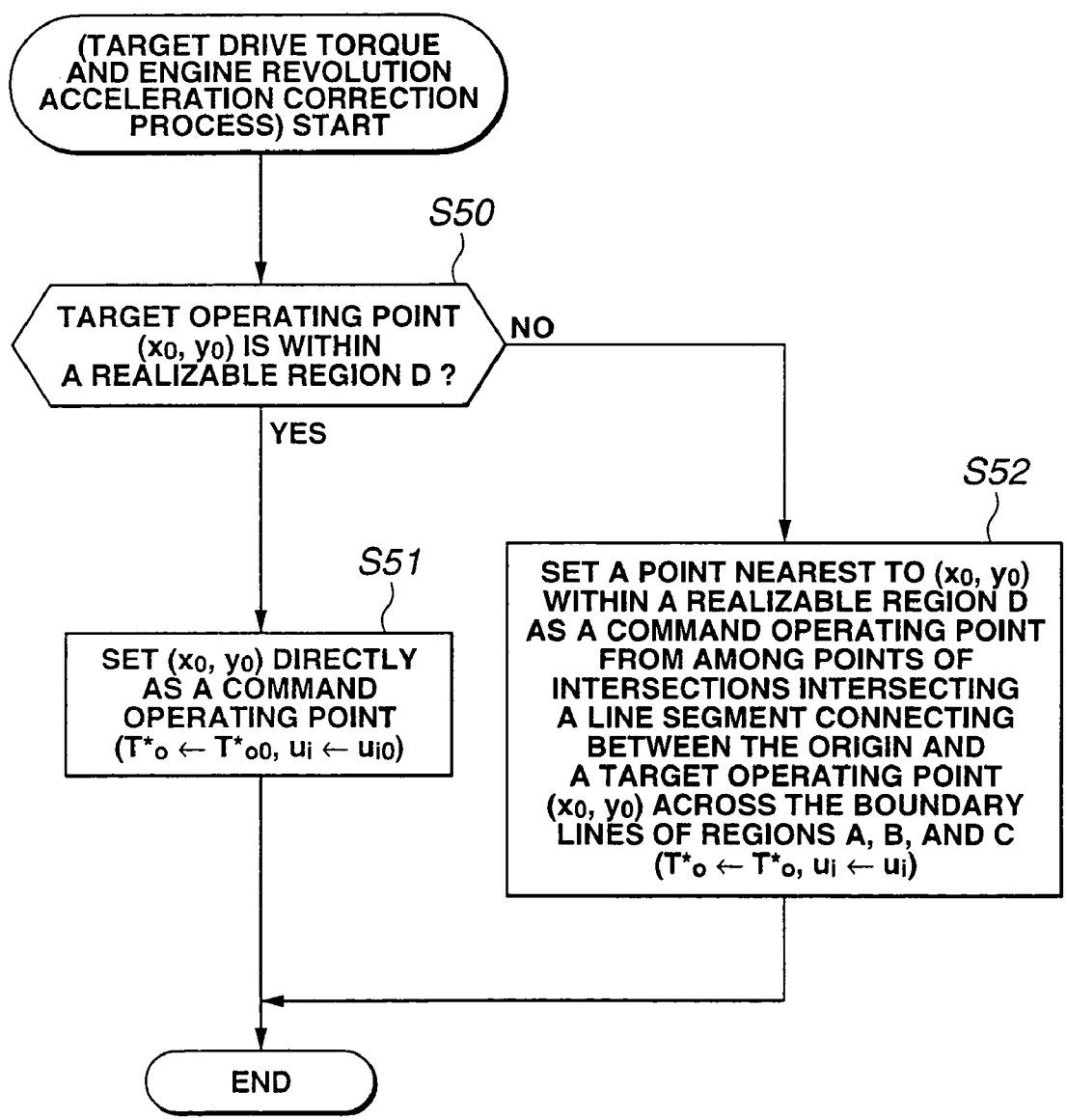
FIG. 21 is an operational flowchart representing a control program on a correction procedure of the target drive (or driving) torque and target engine (input) revolution acceleration executed by the shift control apparatus in a fourth preferred embodiment in the hybrid transmission shown in FIG. 16.
Figure 24:
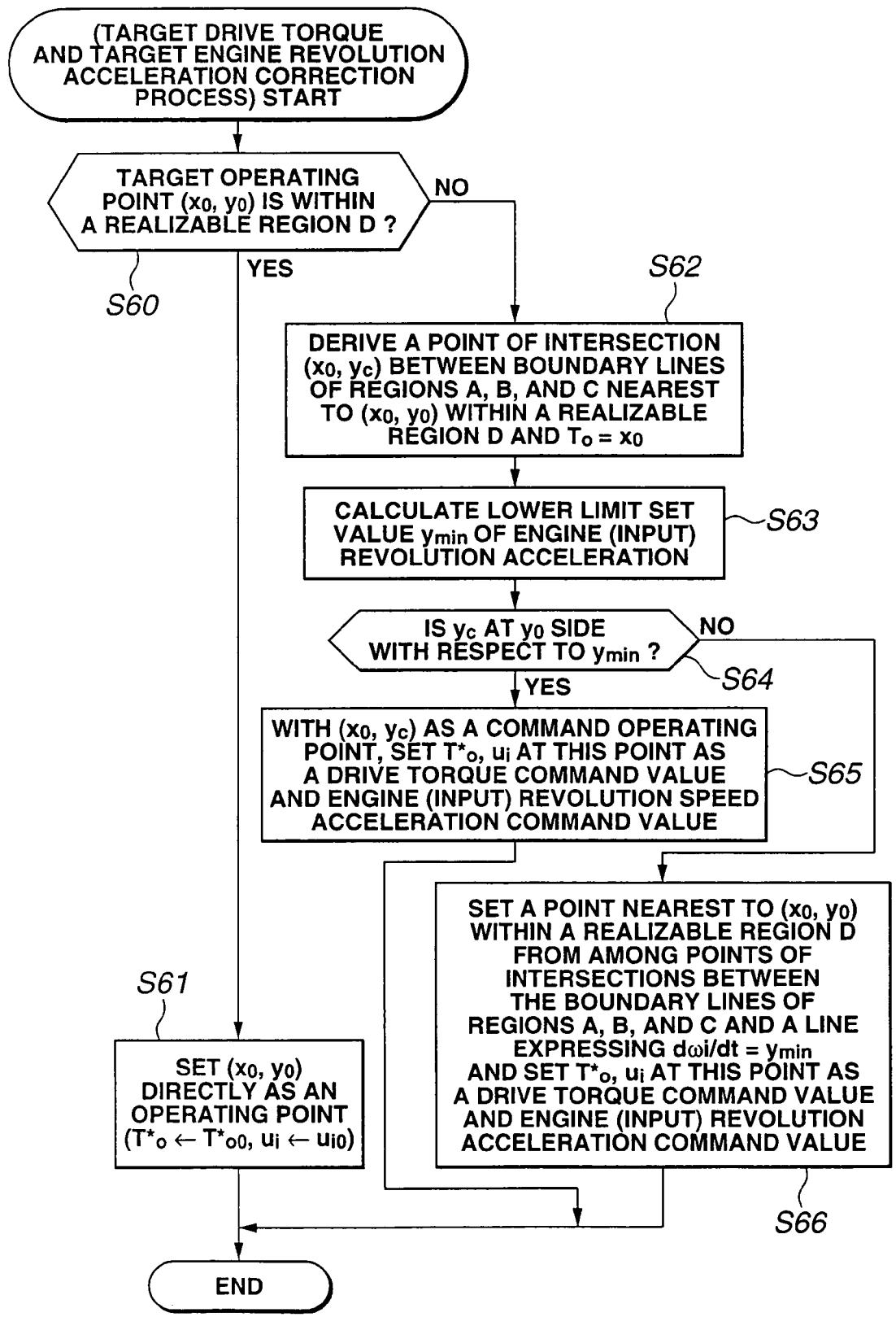
FIG. 24 is an operational flowchart representing a correction process program of the target drive (Or driving) torque and target engine (output) revolution acceleration in a fifth preferred embodiment of the shift control apparatus according to the present invention.

FIG. 24 shows a correction procedure of target drive (driving) torque and target engine (input) revolution acceleration in place of FIG. 21 and to be executed in a fifth preferred embodiment of the shift control apparatus according to the present invention.

In this embodiment, the hybrid transmission is the same as FIG. 16 and the shift control system is the same as FIG. 17. Furthermore, hybrid controller 21 in FIG. 16 is the same as FIG. 3 when the functional block diagram is shown. Target value correcting section 103 executes the flowchart of FIG. 24 in place of FIG. 21.

Herein, a processing of the flowchart shown in FIG. 24 executed by target value correcting section 103 will be described below.

At a step S60, in the same way as described at step S50 shown in FIG. 21, depending upon whether the target operating point which is the combination of target drive (driving) torque $x_0$ ($=T^*_{oO}$) and target engine (input) revolution acceleration $y_0$ ($=u_{io}$) falls within realizable region D shown in FIG. 19, a kind of check by means of target value correcting section 103 is made as to whether target drive (driving) torque $T^*_{oO}$ and target engine (input) revolution acceleration $u_{io}$ is feasible.

If, at step S60, the determination is made that target drive (driving) torque $T^*_{oO}$ and target engine (input) revolution acceleration $u_{io}$ are determined to be feasible, the routine goes to a step S61. At step S61, the target operating point is set directly as the command operating point which is the combination of target drive (driving) torque $x_0(=T^*_{oO})$ and target engine (input) revolution acceleration $y_0$ ($=u_{io}$), target drive (driving) torque $T^*_{oO}$ is directly set as post-correction drive torque command value T*O, and target engine (input) revolution acceleration $u_{io}$ is directly set as post-correction engine (input) revolution acceleration command value $u_i$. In a case where, at step S60, if determination is made that target drive (driving) torque $T^*_{oO}$ and target engine (input) revolution acceleration $u_{io}$ are not feasible, the routine goes to a step S62. In the same way as described with reference to step S34 in FIG. 14, target value correcting section 103 derives points of intersections ($x_0$, $y_c$) between boundary lines of regions A, B, and C (refer to FIGS. 18 and 19) which are nearest to target operating point ($x_0$, $y_0$) within realizable region D and a line expressing To=$x_0$. It is noted that point of intersection ($x_0$, $y_c$) is a point at which target drive (driving) torque $T^*_{oO}$ is left unchanged and target input revolution acceleration $u_{io}$ is moved to a point $y_c$ within realizable region D which is nearest to $y_0$.

At the next step S63, target value correcting section 103 calculates engine (input) revolution acceleration lower limit set value $y_{min}$ in the same way as described with reference to step S35 of FIG. 14. At the next step S64, in the same way as step S36 in FIG. 14, target value correcting section 103 determines whether $y_0$ falls within $y_0$ side with respect to $y_{min}$. If $y_c$ is located at $y_0$ side with respect to $y_{min}$, the sufficient engine (input) revolution acceleration (the sufficient shift speed) can be obtained. Thus, the routine goes to a step S66. If $y_c$ is not located toward $y_0$ side with respect to $y_{min}$, the routine goes to a step S66.

At a step S65 selected when the sufficient engine (input) revolution acceleration is obtained (the sufficient shift speed is obtained), in the same way as step S37 in FIG. 14, the point of intersection ($x_0$, $y_c$) is set as the command operating point, the drive torque T*o and engine (input) revolution acceleration $u_i$ at this command operating point are set as post-selection drive torque command value T*o and post-correction engine input revolution acceleration command value $u_i$. At the step S66 selected when the engine (input) revolution acceleration cannot be obtained sufficiently (a sufficient shift speed is not obtained), in the same way as described with reference to step S38 in FIG. 14, a point of intersection which is nearest to the target operating point ($x_0$, $y_0$) within realizable region D from among the point of intersections at which the boundary lines of regions A, B, and C (refer to FIGS. 18 and 19) are intersected with the line representing the engine (input) revolution acceleration (d/dt)

ωi=$y_{min}$ is set as the command operating point, drive torque T*o and engine (input) revolution acceleration $u_i$ at this command operating point are set as post-correction drive torque command value $T_{o*}$ and post-correction engine (input) revolution acceleration command value $u_i$.

Hence, the post-correction drive torque command value To* and engine (input) revolution acceleration command value $u_i$ have the same polarities as those of the target drive (driving) torque $T^*_{oO}$ and target engine (input) revolution acceleration $u_{io}$. The same action and advantages as described in each of the previously described embodiments can be achieved. While the sense of incompatibility with the shift is prevented from occurring (engine revolution (input revolution) acceleration command value $u_i$ does not become a value lower than (predetermined) engine revolution (input revolution) acceleration lower limit value $y_{min}$, target operating point ($x_0$, $y_0$) can be moved to the command operating point within realizable region D with minimum correction of target drive (driving) torque $T^*_{oO}$ and target engine (input) revolution acceleration $u_{io}$. Consequently, the same action and advantages as described in each of the first through fourth embodiments can be achieved.

Sixth Embodiment

Figure 25:
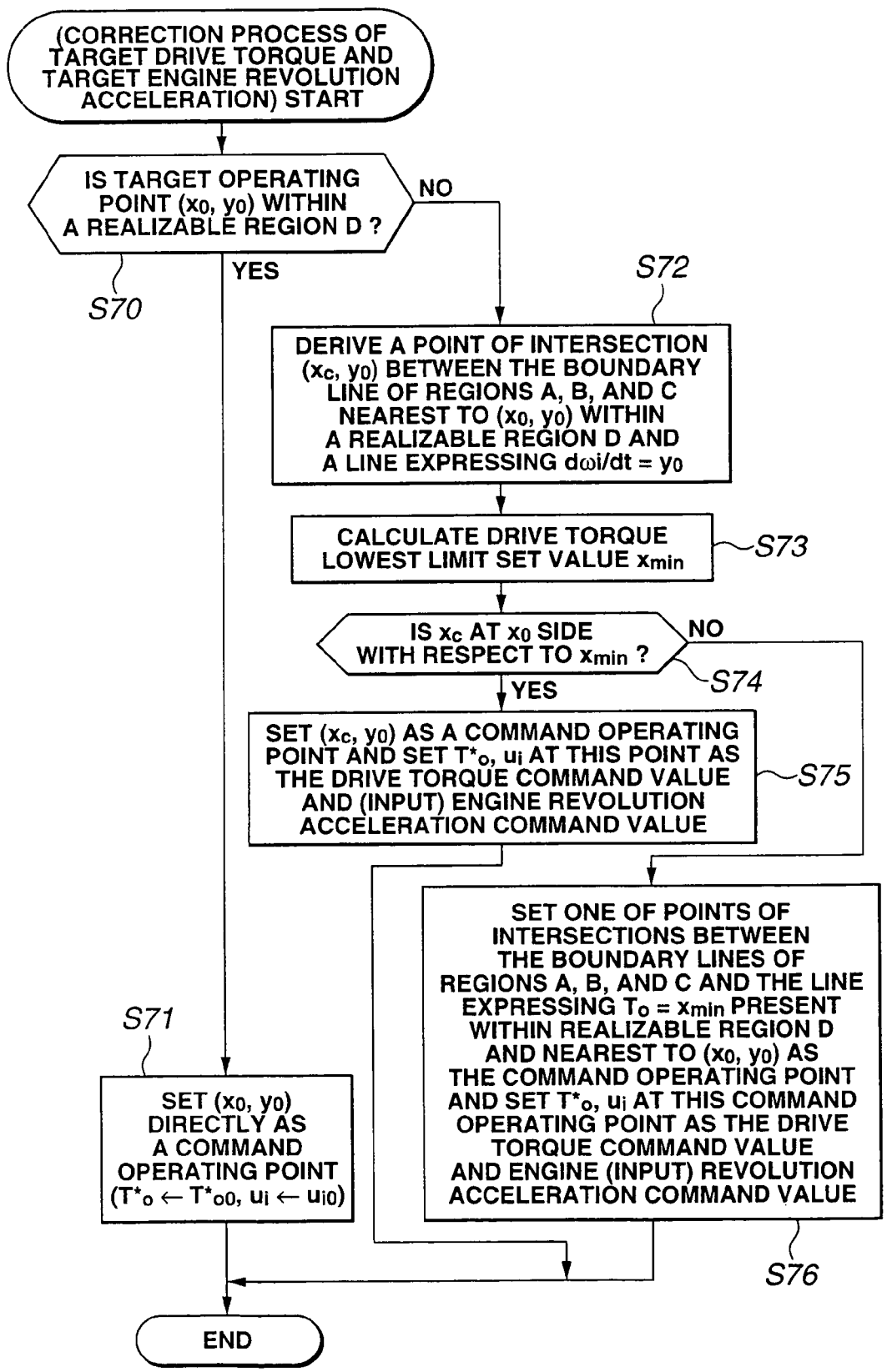
FIG. 25 is an operational flowchart representing the correction process program of the target drive (driving) torque and target engine (input) revolution acceleration in a sixth preferred embodiment of the shift control apparatus according to the present invention.

FIG. 26 shows a correction processing of target drive (driving) torque and target engine (input) revolution acceleration in place of FIG. 21 to be executed by the shift control apparatus of the hybrid transmission in a sixth preferred embodiment according to the present invention. The hybrid transmission in the sixth embodiment is the same as that shown in FIG. 16 and the shift control system is the same as that shown in FIG. 17. Furthermore, hybrid controller 21 in FIG. 16 is the same as depicted in FIG. 3. However, target value correcting section 103 in this embodiment is different from that shown in FIG. 3 in that target value correcting section 103 in this embodiment executed the flowchart shown in FIG. 25 in place of that shown in FIG. 21. Hereinafter, the processing of flowchart that target value correcting section 103 executes will be described below with reference to the flowchart of FIG. 25.

At a step S70, target value correcting section 103 determines whether the target operating point which is the combination of target drive (driving) torque $x_0$(=$T^*_{oO}$) and target engine (input) revolution acceleration $y_0$(=$u_{io}$) falls within realizable region D shown in FIG. 19 so as to determine whether target drive (driving) torque $T^*_{oO}$ and target engine (input) revolution acceleration $u_{io}$ are feasible.

In a case where, at step S70, target value correcting section 103 determines that target drive (driving) torque $T^*_{oO}$ and target engine (input) revolution acceleration $u_{io}$ are feasible, at a step S71, in the same way as contents of step S51 shown in FIG. 21, the target operating point which is the combination of target drive (driving) torque $x_0$ (=$T^*_{oO}$) and target revolution acceleration $y_0$ (=$u_{io}$) is set directly as the command operating point, target drive (driving) torque $T^*_{oO}$ is directly set as post-correction drive torque command value T*o, and target drive engine (input) revolution acceleration $u_{io}$ is directly set as post-correction engine (input) revolution acceleration command value $u_i$.

In a case where, at step S70, target value correcting section 103 determines that target drive (driving) torque $T^*_{oO}$ and target engine (input) revolution acceleration $u_{io}$ are not feasible, the routine goes to a step S72. AT step S72, in the same way as described in step S44 shown in FIG. 15, target value correcting section 103 derives a point of intersection ($x_c$, $y_0$) between one of the boundary lines of regions A, B, and C (refer to FIGS. 18 and 19) which is nearest to target operating point ($x_0$, $y_0$) and which is within realizable region D and a line expressing (d/dt)ωi=$y_0$.

Next, at a step S74, target value correcting section 103 determines whether $x_c$ is located toward $x_0$ side with respect to $x_{min}$, in the same way as described at step S46 shown in FIG. 15. If $x_c$ is located toward $x_0$ side with respect to $x_{min}$, the drive torque can sufficiently be obtained and the routine goes to a step S75. If $x_c$ is not located toward $x_0$ side with respect thereto, the sufficient drive torque cannot be obtained so that the routine goes to a step S76.

At step S75 selected when the sufficient drive torque is obtained, in the same manner as the step S41 of FIG. 15, point of intersection ($x_c$, $y_0$) is set as the command operating point, drive torque T*o and engine (input) revolution acceleration $u_i$ is set as post-correction drive torque command value $T^*_o$ and post-correction engine (input) revolution acceleration command value $u_i$. On the other hand, at step S76 selected when the sufficient drive torque cannot be obtained, in the same way as described at step S38 shown in FIG. 13, point of intersection which is nearest to target operating point ($x_0$, $y_0$) within realizable region D from among the points of intersections between the boundary lines of regions A, B, and C (refer to FIGS. 18 and 19) and a line expressing drive torque To=$x_{min}$ is set as the command operating point. Drive torque $T^*_o$ and engine (input) revolution acceleration $u_i$ at this command operating point are set, respectively, as post-correction drive torque command value T*o and post-correction engine (input) revolution acceleration command value $u_i$.

Hence, the polarities (signs) of post-correction drive torque command value $T^*_o$ and post-correction engine (input) revolution acceleration command value $u_i$ are the same as those of target drive (driving) torque $T^*_{oO}$ and target engine (input) revolution acceleration $u_{io}$. Thus, the same action and advantages as those of each of the first through fifth embodiments can be achieved. While preventing drive torque command value $T^*_o$ from becoming lower than drive torque lower limit value $x_{min}$, target operating point ($x_0$, $y_0$) can be moved to the command operating point within realizable region D with minimum correction of target drive (driving) torque $T^*_{oO}$ and target engine (input) revolution acceleration $u_{io}$.

Various changes and modifications may be made without departing from the scope and sprit of the present invention which is defined in the appended claims.

The entire contents of a Japanese Patent Application No. 2003-100773 (filed in Japan on Apr. 3, 2003) are herein incorporated by reference. The scope of the invention is defined with reference to the following claims.

What is claimed is:

1. A shift control apparatus for a hybrid transmission, comprising:
 a plurality of revolutional members which are enabled to be arranged on a predetermined lever diagram;
 a differential unit having two degrees of freedom such that if revolution states of two revolutional members of the plurality of revolutional members are determined, the revolutional states of the other revolutional members of the plurality of revolutional members are determined, an input of a main power source (ENG), an output to a drive system, and a plurality of motor/generators (MG1, MG2) are coupled to the respective revolutional members of the differential unit to adjust a power from the motor/generators in such a manner that a shift ratio between the main power source and the drive system is varied continuously;

a target drive torque calculating section that calculates a target drive torque ($T^*_{oO}$) to the drive system in accordance with a driving condition;

a target input revolution speed calculating section that calculates a target input revolution speed ($\omega^*_E$) of one of the revolutional members which is coupled to the main power source (ENG);

a target input revolution acceleration calculating section that calculates a target input revolution acceleration ($u_{io}$) to converge an actual input revolution ($\omega i$) into the target input revolution speed ($\omega^*i$); and a target value correcting section that corrects at least one of the target drive torque (T*hd oO) and the target input revolution ($u_{io}$) to be a value within a realizable region to be set as a drive torque command value ($T^*_{oO}$) and an input revolution acceleration command value ($u_{io}$) in such a manner that polarities of the target drive torque ($T^*_{oO}$) and the target input revolution acceleration ($u_{io}$) are left unchanged, wherein in a case where a combination of the target drive torque with the target input revolution acceleration falls out of a realizable region on two-dimensional coordinates of the drive torque and the input revolution acceleration related to a combination of the drive torque and the input revolution acceleration which is feasible in a state of the present motor/generators, a battery for the motor/generators (MG1, MG2), and the main power source, the target value correcting section is configured to make the drive torque command value (T*o) and the input revolution acceleration command value ($u_i$) contribute to controls of the main power source and the motor/generators (3) in place of the target drive torque ($T^*_{oO}$) and the target input revolution acceleration ($u_{io}$).

2. A shift control apparatus for a hybrid transmission as claimed in claim 1, wherein the target value correcting section corrects only the target input revolution acceleration without the correction of the target drive torque when correcting at least one of the target drive torque (T*o) and the target input revolution acceleration ($u_i$).

3. A shift control apparatus for a hybrid transmission as claimed in claim 1, wherein the target value correcting section corrects the target input revolution acceleration ($u_{io}$) not to become lower than a predetermined input revolution acceleration lower limit set value ($y_{min}$) and to be set as the input revolution acceleration command value when correcting at least one of the target drive torque and the target input revolution acceleration and corrects the target drive torque ($T^*_{oO}$) in such a manner that its correction quantity is to be a minimum to set the drive torque command value (T*o).

4. A shift control apparatus for a hybrid transmission as claimed in claim 1, wherein the target value correcting section corrects only the target drive torque without correction of the target input revolution acceleration when correcting at least one of the target drive torque and the target input revolution acceleration to provide the drive torque command value (T*o) and the input revolution acceleration command value ($u_i$).

5. A shift control apparatus for a hybrid transmission as claimed in claim 1, wherein the target value correcting section corrects the target drive torque not to be lower than a predetermined drive torque lower limit set value ($X_{min}$) and sets the corrected target drive torque as the target torque command value and corrects the target input revolution acceleration in such a manner that its correction quantity is to be minimum and sets the corrected input target revolution acceleration to the input revolution acceleration command value ($u_i$).

6. A shift control apparatus for a hybrid transmission as claimed in claim 1, wherein the target value correcting section derives two boundary lines prescribing the realizable region on the two-dimensional coordinates of drive torques (To) and the engine (input) revolution acceleration {(d/dt)d$\omega$i} on the basis of a battery rated power ($P_{BMAX}$), a drive torque (To), the engine (input) revolution acceleration (d/dt)$\omega$i, a running resistance torque ($T_R$), an engine torque ($T_E$), and specifications of the hybrid transmission; derives a target operating point which is a combination of the target drive torque $x_o$ ($T^*_{oO}$) and the target input revolution acceleration $Y_0$ ($=u_{io}$), a straight line passing through an origin of the two-dimensional coordinates and the target operating point, and points of intersections ($x_1$, $y_1$) and ($x_2$, $y_2$) at which the straight line is intersected with the two boundary lines, wherein $x_1 < x_2$, and determines whether $x_o$ ($=T^*_{oO}$) falls between x coordinate ($x_1$) of one boundary line and x coordinate ($x_2$) of the other of the two boundary lines.

7. A shift control apparatus for a hybrid transmission as claimed in claim 6, wherein, when determining that $x_0$ ($=T^*_{oO}$) falls between $x_1$ and x2, the target value correcting section determines that the target drive torque $x_0$ ($=T^*_{oO}$) and the target input revolution acceleration $y_0$ ($=u_{io}$) falls within the realizable region (A) and sets the target drive torque $x_0$ ($=T^*_{oO}$) and the target engine (input) revolution acceleration $y_0$ ($=u_{io}$) directly as a post-correction drive torque command value (T*o) and as a post-correction engine revolution acceleration command value ($u_i$).

8. A shift control apparatus for a hybrid transmission as claimed in claim 7, wherein, when determining that $x_0$ ($=T^*_{oO}$)does not fall within an interspace of the two-dimensional coordinates $x_1$ and $x_2$, the target value correcting section determines that the target drive torque $x_0(=T^*_{oO})$ and the target input revolution acceleration $y_0$ ($=u_{io}$) are out of the realizable region (A), sets one of the points of intersections ($x_1$, $y_1$) and ($x_2$, $y_2$) which is nearer to the target operating point ($x_0$, $y_0$) as a command operating point, and sets the target drive torque ($T^*_{oO}$) as the post-correction drive torque command value ($T^*_o$) and the post-correction input revolution acceleration command value ($u_i$).

9. A shift control apparatus for a hybrid transmission as claimed in claim 8, wherein the shift control apparatus further comprises a motor/generator torque distributing section that determines target torques ($T^*_{10}$ and $T^*_{20}$) of the motor/generators (MG1 and MG2) to achieve the post-correction drive torque command value (T*o) and post-correction input revolution acceleration command values ($u_1$).

10. A shift control apparatus for a hybrid transmission as claimed in claim 9, wherein the shift control apparatus further comprises a motor/generator torque command value determining section that determines motor/generator torque command values ($T^*_1$ and $T^*_2$) to those values within an output enabled torque range by correcting the target motor/generator torques ($T_{10}^*$ and $T_{20}^*$) to values thereof within an output enabled torque range in a case where the target motor/generator torques ($T^*_{10}$ and $T^*_{20}$) are in excess of the mechanically output enabled torque range or in a case where the target motor/generator torques ($T^*_{10}$ and $T^*_{20}$) are in excess of a battery rated power when they are realized.

11. A shift control apparatus for a hybrid transmission as claimed in claim 10, wherein the motor/generator torque command value determining section determines whether the target motor/generator torques ($T^*_{10}$ and $T^*_{20}$) are within the mechanically output enabled torque range and within an operable region that is not in excess of a battery rated power when these target motor/generator torques ($T^*_{10}$ and $T^*_{20}$) are realized.

12. A shift control apparatus for a hybrid transmission as claimed in claim 11, wherein, on two-dimensional coordinates of the motor/generators (MG1, MG2) torques ($T_1$ and $T_2$), the operable region (FX) is an overlapped region of a region of FA prescribing the drive torque and engine revolution speed which falls within a battery rated power from a range of a battery charge-and-discharge quantity ($P_B$), a region of FB prescribing a mechanically operable region of the motor/generators, and of a region of FC prescribing a torque range of motor/generators (MG1 and MG2) when the target motor/generator torques ($T^*_{10}$ and $T^*_{20}$) are corrected, to prevent the engine revolution acceleration from approaching to zero than a predetermined input revolution limit set value $y_{min}$, the engine revolution acceleration is a value toward the engine revolution acceleration side when the target motor/generator torques ($T^*_{10}$ and $T^*_{20}$) are achieved before correction.

13. A shift control apparatus for a hybrid transmission as claimed in claim 12, wherein the motor/generator torque command value determining section determines whether the target motor/generator torques ($T^*_{10}$ and $T^*20$) falls within the operable region (FX) depending upon whether predetermined three conditions are satisfied.

14. A shift control apparatus for a hybrid transmission as claimed in claim 13, wherein the motor/generator torque command value determining section sets directly the target motor/generator torques ($T^*_{10}$, $T^*_{20}$) as motor/generator torque command values ($T^*_1$, $T^*_2$) without correction when the target motor/generator torques ($T^*_{10}$, $T^*_{20}$) are determined to fall within the operable region (FX).

15. A shift control apparatus for a hybrid transmission as claimed in claim 14, wherein the motor/generator torque command value determining section corrects the target motor/generator torques $T^*_{10}$, $T^*_{20}$ to fall within the operable region (FX) in such a manner that a variation in the drive torque provides a minimum, the corrected target motor/generator torques being directly set as post-correction motor/generator torque command values $T^*_1$, $T^*_2$.

16. A shift control apparatus for a hybrid transmission as claimed in claim 15, wherein, when an ante-correction operating point corresponding to the target motor/generator torques ($T^*_{10}$, $y_{20}$) is out of the operable region of FX and an equi-driving torque straight line passing through the ante-correction operating point is not intersected with the operable region (FX), the corrections for target motor/generator torques $T_1$, $T_2$ are made in such a manner that an operating point (●) which is within the operable region (FX) and nearest to the equi-driving torque straight line passing through the ante-correction operating point is set to be a post-correction operating point, the motor/generator torques ($T_1$, $T_2$) at the post-correction operating point being set to be post-correction motor/generator torque command values $T^*_1$ and $T^*_2$.

17. A shift control apparatus for a hybrid transmission as claimed in claim 13, wherein the predetermined three conditions are that a battery charge-and-discharge quantity $P_B$ obtained by substituting $T^*_{10}$ and $T^*_{20}$ into equation of $P_B = \omega_1 T_1 + \omega_2 T_2$; the target motor/generator torque $T^*_{10}$ is smaller than a torque maximum value $T_{1max}$ of the motor generator MG1 obtained substituting $T^*_{20}$ into equation of $T_{1max} = f2(T_{2max}, \omega_1, \omega_2)$; and, if $b_{11}T_R + b_{12}T_E + b_{13}T^*_{10} + b_{14}T^*_{20} \geq 0$, the target motor generator torques $T^*_{10}$ and $T^*_{20}$ satisfy a relationship of an equation of $b_{11}T_R + b_{12}T_E +$ $b_{13}T_1 + b_{14}T_2 \geq y_{min}$ and, if $b_{11}T_R + b_{12}T_E + b_{13}T^*_{10} + b_{14}T^*_{20} \geq 0$, the target motor/generators $T^*_{10}$, $T^*_{20}$ satisfies the following equation $b_{11}T_R + b_{12}T_E + b_{13}T_1 + b_{14}T_2 \geq y_{min}$, wherein $T_R$ denotes a running resistance, $T_1$ and $T_2$ denote torques of the respective motor/generators, $T_E$ denotes an engine torque, $b_{11}$, $b_{12}$, $b_{12}$, and $b_{14}$ have the following relationship of $d\omega i/dt$ (i=1, 2)=$b_{11}T_R + b_{12}T_E + b_{13}T_1 + b_{14}T_2$.

18. A shift control apparatus for a hybrid transmission as claimed in claim 2, wherein the target value correcting section, on two-dimensional coordinates of the drive torque (To) and the input revolution acceleration {(d/dt)$\omega$i}, determines a command operating point (●) on the basis of a target operating point (o) which corresponds to a combination of the target drive torque ($T^*_{oO}$) and the target input revolution acceleration ($u_{io}$) and, when a gear shift occurs such that both target driving torque ($T^*_{oO}$) and target input revolution acceleration ($u_{io}$) are abruptly varied, the target driving torque $T_{oO}$ is not corrected but is directly set to a drive torque command value ($T^*o$) and only the target input revolution acceleration command value ($u_{io}$) is corrected in such a manner that the target operating point (o) corresponding to the combination between the target drive torque ($T^*_{oO}$) and the target input revolution acceleration ($u_{io}$) is moved with a minimal displacement within the realizable region (A) to a command operating point (●) which corresponds to the combination of the drive torque command value ($T^*_o$) and the input engine revolution acceleration command value ($u_i$).

19. A shift control apparatus for a hybrid transmission as claimed in claim 18, wherein a point (●) on the two-dimensional coordinates which passes through a target operating point (o) which corresponds to the target drive torque ($T^*_{oO}$) and the target input revolution acceleration ($u_{io}$) and on a line segment which is parallel to longitudinal axis representing the engine revolution acceleration, which is within the realizable region, and which is nearest to the target operating point, the drive torque ($T^*o$) and engine revolution acceleration ($u_i$) being set to be the drive torque command value ($T^*$) and engine revolution acceleration command value ($u_i$).

20. A shift control apparatus for a hybrid transmission as claimed in claim 19, wherein, when the post-correction input revolution acceleration command value ($u_i$) is smaller than the preset input revolution acceleration limit set value ($y_{min}$), a point of intersection between one of two boundary lines prescribing the realizable region A which is nearer to the target operating point (o) and a line representing the input revolution acceleration lower limit set value $y_{min}$ is (●), the drive torque ($T^*o$) and the engine revolution acceleration ($u_i$) at the command operating point are set to be the drive torque command value and input revolution acceleration command value.

21. A shift control apparatus for the hybrid transmission as claimed in claim 4, wherein the target value correcting section determines points of intersections ($x_1$, $y_0$) and ($x_2$, $y_0$) between a straight line passing through a target operating point ($x_0$, $y_0$) which corresponds to a combination between the target drive torque $x_0$ (=$T^*_{oO}$) and the engine revolution acceleration $Y_0$ (=$u_i$) and which is parallel to a drive axis of a lateral axis of the two-dimensional coordinates with the input revolution acceleration as a longitudinal axis and two boundary lines prescribing the realizable region (A) and determines whether $x_0$ (=$T^*_{oO}$) falls between a point of $x_1$ and the other point of $x_2$ wherein $x_1 < x_2$.

22. A shift control apparatus for the hybrid transmission as claimed in claim 21, wherein the target value correcting section determines a point of intersections ($x_c$, $y_0$) between one of the two boundary lines prescribing the realizable region which is nearer to the target operating point and a line expressing $(d/dt)\omega i = y_o$, the point of intersection $(x_c, y_0)$ being moved with the target input revolution acceleration $(u_{io})$ left unchanged and the target drive torque $(T^*_{oO})$ moved to a point $(x_c)$ within the realizable region which is nearest to $(x_0)$., calculates the drive torque lower limit set value $(x_{min})$ on the basis of a deviation between a target engine revolution speed and actual engine revolution speed, and determines whether, with $x_{min}$ as a reference, $x_c$ is located toward $x_0$ side.

23. A shift control apparatus for the hybrid transmission as claimed in claim 22, wherein the target value correcting section sets the point of intersection $(x_0, y_0)$ as a command operating point when determining that the point $(x_c)$ is located toward $x_0$ side with $(x_{min})$ as the reference, the drive torque $(T^*_o)$ and engine revolution acceleration $(u_i)$ at the command operating point being set as a post-correction drive torque command value $(T^*o)$ and a post-correction engine revolution acceleration command value $(u_i)$ and when determining that the point $(x_c)$ is not located toward $x_0$ side with $(x_{min})$ as the reference, a point of intersection between one of the two boundary lines prescribing the realizable region which is nearer to the target operating point $(x_0, y_0)$ and a line expressing the drive torque $T_0 = X_{min}$ being set to be the command operating point.

24. A shift control apparatus for the hybrid transmission as claimed in claim 1, wherein the target value correcting section derives the realizable region (A) on the two-dimensional coordinates with one axis calibrated with a drive torque (To) and the other axis calibrated with the engine revolution acceleration $(d/dt)\omega i$ which falls within a battery rated power, on the basis of the engine revolution acceleration $(d/dt)\omega i$, an output revolution speed $(\omega_0)$ of the hybrid transmission, a running resistance torque $(T_R)$, an engine torque $(T_E)$, and a battery charge-and-discharge quantity $(P_B)$, and derives another realizable region (BC) of a drive torque a mechanically generable by the motor/generators (MG1, MG2) in addition to the realizable region (A), an overlapped area of both of the realizable region (BC) constituting a still another realizable region (D).

25. A shift control apparatus for the hybrid transmission as claimed in claim 5, wherein the target value correcting section derives the realizable region (A) expressed on two-dimensional coordinates of the drive torque (To) calculated in a lateral axis thereof and of the input revolution calibrated in a longitudinal axis thereof, calculates two boundary lines prescribing the realizable region (A) on the basis of a battery rated power $(P_{BMAX})$, a running resistance torque $(T_R)$, an engine torque $(T_R)$, and specifications of the hybrid transmission, derives points of intersections between a straight line passing through the target operating point $(x_0, y_0)$ which corresponds to a combination between the target drive torque $x_0 (=T^*_{oO})$ and target input revolution acceleration $Y_0 (=u_{io})$ and which is parallel to an input revolution acceleration axis which is a longitudinal axis of the two-dimensional coordinates, with the drive axle as a lateral axis and the two boundary lines prescribing the realizable region and determines whether a point of $y_0$ of the target operating point $(x_0, y_0)$ falls in a space of the two-dimensional coordinates between longitudinal axis coordinates of the points of intersections ($y_1$ and $y_2$).

26. A shift control apparatus for the hybrid transmission as claimed in claim 25, wherein, when determining that the point of $x_0$ falls out of the space between $y_1$ and $y_2$, the target value correcting section determines that the target operating point is out of the realizable region (A) and derives a point of intersection $(x_0, y_0)$ between one of the realizable region boundary lines which is nearer to the target operating point $(x_0, y_0)$ and a line expressing that $To=x_0$, the point of intersection $(x_0, y_0)$ being a point of $y_c$ which is nearest to the point $y_0$ and is within the realizable region and to which the target input revolution acceleration $u_{io}$ is moved, calculates the input revolution acceleration lower limit set value $(y_{min})$ on the basis of a deviation between the target input revolution speed and an actual input revolution speed and an actual input revolution speed, and determines whether $y_c$ is located toward $y_0$ side with respect to $y_{min}$, the drive torque $T^*_0$ and a post-correction input revolution acceleration command value $(u_i)$.

27. A shift control apparatus for the hybrid transmission as claimed in claim 26, wherein, when determining that $y_c$ is not located toward $y_0$ side with respect to $y_{min}$, the target value correcting section sets a point of intersection between one of the two boundary lines prescribing the realizable region (A) which is nearer to the target operating point $(x_0, y_0)$ and a line expressing the input revolution acceleration $(d/dt)\omega i = y_{min}$ to be a command operating point, the drive torque $T^*o$ and the input revolution acceleration $(u_i)$ to be a post-correction drive torque command value $(T^*o)$ and a post-correction input revolution acceleration command value $(u_i)$.

28. A shift control apparatus for the hybrid transmission as claimed in claim 24, wherein the target value correcting section determines whether a target driving torque $(T^*_{oO})$ and a target input revolution acceleration $(u_{io})$ are feasible depending upon whether a plurality of predetermined conditions are satisfied and wherein, when the target value correcting section determines that the target driving torque $(T^*_{oO})$ and the target input revolution acceleration $(u_{io})$ are feasible when the predetermined conditions are satisfied, a target operating point which is the combination of the target driving torque $x_0 (=T^*_{oO})$ and target input revolution acceleration $y_0 (=u_{io})$ is directly set to be a post-correction drive torque command value $(T^*o)$ and a post-correction target input revolution acceleration $(u_i)$ and, when the target value correcting section determines that the target driving torque $(T^*_{oO})$ and the target input revolution acceleration $(u_{io})$ is not feasible, a line segment connecting an origin of the two-dimensional coordinates and target operating point $(x_0, y_0)$ is intersected with one of boundary lines of region A, a region B, and a region C which is within the realizable region (D) and is a nearest point to the target operating point is set to be the command operating point.

29. A shift control apparatus for the hybrid transmission as claimed in claim 24, wherein the target value correcting section determines whether a target driving torque $(T^*_{oO})$ and a target input revolution acceleration $(u_{io})$ are feasible depending upon whether a plurality of predetermined conditions are satisfied and wherein, when the target value correcting section determines that the target driving torque $(T^*_{oO})$ and the target input revolution acceleration $(u_{io})$ are feasible when the predetermined conditions are satisfied, a target operating point which is the combination of the target driving torque $x_0 (=T^*_{oO})$ and target input revolution acceleration $y_0 (=u_{io})$ is directly set as a post-correction drive torque command value $(T^*o)$ and a post-correction target input revolution acceleration $(u_i)$, and, when the target value correcting section determines that the target driving torque $(T^*_{oO})$ and the target input revolution acceleration $(u_{io})$ are not feasible when the predetermined conditions are not satisfied, the target value correcting section derives a point of intersection $(x_0, y_c)$ between a boundary line of regions A, B, and C and a line expressing $To=x_0$, the point of intersection $(x_0, y_c)$ being a point of $y_c$ within the realizable region D which is nearest to $y_0$ to which the target input revolution acceleration $(u_{io})$ is moved with the target drive torque $(T^*_{oO})$ left unchanged, calculates the input revolution acceleration lower limit set value $(y_{min})$ on the basis of a deviation between the target input revolution speed $(\omega^*i)$ and an actual input revolution speed $(\omega i)$, and determines whether a value of $y_c$ is located toward a value of $y_0$ side with respect to $y_{min}$.

30. A shift control apparatus for the hybrid transmission as claimed in claim 29, wherein, when the value of $y_c$ is located toward the value of $y_0$ side with respect to $y_{min}$, the target value correcting section sets the point of intersection $(x_0, y_c)$ to the command operating point, the target drive torque $(T^*_0)$ and engine revolution acceleration $(u_i)$ at the command operating point being set to be a post correction drive torque $(T^*_0)$ and a post-correction engine revolution acceleration $(u_i)$ at the command operating point.

31. A shift control apparatus for the hybrid transmission as claimed in claim 30, wherein, when the value of $y_c$ is not located toward the value of $y_0$ side with respect to $y_{min}$, the target value correcting section sets one of points of intersections of boundary lines of regions A, B, and C and a line expressing the input revolution acceleration $(d/dt)\omega i = y_{min}$ which is nearest to the target operating point $(x_0, y_0)$ within the realizable region (D) as a command operating point, the target drive torque (T*o) and the target input revolution acceleration $(u_i)$ at the command operating point being set as a post-correction drive torque command value $(T^*_o)$ and a post-correction input revolution acceleration command value $(u_i)$.

32. A shift control apparatus for the hybrid transmission as claimed in claim 24, wherein the target value correcting section determines whether a target driving torque $(T^*_{oO})$ and a target input revolution acceleration $(u_{io})$ are feasible depending upon whether a plurality of predetermined conditions are satisfied and wherein, when the target value correcting section determines that the target driving torque $(T^*_{oO})$ and the target input revolution acceleration $(u_{io})$ are feasible when the predetermined conditions are satisfied, a target operating point which is the combination of the target driving torque $x_0$ $(=T^*_{oO})$ and target input revolution acceleration $y_0$ $(=u_{io})$ is directly set as a post-correction drive torque command value $(T^*_0)$ and a post-correction target input revolution acceleration $(u_i)$, and, when the target value correcting section determines that the target driving torque $(T^*_{oO})$ and the target input revolution acceleration $(u_{io})$ are not feasible when the predetermined conditions are not satisfied, the target value correcting section derives a point of intersection $(x_c, y_0)$ between each boundary line of regions A, B, and C and a line expressing $(d/dt)\omega i = y_0$, the point of intersection $(x_c, y_0)$ being a point of $x_c$ within the realizable region D which is nearest to $x_0$ to which the target drive torque $(T^*_{oO})$ is moved with the target input revolution acceleration $(i_{oO})$ left unchanged, calculates the drive torque predetermined lower limit set value $(x_{min})$ on the basis of a deviation between the target input revolution speed and an actual input revolution speed, and determines whether a value of $x_c$ is located toward a value of $x_0$ side with respect to $x_{min}$.

33. A shift control apparatus for the hybrid transmission as claimed in claim 32, wherein, when $x_c$ is located toward the value of $x_0$ side with respect to $x_{min}$, the target value correcting section sets the point of intersection $(x_c, y_0)$ to be a command operating point, the drive torque (T*o) and the input revolution acceleration at the command operating point being set as a post-correction drive torque command value (T*o) and a post-correction input acceleration command value $(u_i)$ and, when $x_c$ is not located toward the value of $x_0$ side with respect to $x_{min}$, the target value correcting section sets one of the points of intersections between the boundary lines of regions A, B, and C and a line expressing drive torque $To=x_{min}$ which is nearest to the target operating point $(x_0, y_0)$ within the realizable region (D) as the command operating point, the drive torque (T*o) and the input revolution acceleration $(u_i)$ at the command operating point being set to be a post-correction drive torque command value (T*o) and to be a post-correction input revolution acceleration $(u_i)$.

34. A shift control method for a hybrid transmission, the hybrid transmission comprising: a plurality of revolutional members which are enabled to be arranged on a predetermined lever diagram; and a differential unit having two degrees of freedom such that if revolution states of two revolutional members of the plurality of revolutional members are determined, the revolutional states of the other revolutional members of the plurality of revolutional members are determined, an input of a main power source, an output to a drive system, and a plurality of motor/generators (MG1, MG2) are coupled to the respective revolutional members of the differential unit to adjust a power from the motor/generators in such a manner that a shift ratio between the main power source and the drive system is varied continuously, and the shift control method comprising:

calculating a target drive torque (T*o) to the drive system in accordance with a driving condition;

calculating a target input revolution speed $(\omega^*_E)$ of one of the revolutional members which is coupled to the main power source (ENG);

calculating a target input revolution acceleration $(u_{io})$ to converge an actual input revolution $(\omega i)$ into the target input revolution speed (107 *i); and correcting at least one of the target drive torque $(T^*_{oO})$ and the target input revolution acceleration $(u_{io})$ to be a value within a realizable region to be set as a drive torque command value (T*o) or an input revolution acceleration command value $(u_{io})$ in such a manner that polarities of the target drive torque (T*o) and the target input revolution acceleration $(u_{io})$ are left unchanged, wherein in a case where a combination of the target drive torque (T*o) with the target input revolution acceleration $(u_{io})$ falls out of a realizable region on two-dimensional coordinates of the drive torque (To) and the input revolution acceleration $\{(d/dt)\omega i\}$ related to a combination of the drive torque and the input revolution acceleration which is feasible in a state of the present motor/generators, a battery $(P_B)$ for the motor/generators (MG1, MG2), and the main power source, at the correcting of at least one of the target drive torque and the target input revolution acceleration, making the drive torque command value (T*o) and the input revolution acceleration command value $(u_i)$ contribute to controls of the main power source (ENG) and the motor/generators (MG1, MG2) in place of the target drive torque $(T^*_{oO})$ and the target input revolution acceleration $(u_{io})$.

* * * * *